US007859958B2

(12) United States Patent
Takashima et al.

(10) Patent No.: US 7,859,958 B2
(45) Date of Patent: Dec. 28, 2010

(54) INFORMATION-RECORDING APPARATUS, INFORMATION-RECORDING METHOD, PROGRAM STORAGE MEDIUM AND PROGRAM

(75) Inventors: Yoshikazu Takashima, Tokyo (JP); Mitsutoshi Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1242 days.

(21) Appl. No.: 11/256,067

(22) Filed: Oct. 24, 2005

(65) Prior Publication Data

US 2006/0092785 A1 May 4, 2006

(30) Foreign Application Priority Data

Nov. 1, 2004 (JP) ............................. 2004-317847

(51) Int. Cl.
*G11B 7/00* (2006.01)
(52) U.S. Cl. .................................. 369/47.13; 369/59.25
(58) Field of Classification Search ............... 369/47.13
See application file for complete search history.

(56) References Cited

U.S. PATENT DOCUMENTS 5,214,781 A * 5/1993 Miki et al. .................. 707/203
5,315,578 A * 5/1994 Furukawa ................. 369/275.3
5,872,955 A * 2/1999 Asano ........................ 711/202
7,190,663 B2 * 3/2007 Ando et al. ............... 369/275.3
2002/0161774 A1 * 10/2002 Tol et al. ..................... 707/100
2003/0137915 A1 * 7/2003 Shoji et al. ................ 369/59.25
2004/0165495 A1 * 8/2004 Park et al. ................. 369/47.14
2005/0083815 A1 * 4/2005 Park ......................... 369/53.15

FOREIGN PATENT DOCUMENTS

JP 9-288884 11/1997
JP 2004-171714 6/2004

* cited by examiner

*Primary Examiner*—Lixi Chow
(74) *Attorney, Agent, or Firm*—Oblon, Spivak, McClelland, Maier & Neustadt, L.L.P.

(57) ABSTRACT

An information-recording apparatus is disclosed wherein FSes can be optimized. The information-recording apparatus includes an FS extraction section for extracting a plurality of FSes from a plurality of FS-recording areas on a recording medium; an FS synthesis section for synthesizing the FSes extracted by the FS extraction section into one FS; and an FS-recording section for recording the FS produced by the FS synthesis section as a result of synthesis into a new area on the recording medium.

11 Claims, 58 Drawing Sheets

FIG. 8

| LSN | Structure | Descriptors | LBN |
|---|---|---|---|
| 0~15 | — | Reserved | |
| 16~18 | Volume Recognition Sequence | — | |
| 19~31 | — | Reserved | |
| 32 | Main Volume Descriptor Sequence | Primary Volume Descriptor | |
| 33 | | Implementation Use Volume Descriptor | |
| 34 | | Partition Descriptor | |
| 35 | | Logical Volume Descriptor ③ | |
| 36 | | Unallocated Space Descriptor | |
| 37 | | Terminating Descriptor | |
| 38~47 | | Trailing Logical Sectors | |
| 48 | Logical Volume Integrity Sequence | Logical Volume Integrity Descriptor ④ | |
| 49 | | Terminating Descriptor | |
| 50~63 | | Trailing Logical Sectors | |
| 64~255 | — | Reserved | |
| 256 | Anchor-1 | Anchor Volume Descriptor Pointer ① | |
| 257~271 | — | Reserved | |
| 272~LSNall-272 | Partition | File Structure and Files ⑤ | 0~LBNall |
| LSNall-271~LSNall-257 | — | Reserved | |
| LSNall-256 | Anchor-2 | Anchor Volume Descriptor Pointer | |
| LSNall-255~LSNall-224 | — | Reserved | |
| LSNall-223~LSNall-208 | Reserved Volume Descriptor Sequence | (Same as Main Volume Descriptor Sequence) | |
| LSNall-207~LSNall-1 | — | Reserved | |
| LSNall | Anchor-3 | Anchor Volume Descriptor Pointer | |

F I G . 9

| LBN | Structure | Descriptors |
|---|---|---|
| 0~A | Space Bitmap | Space Bitmap Descriptor |
| A+1 | File Set Descriptor Sequence | File Set Descriptor |
| A+2 | | Terminating Descriptor |
| A+3 | ICB for Root Directory | FE (Root Directory) ⑪ |
| A+4 | Root Directory | FID (parent directory) |
| | | FID (BDMV) ⑫ |
| | | FID (Resource) |
| | | FID (DATA1) |
| | | FID (DATA2) |
| A+5 | ICB for BDMV Directory | FE (BDMV) ⑬ |
| A+6 | ICB for Resource Directory | FE (Resource) |
| A+7 | ICB for DATA1 Directory | FE (DATA1) |
| A+8 | ICB for DATA2 Directory | FE (DATA2) |
| A+9 | BDMV Directory | FID (parent directory) |
| | | FID (Unit_Key_Gen_Value.inf) ⑭ |
| | | FID (CPS_CCI.inf) ⑮ |
| | | : |
| | | FID (STREAM) |
| A+10 | ICBs for files/directories under BDMV Directory | FE (Unit_Key_Gen_Value.inf) ⑯ |
| A+11 | | FE (CPS_CCI.inf) |
| : | | : |
| A+16 | | FE (STREAM) ⑰ → TO STORAGE LOCATION OF FILE DATA |

INFORMATION-RECORDING APPARATUS, INFORMATION-RECORDING METHOD, PROGRAM STORAGE MEDIUM AND PROGRAM

CROSS REFERENCES TO RELATED APPLICATIONS

The present invention contains subject matter related to Japanese Patent Application JP 2004-317847 filed in the Japanese Patent Office on Nov. 1, 2004, the entire contents of which being incorporated herein by reference.

BACKGROUND OF THE INVENTION

The present invention relates to information-recording apparatus, an information-recording method adopted in the apparatus, a program implementing the method and a program storage medium used for storing the program. More particularly, the present invention relates to information-recording apparatus, in which an area for recording an FS (File System) can be allocated in a recording medium if necessary as a portion of an area used for recording files even when the FS is updated frequently and/or information is added to the FS frequently, if the FS is stored in scattered areas, pieces of information stored in the scattered areas can be collected into a single area by carrying out an optimization process so that information can be read out and written from and into the recording medium at a high speed, the amount of consumption of a TDMA (Temporary Defect Management Area) can be reduced and, if it is known from the beginning that logical write operations are to be carried out frequently, the recording medium is formatted to set the TDMA at a sufficiently large size so that the TDMA can be updated frequently, as well as relates to an information-recording method adopted in the apparatus, a program implementing the method and a program storage medium used for storing the program.

A technology for recording files into a recording medium with a large storage capacity has been becoming popular.

In addition, a variety of formats of recording files into such a recording medium with a large storage capacity has also been proposed.

A typical one of the formats is a UDF (Universal Disc Format) used in a DVD (Digital Versatile Disc). For more information, refer to documents such as Non-patent Document 1: Universal Disk Format Specification Revision 2.50 Apr. 30, 2003 Optical Storage Technology Association.

By the way, in UDF specifications of Ver. 2.50, file-system information is collected and placed in a single area referred to as a metadata partition and includes an additional function located at a logical address in the metadata partition.

In the case of a write-once recording medium, which is a recording medium allowing data to be stored thereon only once, in an operation to update a file stored thereon or the file system recorded thereon, the updated file or the updated file system must be recorded in a new area of the recording medium. It is thus necessary to update the logical address of the file or the file system to a new logical address corresponding to the physical address of the new area.

In the case of a Blu-ray Disc conforming to the UDF specifications of Ver. 2.50, a file and/or file-system information are recorded on the disc as shown in the upper diagram of FIG. 1. In the following description, the Blu-ray Disc is referred to as a BD. FIG. 1 is diagrams each showing a typical recording state of the BD, which serves as a write-once recording medium. In the following description, the BD serving as a write-once recording medium is referred to as a BD-R (Blu-ray Disc-Recordable). In the figure, LSNs (Logical Sector Numbers) or logical addresses are set, starting from the left side of the figure. In the upper diagram of FIG. 1, LSNs of 0 to N are assigned to an area set as a volume space. An area pointed to by the first LSN of 0 as an area marked with the word 'Reserved' is a reserved area. Following the reserved area, an area marked with a character string of 'VRS' (Volume Recognition Sequence) is an area used for recording information indicating the type of the file system. Following the area marked with a character string of 'VRS', an area marked with the phrase 'Files (Stream+DB)' is an area used for recording stream data written by an application program onto the BD in a recording process or stream data to be read out by an application program from the BD in a reproduction process and used for recording database information to be used in the recording or reproduction process. Following the area marked with the phrase 'Files (Stream+DB)', an area marked with the phrase 'Files (not under BD management)' is an area used for recording data recorded by a program other than an application program for recording stream data onto the BD and reading out stream data from the BD. Following the area marked with the phrase 'Files (not under BD management)', an area marked with the phrase 'FS (Metadata)' is an area used for recording file-system information as metadata. Following the area marked with the phrase 'FS (Metadata)', two areas each marked with the word 'Anchor' are each an area used for recording anchor information. Sandwiched by the two areas each marked with the word 'Anchor', an area marked with the phrase 'Volume Str. (Volume Structure)' is an area used for recording information on the structure of the volume. It is to be noted that the area marked with the phrase 'Files (Stream+DB)' is a block B0. On the other hand, the area marked with the phrase 'FS (Metadata)', the two areas each marked with the word 'Anchor' and the area marked with the phrase 'Volume Str.' form a single block B1.

Let us assume for example that stream data is added to the BD-R with a recording state shown in the upper diagram of FIG. 1 and the database information of the stream data is updated accordingly. In this case, information is recorded onto the BD-R as shown in the lower diagram of FIG. 1.

That is to say, new stream data added to information recorded in the block B0 and the database information used for reproduction of the updated stream data are recorded in a block B0' following the block B1. In addition, since the updated stream data is recorded in the block B0', updated file-system information, which is referred to hereafter as an FS, anchor information corresponding to the FS and information on the structure of the volume are recorded in a block B2. At the same time, the FS information, the anchor information corresponding to the FS and the information on the structure of the volume, which exist in the block B1, are put in a state of being unreadable.

SUMMARY OF THE INVENTION

By the way, in the case of a write-once recording medium, which is a recording medium allowing data to be stored thereon only once, in an operation to update a file stored thereon or the file-system information (which is referred to as an FS) recorded thereon, the updated file or the updated file-system information must be recorded in a new area of the recording medium as described above. It is thus necessary to update the logical address of the file or the file-system information to a new logical address corresponding to the physical address of the new area.

In order to solve the problem of the necessity to update the logical address of the file or the file-system information to a new logical address corresponding to the physical address of the new area, there has been proposed a technique to update file-system information (FS) without the need to update the logical address. In accordance with this proposed technique, the updated file-system information is recorded as a replacement of the pre-updating file-system information into either of an alternate area and a user area, which are allocated in conformity with file format specifications such as the UDF specifications.

If the process to add or update a file is carried out repeatedly, however, the logical operation carried out on the FS must also be repeated as well. In this case, the amount of management information used for managing alternate areas used for recording replacements of pre-updating file-system information inevitably increases. Thus, when the process to add or update a file is carried out repeatedly, as a result, it is feared that the area allocated as the alternate area is much consumed. In particular, a TDMA (Temporary Defect Management Area) is much used for storing management information.

In addition, if the FS is updated repeatedly, a track allocated as an area used for recording FSes can no longer be used for recording an FS. In this case, it is necessary to record the FS in another new area. Since a command for allocating existing tracks is not available, however, it is impossible to set an unused area among areas used for recording files as an area to be used for recording a new FS. As a result, there is raised a problem that a new file cannot be recorded or an already existing file cannot be updated.

On top of that, even if an area to be used for recording a new FS can be set, it is feared that the FS is stored in scattered areas and, in addition, it takes time to read out a file from the disk or write a file onto the disk because the number of partial areas each to be replaced with an alternate area increases.

In order to solve the problems described above, inventors of the present invention have particularly devised information-recording apparatus, in which an area for recording an FS can be allocated in a recording medium if necessary as a portion of an area used for recording files even when the FS is updated frequently and/or information is added to the FS frequently, if the FS is stored in scattered areas, pieces of information stored in the scattered areas can be collected in a single area by carrying out an optimization process so that information can be read out from and written into the recording medium at a high speed, the amount of consumption of a TDMA (Temporary Defect Management Area) can be reduced and, if it is known from the beginning that logical write operations are to be carried out frequently, the recording medium is formatted to set the TDMA at a sufficiently large size so that the TDMA can be updated frequently, as well as devised an information-recording method adopted in the apparatus.

A first information-recording apparatus according to an embodiment of the present invention includes:

an FS extraction section for extracting a plurality of FSes from a plurality of FS-recording areas on a recording medium;

an FS synthesis section for synthesizing the FSes extracted by the FS extraction section into one FS; and an FS-recording section for recording the FS produced by the FS synthesis section as a result of synthesis into a new area on the recording medium.

In the first information-recording apparatus, the FS extraction section includes:

an FS-layer FS extraction section for extracting a plurality of FSes from a plurality of FS-recording areas on a plurality of FS layers on a recording medium; and a physical-layer FS extraction section for extracting a plurality of FSes from a plurality of FS-recording areas on a plurality of physical layers on a recording medium, and the FS synthesis section synthesizes:

FSes extracted by the FS-layer FS extraction section as the FSes on the FS layers into one FS; and FSes extracted by the physical-layer FS extraction section as the FSes on the physical layers into one FS.

A first information-recording method according to an embodiment of the present invention includes the steps of:

extracting a plurality of FSes from a plurality of FS-recording areas on a recording medium; and synthesizing the FSes extracted in a process carried out at the FS extraction step into one FS; and recording the FS produced in a process carried out at the FS synthesis step as a result of synthesis into a new area on the recording medium.

There is provided a first program storage medium for storing a program readable by a computer for execution to carry out processing in accordance with an embodiment of the present invention where the processing includes the steps of:

controlling extraction of a plurality of FSes from a plurality of FS-recording areas on a recording medium;

controlling synthesis of the FSes extracted in a process carried out at the FS extraction controlling step into one FS; and controlling record of the FS produced in a process carried out at the FS synthesis controlling step as a result of synthesis into a new area on the recording medium.

There is provided a first program readable by a computer for execution to carry out processing in accordance with an embodiment of the present invention where the processing includes the steps of:

controlling extraction of a plurality of FSes from a plurality of FS-recording areas on a recording medium;

controlling synthesis of the FSes extracted in a process carried out at the FS extraction controlling step into one FS; and controlling record of the FS produced in a process carried out at the FS synthesis controlling step as a result of synthesis into a new area on the recording medium.

A second information-recording apparatus according to an embodiment of the present invention includes:

a determination section for producing a result of determination as to whether or not a logical overwriting process is to be carried out as a presumption of a process to format a recording medium;

an area allocation section for allocating an alternation-information-recording area on the recording medium; and an area-setting section for setting a TDMA area in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

A second information-recording method according to an embodiment of the present invention includes the steps of:

producing a result of determination as to whether or not a logical overwriting process is to be carried out as a presumption of a process to format a recording medium;

allocating an alternation-information-recording area on the recording medium; and setting a TDMA area in the alternation-information-recording area at a size equal to a first fraction of the alternationinformation-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

There is provided a second program storage medium for storing a program readable by a computer for execution to carry out processing in accordance with an embodiment of the present invention where the processing includes the steps of:

controlling produce of a result of determination as to whether or not a logical overwriting process is to be carried out as a presumption of a process to format a recording medium;

controlling allocation of an alternation-information-recording area on the recording medium; and controlling setting of a TDMA area in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

There is provided a second program readable by a computer for execution to carry out processing in accordance with an embodiment of the present invention where the processing includes the steps of:

controlling produce of a result of determination as to whether or not a logical overwriting process is to be carried out as a presumption of a process to format a recording medium;

controlling allocation of an alternation-information-recording area on the recording medium; and controlling setting of a TDMA area in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

In accordance with the first information-recording apparatus, first information-recording method, first program storage medium and first program according to embodiments of the present invention, a plurality of FSes is extracted from a plurality of FS-recording areas on a recording medium, the extracted FSes are synthesized into one FS and the FS produced as a result of synthesis is recorded into a new area on the recording medium.

In accordance with the second information-recording apparatus, second information-recording method, second program storage medium and second program according to embodiments of the present invention, a result of determination is produced as a result of determination as to whether or not a logical overwriting process is to be carried out as a presumption of a process to format a recording medium, an alternation-information-recording area is allocated on the recording medium, and a TDMA area is set in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

The information-recording apparatus according to an embodiment of the present invention can be an independent apparatus or a block for carrying out an information-recording process.

In accordance with the present invention, the consumption of the TDMA can be reduced and information can be read out from the recording medium or written into the recording medium at a higher speed.

BRIEF DESCRIPTION OF THE DRAWINGS

These and other objects and features of the present invention will become clear from the following description of the preferred embodiments given with reference to the accompanying diagrams, in which:

FIG. 8 is an explanatory diagram showing a procedure for making an access to a file conforming to a UDF;

FIG. 9 is an explanatory diagram showing a procedure for making an access to a file conforming to the UDF;

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

A first information-recording apparatus according to an embodiment of the present invention includes:

an FS extraction section (such as an FS-layer optimization section 431a shown in FIG. 48 as a section for carrying a process at a step S313 of a flowchart shown in FIG. 49 or a physical-layer optimization section 431b shown in FIG. 48 as a section for carrying a process at a step S315 of the same flowchart shown in FIG. 49) for extracting a plurality of FSes from a plurality of FS-recording areas on a recording medium;

an FS synthesis section (such as the FS-layer optimization section 431a shown in FIG. 48 as a section for carrying a process at a step S314 of a flowchart shown in FIG. 49 or the physical-layer optimization section 431b shown in FIG. 48 as a section for carrying a process at a step S316 of the same flowchart shown in FIG. 49) for synthesizing the FSes extracted by the FS extraction section into one FS; and an FS-recording section (such as a write section 73 shown in FIG. 48) for recording the FS produced by the FS synthesis section as a result of synthesis into a new area on the recording medium.

Figure 49:
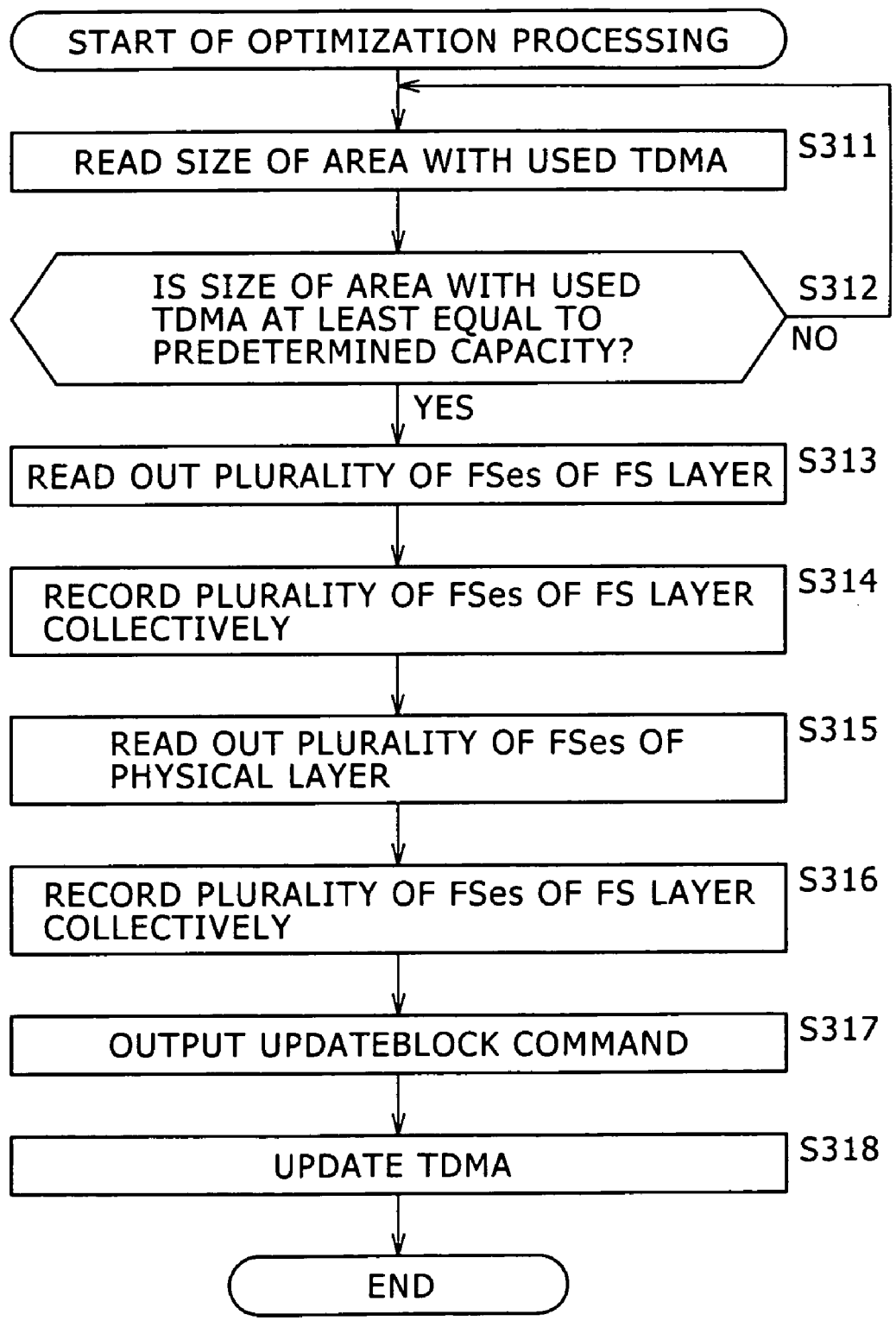
FIG. 49 shows a flowchart referred to in explanation of an optimization process carried out by the recording/reproduction mechanism section shown in FIG. 48.

A first information-recording method according to an embodiment of the present invention includes the steps of:

extracting a plurality of FSes from a plurality of FS-recording areas on a recording medium (such as the step S313 or S315 of the flowchart shown in FIG. 49);

synthesizing the FSes extracted in a process carried out at the FS extraction step into one FS (such as the step S314 or S316 of the flowchart shown in FIG. 49); and recording the FS produced in a process carried out at the FS synthesis step as a result of synthesis into a new area on the recording medium (such as the step S314 or S316 of the flowchart shown in FIG. 49.)

A second information-recording apparatus according to an embodiment of the present invention includes:

a determination section (such as an initialization section 62a shown in FIG. 3 as a section for carrying out a process at a step S292 of a flowchart shown in FIG. 46) for producing a result of determination as to whether or not a logical overwriting process is to be carried out as a presumption of a process to format a recording medium;

an area allocation section (such as the initialization section 62a shown in FIG. 3 as a section for carrying out a process at a step S291 of the flowchart shown in FIG. 46) for allocating an alternation-information-recording area on the recording medium; and an area-setting section (such the an initialization section 62a shown in FIG. 3 as a section for carrying out processes at steps S293 and S294 of the flowchart shown in FIG. 46) for setting a TDMA area in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction.

Figure 46:
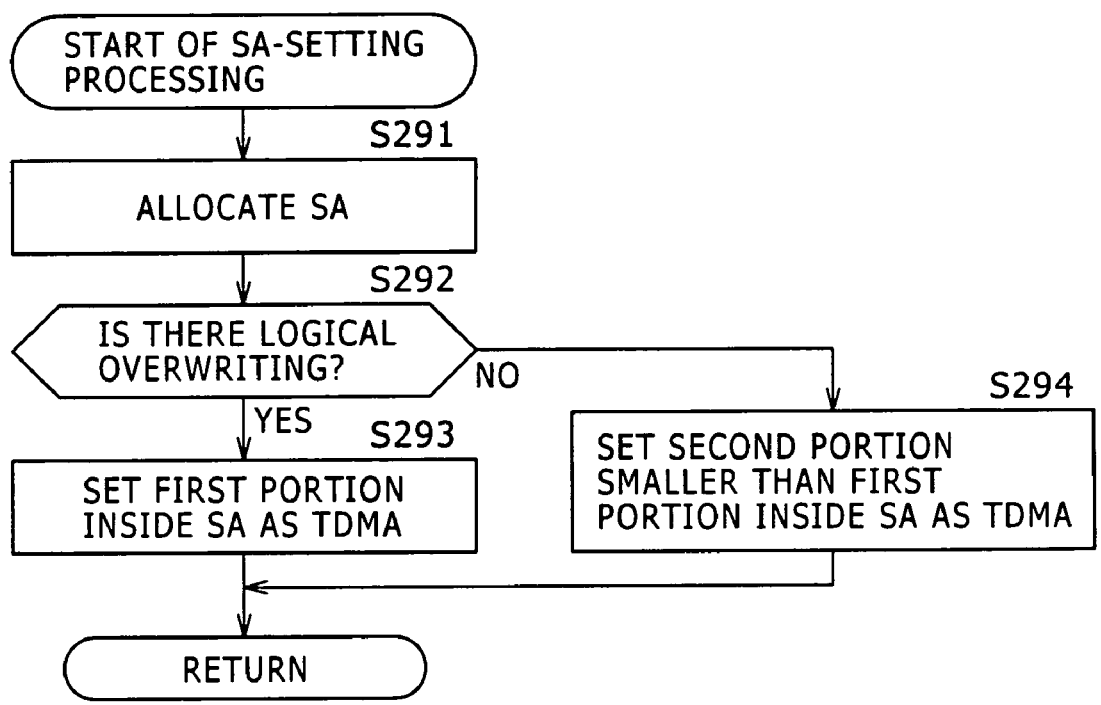
FIG. 46 shows a flowchart referred to in explanation of an SA-setting process carried out by the recording/reproduction mechanism section shown in FIG. 3.

A second information-recording method according to an embodiment of the present invention includes the steps of:

producing a result of determination as to whether or not a logical overwriting process is to be carried out as a presumption of a process to format a recording medium (such as the step S292 of the flowchart shown in FIG. 46);

allocating an alternation-information-recording area on the recording medium (such as the step S291 of the flowchart shown in FIG. 46); and setting a TDMA area in the alternation-information-recording area at a size equal to a first fraction of the alternation-information-recording area if the result of determination indicates that a logical overwriting process is to be carried or at a size equal to a second fraction of the alternation-information-recording area if the result of determination indicates that a logical overwriting process is not to be carried where the second fraction is smaller than the first fraction (such as the steps S293 and S294 of the flowchart shown in FIG. 46.)

It is to be noted that since a program according to an embodiment of the present invention is a program prescribing the information-recording method and a program storage medium according to an embodiment of the present invention is a medium used for storing the program, descriptions of the program and the program storage medium are not given.

Figure 1:
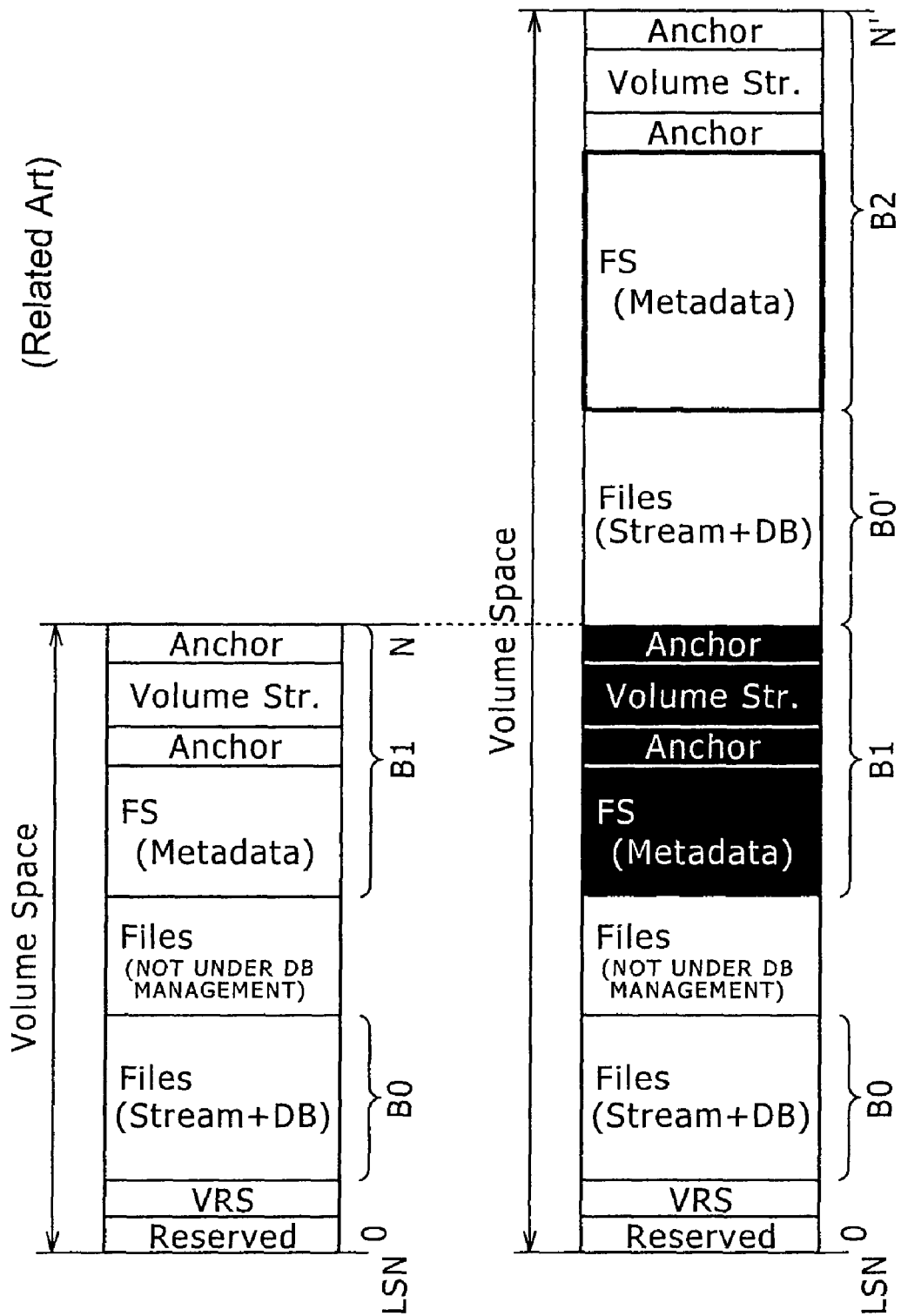
FIG. 1 is an explanatory diagram showing the conventional processing to update file-system information.
Figure 2:
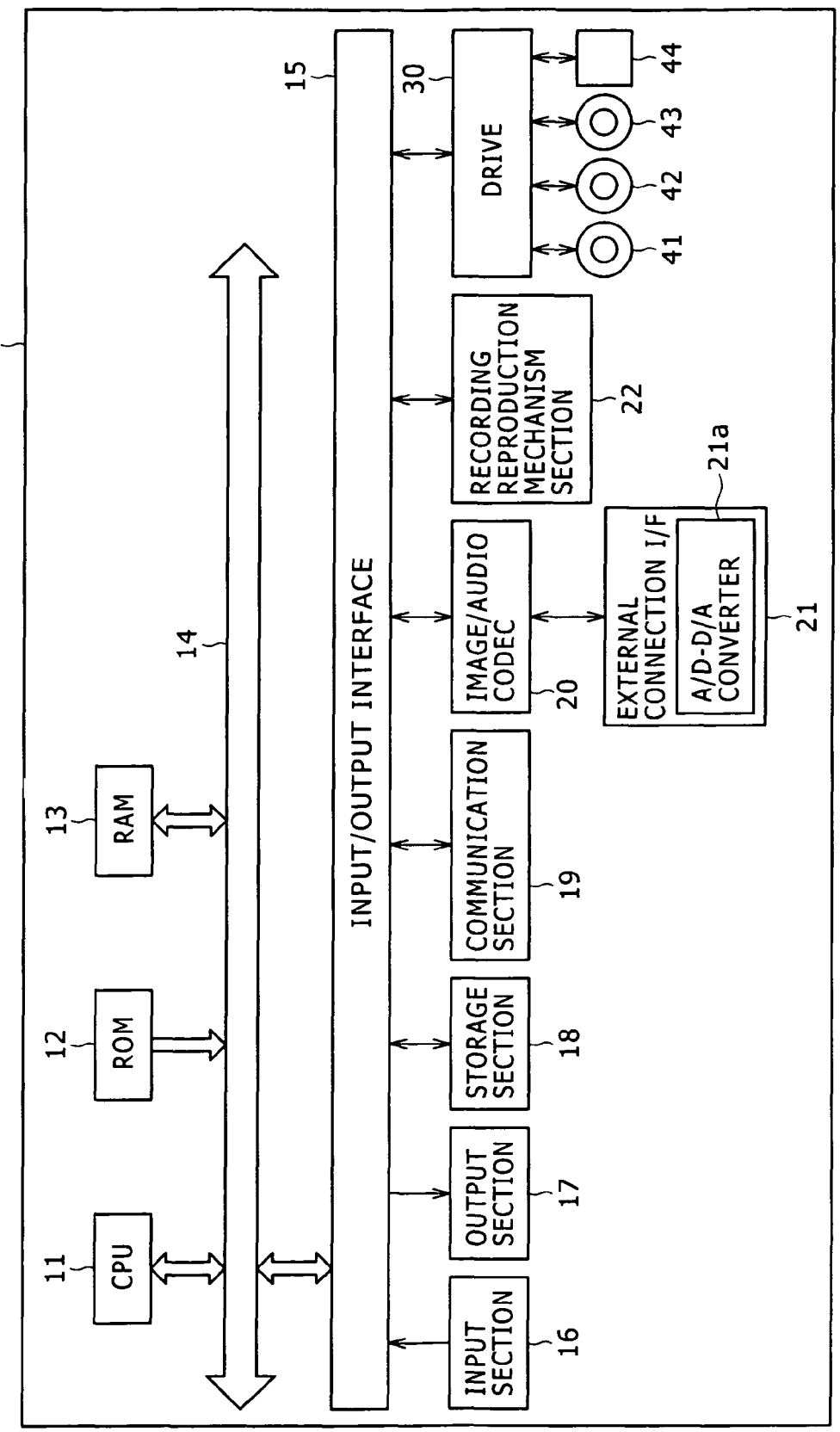
FIG. 2 is a diagram showing the configuration of an embodiment implementing a recording/reproduction apparatus to which the present invention is applied.

FIG. 2 is a block diagram showing the configuration of an embodiment implementing a recording/reproduction apparatus 1 to which the present invention is applied.

A CPU (Central Processing Unit) 11 carries out various kinds of processing by execution of programs stored in a ROM (Read Only Memory) 12 or programs loaded from a storage section 18 into a RAM (Random Access Memory) 13. The RAM 13 is also used for properly storing various kinds of information such as data required in execution of the processing and program to be executed by the CPU 11. The CPU 11, the ROM 12 and the RAM 13 are connected to each other by a bus 14.

The CPU 11 is connected to an input/output interface 15 through the bus 14. The input/output interface 15 is connected to an input section 16 and an output section 17. The input section 16 includes a keyboard, a mouse and a microphone whereas the output section 17 includes a display unit and a speaker. The CPU 11 carries out various kinds of processing in accordance with commands entered via the input section 16. Then, the CPU 11 outputs information such as an image and/or a sound, which are obtained as results of the processing, to the output section 17.

The storage section 18 also connected to the input/output interface 15 typically includes a hard disk used for storing programs to be executed by the CPU 11 and data required in the execution of the programs. A communication section 19 also connected to the input/output interface 15 is a unit for communicating with external information-processing apparatus such as external server by way of a network mainly represented by the typical network such as the Internet and the Intranet.

As described above, the storage section 18 is used for storing programs to be read out and executed by the CPU 11 in order to carry out various kinds of processing. Typically, the programs stored in the storage section 18 include a basic program referred to as an OS (Operating System) and device drivers. The programs stored in the storage section 18 may also include a program acquired from the network by way of the communication section 19.

Figure 3:
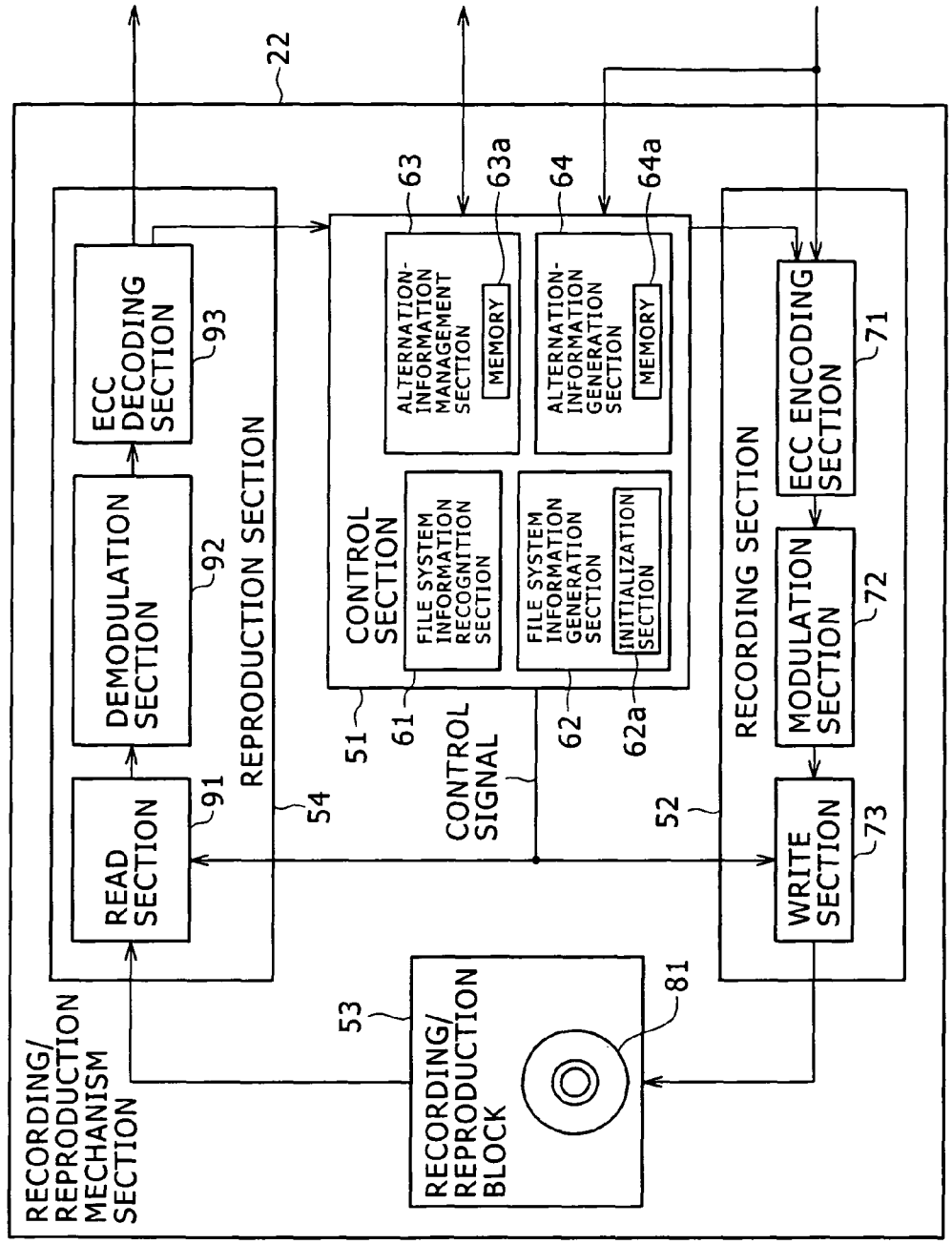
FIG. 3 is a diagram showing the configuration of an embodiment implementing a recording/reproduction mechanism section employed in the recording/reproduction apparatus shown in FIG. 2.

An image/audio codec 20 is a unit for carrying out a predetermined decompression process on an image or sound file and outputting a result of the decompression process to an external connection I/F (interface) 21 and the output section 17. A file subjected to the decompression process is a file read out by a drive 30 from a magnetic disk 41, an optical disk 42, a magneto-optical disk 43 or a semiconductor memory 44. The magnetic disk 41, the optical disk 42, the magneto-optical disk 43 or the semiconductor memory 44 is a recording medium mounted on the drive 30 also connected to the input/output interface 15. As an alternative, a file subjected to the decompression process is a file read out from a recording medium 81 mounted on a recording/reproduction mechanism section 22 as shown in FIG. 3. The file subjected to the decompression process is a file already completing a compression process adopting a predetermined compression method. In addition, the image/audio codec 20 also compresses image and/or sound signals, which are received from the input section 16 and the external connection interface 21, by adoption of a predetermined compression method. The image/audio codec 20 then outputs a result of the compression process to the magnetic disk 41, optical disk 42, magneto-optical disk 43 or semiconductor memory 44 mounted on the drive 30 or the recording medium 81 mounted on the recording/reproduction mechanism section 22 as shown in FIG. 3.

The recording medium 81 mounted on the recording/reproduction mechanism section 22 as shown in FIG. 3 is a magneto-optical recording medium such as the Blu-ray Disc (trademark). The recording/reproduction mechanism section 22 writes predetermined information onto the recording medium 81 and reads out information from the recording medium 81. It is to be noted that a detailed configuration of the recording/reproduction mechanism section 22 will be described later by referring to FIG. 3.

When a magnetic disk 41, a optical disk 42, a magneto-optical disk 43 or a semiconductor memory 44 is mounted on the drive 30 also connected to the input/output interface 15, the drive 30 drives the magnetic disk 41, the optical disk 42, the magneto-optical disk 43 or the semiconductor memory 44, acquiring a program and/or data from the magnetic disk 41, the optical disk 42, the magneto-optical disk 43 or the semiconductor memory 44. If necessary, the acquired program and/or data is then transferred to the storage section 18 to be stored in the storage section 18.

Next, the operation of the recording/reproduction apparatus 1 shown in FIG. 2 is explained.

When a command entered from the input section 16 requests that input data supplied by way of the external connection interface 21 be recorded onto the recording medium 81 mounted on the recording/reproduction mechanism section 22 as will be described later by referring to FIG. 3, the CPU 11 controls the image/audio codec 20 by execution of a program stored in the ROM 12, the RAM 13 or the storage section 18 to compress the input data in accordance with a predetermined compression method and supply the compressed data to the recording/reproduction mechanism section 22 to be recorded onto the recording medium 81.

When a command entered from the input section 16 requests that data be reproduced from the recording medium 81 mounted on the recording/reproduction mechanism section 22, on the other hand, the CPU 11 executes a program stored in the ROM 12, the RAM 13 or the storage section 18 to control the recording/reproduction mechanism section 22 in order to reproduce the data from the recording medium 81 and supply the reproduced data to the image/audio codec 20 and control the image/audio codec 20 in order to decompress the reproduced data in accordance with a predetermined decompression method and output the decompressed data to an external apparatus or the output section 17 for displaying an image of the data and/or generating a sound of the data.

Next, the detailed configuration of the recording/reproduction mechanism section 22 is explained by referring to FIG. 3.

A control section 51 is a unit for controlling all operations of the recording/reproduction mechanism section 22. To be more specific, on the basis of a control signal received from the CPU 11, the control section 51 controls a recording section 52 to drive a recording/reproduction block 53 in order to record information onto the recording medium 81 or controls a reproduction section 54 to drive the recording/reproduction block 53 in order to read out information from the recording medium 81.

A file-system information generation section 62 employed in the control section 51 is a unit for determining a recording location on the recording medium 81 on the basis of the attribute of a file received as input data also including the attribute and recording the file at the determined recording location since such files are grouped by the file-system information generation section 62 by file attribute. In addition, on the basis of pieces of information included in the input data, the file-system information generation section 62 also generates file-system information and supplied the information to the recording section 52 to be recorded onto the recording medium 81. The file-system information generation section 62 records file-system information, anchor information and information on the structure of the volume in either of a user area and an SA area (Spare Area), which exist on the recording medium 81. An initialization section 62a employed in the file-system information generation section 62 is a unit, which is used for setting a recording area and an SA area (or a disk management area) including a TDMA (Temporary Defect Management Area) and an alternate-sector area when the recording medium 81 is formatted. When a sector on the recording medium 81 is damaged physically, an alternate sector is used as a substitute for the damaged sector, into which information supposed to be recorded in the damaged sector is recorded. Even if the physical recording address of the alternate sector on the recording medium 81 is different from the physical recording address of the damaged sector, a logical address assigned to the recorded information remains unchanged. Thus, the use of the alternate sector does not affect an operation to record the information into the alternate sector by using the logical address and an operation to read out the information from the alternate sector by using the logical address. In a process to incrementally write information in a file existing on the disk or update a file already existing on the disk, the file-system information generation section 62 employed in the control section 51 controls a write section 73 to record file-system information, anchor information and information on the structure of the volume in an SA area serving as an alternate area. The TDMA is an area, which is used for incrementally recorded alternate management information when an alternate process is carried out to renew data or carried out in the event of a detected defect. It is to be noted that, in descriptions by referring to the subsequent drawings up to FIG. 45, the TDMA and the alternate-sector area are referred to merely as an SA area or an alternate-sector area. Detailed descriptions including an explanation of the TDMA are given later with reference to FIG. 46 and subsequent figures.

A file-system information recognition section 61 employed in the control section 51 is a unit for reading out either of main file-system information and mirror file-system information, which are supplied from the reproduction section 54, and reading out a predetermined file on the basis of this file-system information. To put it in more detail, the file-system information recognition section 61 controls a read section 91 to read out file-system information, information on the structure of the volume and anchor information from either the user area or an SA area. It is to be noted that, in a process to record information onto the recording medium 81 in the recording/reproduction mechanism section 22 shown in FIG. 3, the same file-system information is also recorded at two locations as main file-system information and mirror file-system information respectively in a double-information structure so that, even if one of the main file-system information and the mirror file-system information is damaged due to some reasons, the remaining one in the double-information structure can still be used. It is also worth noting that, in the following descriptions, the main file-system information and the mirror file-system information are referred to as a main FS and a mirror FS respectively.

If a write process is a process to renew existing data with new data, an alternation-information management section 63 stores an original location and an alternate location in a memory 63a for each logical address by associating the locations with each other in the form of a DL (Defect List). A logical address is assigned to every cluster. The original location is a location at which the data to be renewed exists. On the other hand, the alternate location is a replacement location at which the new data is actually recorded.

In a process to record data onto the recording medium 81, an alternation-information generation section 64 reads out the DL from the memory 63a employed in the alternation-information management section 63 to find out whether or not the data should be written at an alternate location instead of a defective original location. If information included on the DL as information associating an original location with an alternate location at an information granularity corresponding to a cluster indicates that the data should be written at alternate locations of contiguous clusters, the alternation-information generation section 64 replaces the original locations of the contiguous original clusters on the DL with one original location and the alternate locations of the contiguous alternate clusters on the DL with one alternate location, recording the data at the alternate locations of the contiguous clusters as single data.

If the alternation-information generation section 64 reads out the DL from the memory 63a employed in the alternation-information management section 63 in a process to record data onto the recording medium 81 only to find out that information included on the DL as information associating an original location with an alternate location at an information granularity corresponding to a cluster indicates that the data should be written at alternate locations of non-contiguous clusters, on the other hand, the alternation-information generation section 64 changes a plurality of alternate locations on the DL to collect them in a single alternate location representing contiguous clusters and records the data as single data in the contiguous clusters, which are registered as a single entry on the DL.

A recording/reproduction block 53 is a unit controlled by the write section 73 to physically record information onto the recording medium 81 and controlled by the read section 91 to physically reproduce information from the recording medium 81. The recording medium 81 is a medium onto which information can be recorded mechanically, optically, magnetically or opto-magnetically. The recording medium 81 may be a medium onto which information can be recorded repeatedly or only once. Examples of the medium onto which information can be recorded repeatedly are a BD-RW (Blu-ray Disc-Rewritable), a DVD-RW (Digital Versatile Disc-Rewritable) and a DVD-RAM (Digital Versatile Disc-Random Access Memory). On the other hand, examples of the medium onto which information can be recorded only once are a BD-R (Blu-ray Disc-Recordable) and a DVD-R (Digital Versatile Disc-Recordable). In addition, the recording medium 81 may also be a DVD-ROM (Digital Versatile Disc-Read Only Memory). The recording medium 81 can be any type of medium as long as the medium is a disk-type recording medium allowing data to be read out from and data to be recorded thereon. Accordingly, the recording/reproduction block 53 can be any type of unit capable of reproducing data from such a recording medium 81 and recording data thereon.

An ECC encoding section 71 is a unit for adding an error correction code to an input, encoding the input and the additional error correction code and outputting a result of the encoding process to a modulation section 72. The modulation section 72 is a unit for modulating data received from the ECC encoding section 71 and outputting a result of the modulation process to the write section 73. The write section 73 is a unit for carrying out a write process to supply data received from the modulation section 72 to the recording/reproduction block 53 for recording the data onto the recording medium 81.

The read section 91 employed in the reproduction section 54 is a unit for reading out information recorded on the recording medium 81. A demodulation section 92 employed in the reproduction section 54 is a unit for demodulating data read out by the read section 91 from the recording medium 81 and outputting the result of the demodulation process to an ECC decoding section 93 employed in the reproduction section 54. The ECC decoding section 93 is a unit for splitting data received from the demodulation section 92 into an ordinary file and file-system information and outputting the ordinary file as output data and the file-system information to the control section 51. The ordinary file typically contains AV (Audio Visual) stream data.

Figure 4:
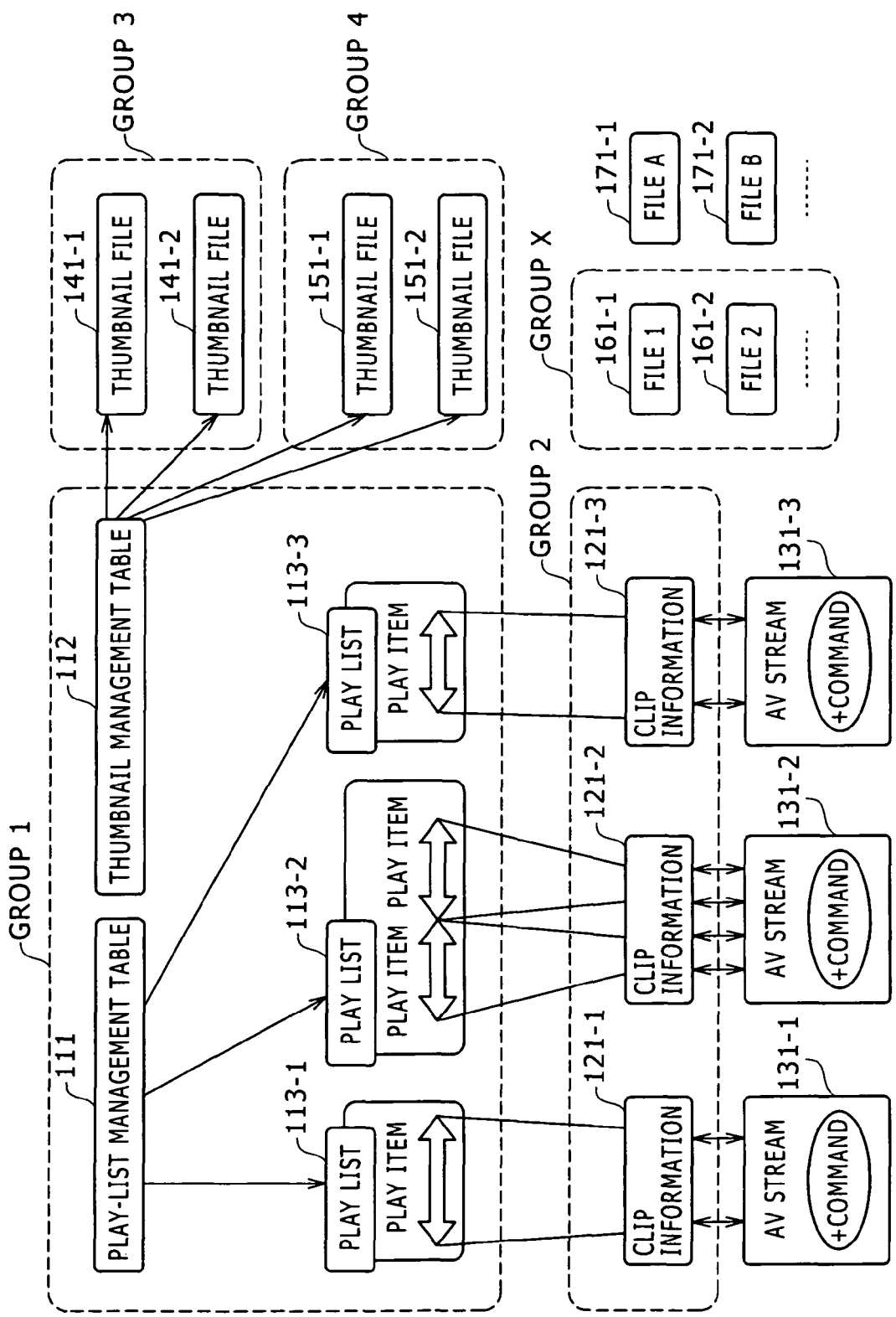
FIG. 4 is a diagram showing an example of group management.

By referring to FIG. 4, the following description explains a management structure of input-data files, which are grouped and managed by the file-system information generation section 62 employed in the control section 51. It is to be noted that files are recorded on the recording medium 81 basically in a UDF format. Thus, in accordance with the management structure described below, files are recorded on the recording medium 81 in the UDF format.

FIG. 4 is a diagram showing a typical case of managing a variety of data files in a process of recording AV stream data onto a recording medium allowing data already recorded thereon to be renewed. The management structure conforms to the management structure of the specifications of the Blu-ray Disc Rewritable (trademark). To put it in detail, the management structure conforms to the management structure of the specifications of the Blu-ray Disc Rewritable (trademark), but the recording format is the UDF format. In the example shown in FIG. 4, three layers are shown. The three layers are a content management layer existing on the top of the figure to be followed sequentially by a play-list layer and a clip layer. It is to be noted that this management structure is also applicable to the Blu-ray Disc Recordable (trademark).

In the management structure shown in the figure, a play-list management table 111 and a thumbnail management table 112 pertain to the content management layer whereas play lists 113-1 to 113-3 pertain to the play-list layer. By the same token, pieces of clip information 121-1 to 121-3 pertain to the clip layer. It is to be noted that, in the following description, the play lists 113-1 to 113-3 are each referred to merely as a play list 113 if it is not necessary to distinguish the play lists 113-1 to 113-3 from each other. By the same token, the pieces of clip information 121-1 to 121-3 are each referred to merely as clip information 121 if it is not necessary to distinguish the pieces of clip information 121-1 to 121-3 from each other. This representation using a generic reference numeral applies to each plurality of any other similar management-structure items.

The file of an AV stream 131 and the file of clip information 121 can be combined to particularly form a clip since the file of clip information 121 has an attribute of an AV stream. An example of the AV stream 131 is MPEG-TS (Moving Picture Experts Group-Transport Stream). The file of an AV stream 131 is thus a file having a structure of multiplexed information including video information, audio information and captions. In addition, in some cases, the multiplexed information of an AV stream 131 may include a command for controlling a reproduction process. The figure shows a case in which the AV stream 131 includes such a command in the multiplexed information.

A play list 113 for a clip has a structure including a plurality of play items each to be referenced by using a reproduction start point and a reproduction end point, which define a specific range of the clip. Thus, a play list 113 provides a function to continuously reproduce a plurality of reproduction sequences. The play-list management table 111 is a table showing a list of play lists 113 to the user. On the other hand, the thumbnail management table 112 is a table to be used in a thumbnail display function. The thumbnail management table 112 shows thumbnail files 141-1 and 141-2 as well as thumbnail files 151-1 and 151-2.

A pair of an AV stream 131 and the attribute thereof is regarded as an object, which is referred to as a clip. The attribute of an AV stream 131 is the clip information 121 mentioned earlier. The file of an AV stream 131 is referred to as an AV-stream file.

In general, a file used in apparatus such as a computer is treated as an array of bytes. The content of an AV stream 131 is spread along the time axis. An access point of clip information 121 in an AV stream 131 is mainly specified by using a timestamp. With a play list 113 giving a timestamp as the timestamp of an access point of a clip corresponding to the play list 113, the clip information 121 corresponding to the play list 113 is used for finding out an address at which a process to decode the stream in the AV stream 131 is to be started. The address indicates the location of a byte on the stream.

A play list 113 is a list introduced for the purposes of allowing the user to find out a reproduction range of a clip corresponding to the play list 113 as a range that the user wants to view and allowing such reproduction ranges to be edited with ease. A play list 113 is a collection of reproduction ranges in a clip corresponding to the play list 113. A reproduction range of a clip is referred to as a play item, which is represented by IN and OUT points on the time axis. Thus, a play list 113 is a collection of play items.

In the example shown in FIG. 4, files are divided into groups in accordance with their usage/updating frequencies and the maximum total size of files pertaining to a group as follows. The play-list management table 111, the thumbnail management table 112 and the play lists 113 are put in group 1 whereas the pieces of information 121 are put in group 2. Menu thumbnail files 141-1 and 141-2 are put in group 3 whereas mark thumbnail files 151-1 and 151-2 are put in group 4.

The files grouped as described above contain management data required in a process to reproduce an AV stream 131. By collecting pieces of management data in a file grouped as described above, the management data can be read out fast. As a result, the AV stream data can be reproduced at a high speed.

In the typical example described above, files of management data for an AV stream 131 are grouped. It is to be noted that files not defined in the specifications of the Blu-ray Disc Rewritable can also be grouped. For example, group X is defined as a group for accommodating files 161-1 and 161-2 different from the files of management data for AV streams 131 shown in the figure. It is also worth noting that the figure shows files 171-1 and 171-2 pertaining to none of the groups. In addition, since the AV streams 131 are not management data, the AV streams 131 are not grouped.

Figure 5:
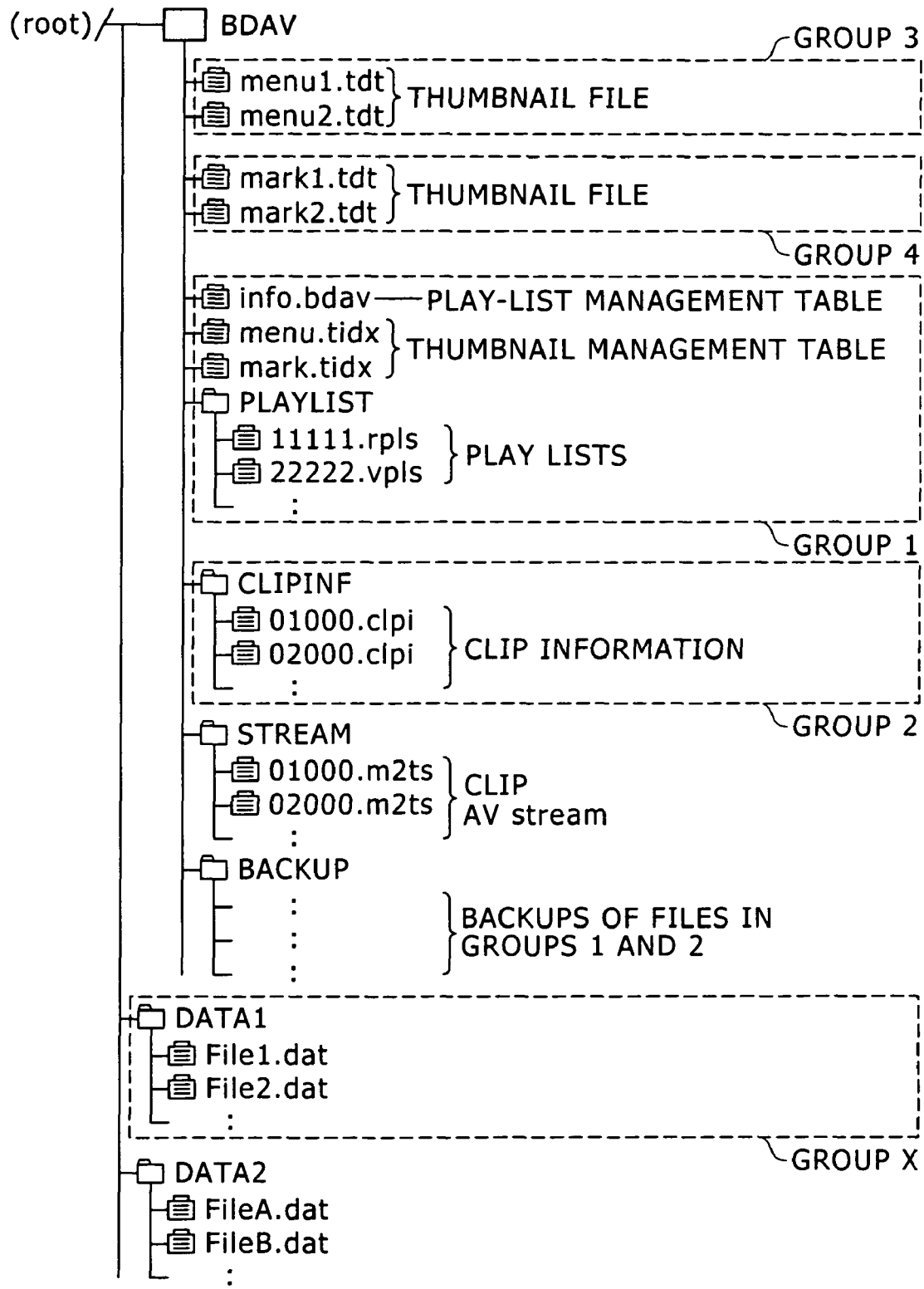
FIG. 5 is a diagram showing the structure of directories generated by the typical group management shown in FIG. 4 as well as files accommodated in the directories and also generated by the group management.

FIG. 5 is a diagram showing a typical structure of directories for BDAV (Blu-ray Disc Audio Visual) information recorded on the recording medium 81 as information defined by a Blu-ray Disc Rewritable Format (BD-RE). It is to be noted that directories other than those shown in the figure can be created under a root directory shown in the figure. However, such other directories are ignored in a recording process conforming to the UDF format. The directory structure shown in FIG. 5 is also applicable to a BD-R (Blu-ray Disc Recordable).

As shown in the figure, the root directory includes only one directory named BDAV.

All files and directories included in the BDAV directory are files and directories prescribed by a BDAV application format. In addition, the BDAV directory also includes directory described as follows.

A PLAYLIST directory is a directory, which includes database files of play lists 113. This directory is set as an empty directory even if play lists 113 do not exist at all.

A CLIPINF directory is a directory, which includes database files of clips. This directory is set as an empty directory even if clips do not exist at all.

A STREAM directory is a directory, which includes AV stream files. This directory is set as an empty directory even if AV stream files do not exist at all.

A BACKUP directory is a directory, which includes backup files of files pertaining to groups 1 and 2. This directory is set even if the files pertaining to groups 1 and 2 do not exist at all.

The play list files included in the PLAYLIST directory are files of one of 2 types, i.e., Real PlayList and Virtual PlayList. In the example shown in FIG. 5, files 11111.rpls of the Real PlayList type and 22222.vpls of the Virtual PlayList type are recorded. In general, a file named xxxxx.rpls is used for storing information on a Real PlayList and created for every play list. Notation xxxxx in the file name xxxxx.rpls is a 5-digit number where each digit can be any integer in the range 0 to 9.

On the other hand, a file named yyyyy.vpls is used for storing information on a Virtual PlayList and created for every play list. Notation yyyyy in the file name yyyyy.vpls is a 5-digit number where each digit can be any integer in the range 0 to 9.

A Real Playlist for a clip is regarded as a file sharing a stream portion of the clip being referenced. That is to say, a Real Playlist occupies a disk area with a data storage size corresponding to the AV stream portion of a clip being referenced. When an AV stream is recorded as a new clip, a Real Playlist is generated as a play list referencing the reproducible range of the entire clip. If a portion of the reproduction range of a Real Playlist is deleted, the data of the clip stream portion referenced by the deleted portion is also deleted as well.

On the other hand, a Virtual Playlist for a clip is regarded as a file sharing no data of the clip. Thus, even if a Virtual Playlist is changed or deleted, the clip does not change at all. It is to be noted that, in the description of this specification, the Real Playlist and the Virtual Playlist are both referred to as a play list.

The CLIPINF directory includes a file for every AV stream file. In the example shown in FIG. 5, the files included in the CLIPINF directory are files named 01000.clpi and 02000.clpi.

A file named zzzzz.clpi is clip information 121 corresponding to an AV stream 131. Notation zzzzz in the file name zzzzz.clpi is a 5-digit number where each digit can be any integer in the range 0 to 9.

As described above, the STREAM directory is a directory, which includes AV stream files. In the example shown in FIG. 5, the files included in the STREAM directory are files named 01000.m2ts and 02000.m2ts.

In general, a file named zzzzz.m2ts is the file of an AV stream 131. Notation zzzzz in the file name zzzzz.m2ts is a 5-digit number where each digit can be any integer in the range 0 to 9. It is to be noted that the clip information 121 corresponding to an AV stream 131 is stored in a file having the same 5-digit family name zzzzz as the file name given to the file for storing the AV stream 131.

In addition, the BDAV directory also includes files named menu1.tdt and menu2.tdt for the thumbnail files 141-1 and 141-2 respectively as direct subordinates to the BDAV directory. Furthermore, the BDAV directory also includes files named mark1.tdt and mark2.tdt for the thumbnail files 151-1 and 151-2 respectively as direct subordinates to the BDAV directory. Moreover, as direct subordinates to the BDAV directory, the BDAV directory also includes a file named info.bdav for the play-list management table 111 as well as files named menu.tidx and mark.tidx for the thumbnail management table 112.

On top of that, the root directory also includes directories named DATA1 and DATA2 as direct subordinates to the root directory. The DATA1 directory accommodates File1.dat, File2.dat, etc corresponding to respectively the files 161-1, 161-2, etc. On the other hand, the DATA2 directory accommodates FileA.dat, FileB.dat, etc corresponding to respectively the files 171-1, 171-2, etc.

The files and the directories managed under the directory shown in FIG. 5 are put in groups shown in FIG. 4 as follows. The files named menu1.tdt and menu2.tdt as files corresponding to the thumbnail files 141-1 and 141-2 respectively pertain to group 3. The files named mark1.tdt and mark2.tdt as files corresponding to the thumbnail files 151-1 and 151-2 respectively pertain to group 4. The file named info.bdav for the play-list management table 111, the files named menu.tidx and mark.tidx for the thumbnail management table 112 as well as the files named 11111.rpls and 22222.vpls as files accommodated in the PLAYLIST directory pertain to group 1. The files named 01000.clpi and 02000.clpi as files accommodated in the CLIPINF directory pertain to group 2.

As described above, files other than those managed by using the BDFS are put in group X. In the example shown in FIG. 5, the other files are the files named File1.dat and File2.dat in the DATA1 directory as files corresponding to the files 161-1 and 161-2 respectively.

Figure 6:
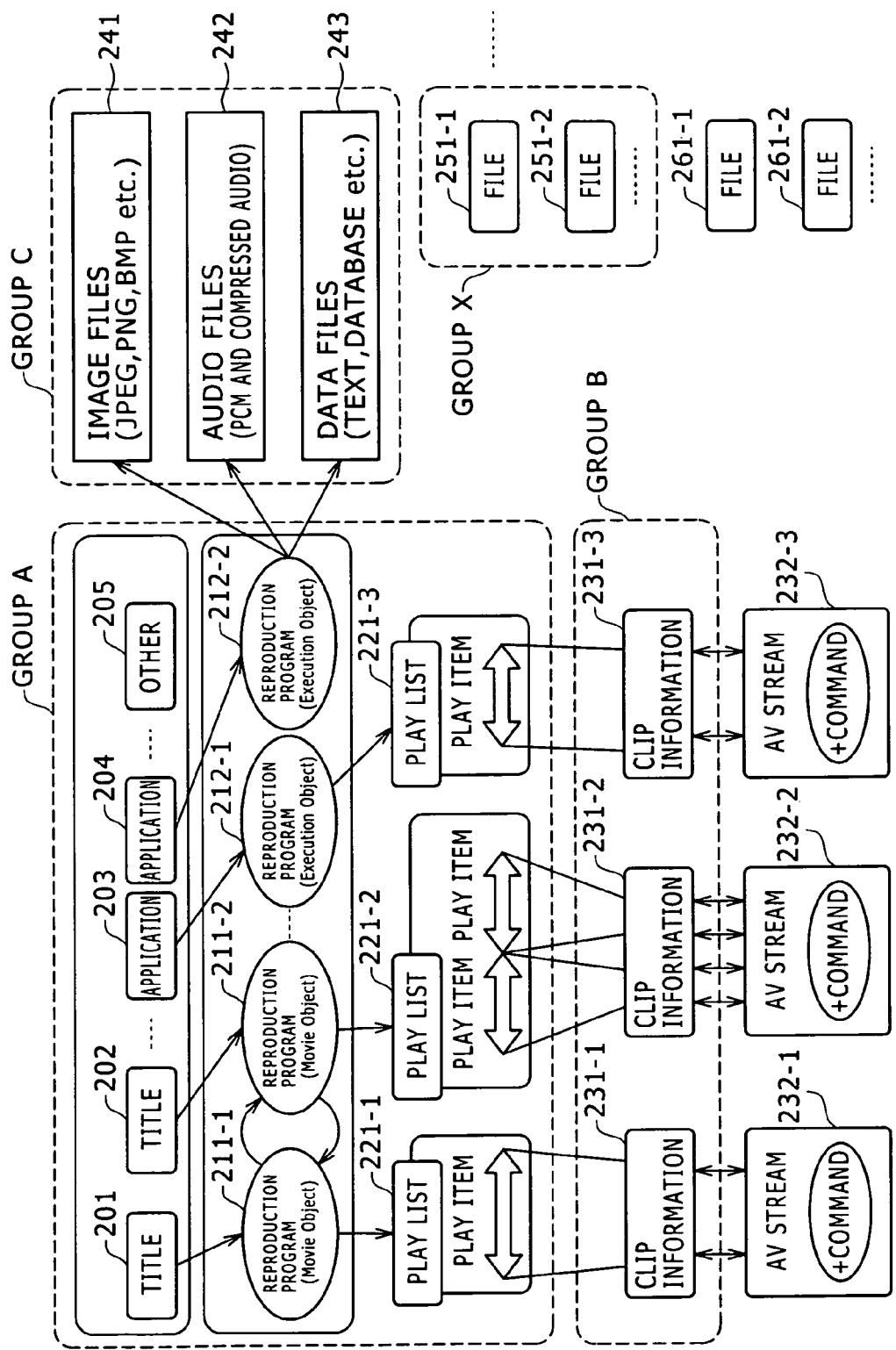
FIG. 6 is a diagram showing another example of group management.

FIGS. 4 and 5 show management structures for grouping of files recorded on the recording medium 81 in accordance with the UDF format and on the basis of the specifications of the Blu-ray Disc Rewritable, which is a recording medium allowing data recorded thereon to be rewritten. By referring to FIGS. 6 and 7, the following description explains typical management structures (or a typical logical format) for grouping of files recorded on the recording medium 81 on the basis of the specifications of the Blu-ray Disc ROM, which is a read-only recording medium. FIG. 6 is a diagram showing a typical case of recording an HD (High Density) movie content.

It is to be noted that, in the example shown in FIG. 6, play lists 221-1 to 221-3, pieces of clip information 231-1 to 231-3, AV streams 232-1 to 232-3, files 251-1 and 251-2 as well as files 261-1 and 261-2 are identical to respectively the play lists 113-1 to 113-3, the pieces of clip information 121-1 to 121-3, the AV streams 131-1 to 131-3, the files 161-1 and 161-2 as well as the files 171-1 and 171-2 shown in FIG. 4. Thus, descriptions of them are not given.

As shown in FIG. 6, two layers exist over the play lists 221 and the pieces of clip information 231. One of the layers is a layer for accommodating reproduction programs (or movie objects) 221-1 and 221-2. The other layer is a layer for accommodating titles 201 and 202. The reproduction program (or the movie object) 211 provides programmable functions, which are required for presentation of an HD movie content. The functions include a function to specify a play list to be reproduced, a function to respond to an operation carried out by the user, a function to jump from the title 201 to the title 202 or vice versa and a function to carry out a branch in a reproduction sequence.

The titles 201 and 202 are each used as an index, which can be recognized by the user as an index for starting reproduction of a content corresponding to the title. The titles 201 and 202 each have a configuration for specifying one movie object to be executed. In addition to ordinary titles, there are also a title to be reproduced automatically at an initial time and a title used for displaying a menu.

Application programs 203 and 204 are each a program for executing a game, which is an extension application, and a web content. The application programs 203 and 204 activate and execute reproduction programs (or reproduction objects) 212-1 and 212-2. The reproduction program 212 can be a program using a play list or a program not using a play list. In addition, the reproduction program 212 is capable of referencing any arbitrary image file 241, audio file 242 and data file 243 in the application programs 203 and 204.

It is possible to add more titles to the titles 201 and 202 each showing an HD movie content and more applications to the applications 202 and 203. As a matter of fact, others 205 in the example shown in FIG. 6 represent the additional titles and applications. In addition, the titles and the applications are recorded on the recording medium 81 in a state of being mixed with each other. FIG. 6 shows this state of mixing the titles and the applications with each other.

Also in the example shown in FIG. 6, files are divided into groups in accordance with their usage/updating frequencies and the maximum total size of files pertaining to a group in the same way as the grouping shown in FIG. 4. To put it concretely, the titles 201 and 202, the applications 203 and 204, the others 205, the reproduction programs 211-1, 211-2, 212-1 and 212-2 as well as the play lists 221-1 to 221-3 are put in group A. The pieces of clip information 231 are put in group B. The image files 241, the audio files 242 and the data files 243 are put in group C.

It is to be noted that groups A, B and C shown in FIG. 6 are provided and named differently from each other only for the sake of convenience in the same way as groups 1, 2, 3 and 4 shown in FIG. 4. Also in this case, each of the groups means a set of files to be processed in the same way as those shown in FIG. 4.

Figure 7:
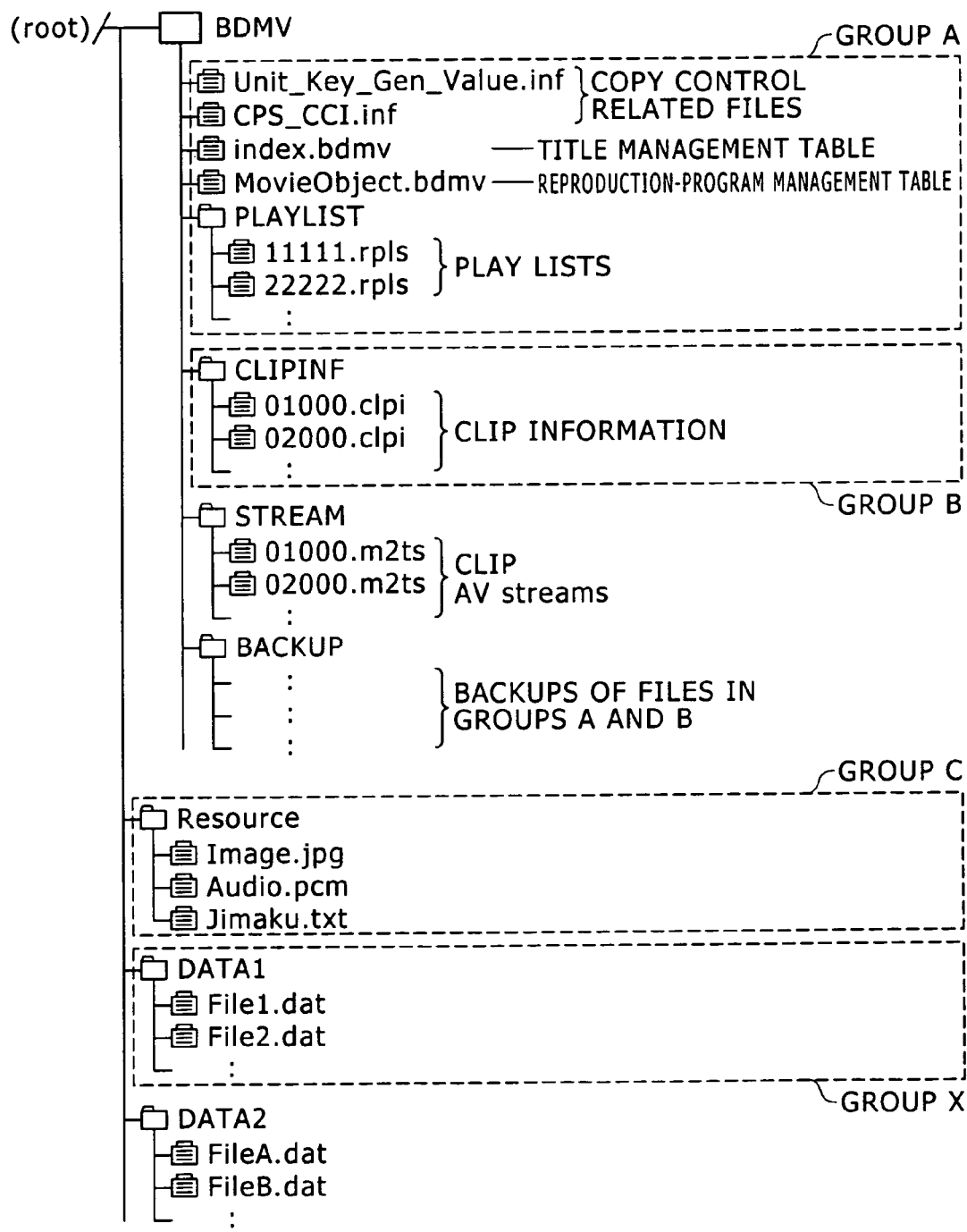
FIG. 7 is a diagram showing the structure of directories generated by the typical group management shown in FIG. 6 as well as files accommodated in the directories and also generated by the group management.

FIG. 7 is a diagram showing a typical structure of directories for BDMV (Blu-ray Disc Movie) information recorded on the recording medium 81 as information defined by a Blu-ray Disc ROM Format (BD-ROM). It is to be noted that directories other than those shown in the figure can be created under a root directory shown in the figure. However, such other directories are ignored in a recording process conforming to the UDF format.

As shown in the figure, the root directory includes only one directory named BDMV.

All files and directories included in the BDMV directory are files and directories prescribed by a BDMV application format. In addition, the BDMV directory also includes directory described as follows.

A PLAYLIST directory is a directory, which includes database files of play lists 221. This directory is set as an empty directory even if play lists 221 do not exist at all.

A CLIPINF directory is a directory, which includes database files of clips. This directory is set as an empty directory even if clips do not exist at all.

A STREAM directory is a directory, which includes AV stream files. This directory is set as an empty directory even if AV stream files do not exist at all.

A BACKUP directory is a directory, which includes backup files of files pertaining to groups A and B. This directory is set as an empty directory even if the files pertaining to groups A and B do not exist at all.

In the example shown in FIG. 7, files 11111.rpls and 22222.rpls are accommodated in the PLAYLIST directory. In general, a file named xxxxx.rpls is used for storing information on a Movie PlayList and created for every play list. Notation xxxxx in the file name xxxxx.rpls is a 5-digit number where each digit can be any integer in the range 0 to 9.

The CLIPINF directory includes a file for every AV stream file. In the example shown in FIG. 7, the files included in the CLIPINF directory are files named 01000.clpi and 02000.clpi.

A file named zzzzz.clpi is clip information 231 corresponding to an AV stream 232. Notation zzzzz in the file name zzzzz.clpi is a 5-digit number where each digit can be any integer in the range 0 to 9.

As described above, the STREAM directory is a directory, which includes AV stream files. In the example shown in FIG. 7, the files included in the STREAM directory are files named 01000.m2ts and 02000.m2ts.

In general, a file named zzzzz.m2ts is the file of an AV stream 232. Notation zzzzz in the file name zzzzz.m2ts is a 5-digit number where each digit can be any integer in the range 0 to 9. It is to be noted that the clip information 231 corresponding to an AV stream 232 is stored in a file having the same 5-digit family name zzzzz as the file name given to the file for storing the AV stream 232.

In addition, the BDMV directory also includes files Unit_Key_Gen_Value.inf and CPS_CCI.inf related to copy control as direct subordinates to the BDMV directory. Furthermore, direct subordinates to the BDMV directory also include a file named index.bdmv serving as a title management table. Moreover, direct subordinates to the BDMV directory also include a file named MovieObject.bdmv serving as a reproduction-program management table.

On top of that, the root directory also includes directories named Resource, DATA1 and DATA2 as direct subordinates to the root directory. These directories are not mandatory directories in the Blu-ray Disc ROM format. Instead, these directories are merely added as typical directories each used for storing extension data, which is necessary in dependence on the substance of the content. The Resource directory is a directory used for accommodating the image file 241 named Image.jpg, the audio file 242 named Audio.pcm and the data file 243 named Jimaku.txt. The image file 241, the audio file 242 and the data file 243 are files managed by including them in group C. The DATA1 directory accommodates File1.dat, File2.dat, etc corresponding to respectively the files 251-1, 251-2, etc. On the other hand, the DATA2 directory accommodates FileA.dat, FileB.dat, etc corresponding to respectively the files 261-1, 261-2, etc.

The files and the directories managed under the directory shown in FIG. 7 are put in groups as follows. The files named Unit_Key_Gen_Value.inf, CPS_CCI.inf, index.bdmv and MovieObject.bdmv pertain to group A. Files accommodated in the PLAYLIST directory as the files named. 11111.mpls and 22222.mpls also pertain to group A. Files accommodated in the CLIPINF directory as the files named 01000.clpi and 02000.clpi pertain to group B. Files accommodated in the Resource directory as the files named Image.jpg, Audio.pcm and Jimaku.txt pertain to group C.

As described above, files other than those managed by using the groups described above are put in group X. In the example shown in FIG. 7, the other files are the files named File1.dat and File2.dat in the DATA1 directory as files corresponding to the files 251-1 and 251-2 respectively.

Next, before explaining a recording process according to an embodiment of the present invention, a procedure for making an access to a file in the conventional UDF is described by referring to FIGS. 8 and 9.

FIG. 8 is a diagram showing a typical volume structure of the UDF. FIG. 9 is a diagram showing the contents of a File Structure and Files. In particular, the following description explains an access to root/BDMV/Unit_Key_Gen_Value.inf shown in FIG. 9.

The volume structure shown in FIG. 8 includes information on a logical volume and information on the analysis start point of each file structure recorded in a partition. It is to be noted that, in the volume structure shown in FIG. 8, the left-most column is an LSN (Logical Sector Number) column. On the right side of the LSN column, there is a structure column, which is followed by a descriptors column. The right-most column is an LBN (Logical Block Number) column. In the file structure shown in FIG. 9, the left-most column is an LBN column, the middle column is a structure column and right-most column is a descriptors column.

An address in a volume is referred to as an LSN (Logical Sector Number) and an address in a partition is referred to as an LBN (Logical Block Number). If a plurality of partitions exists in the volume, information on the partitions can be recorded in a logical volume descriptor.

It is to be noted that FIGS. 8 and 9 show only items required in processing. That is to say, items not required in processing are not described.

First of all, reference numeral (1) in the volume structure shown in FIG. 8 denotes anchor information for Anchor-1 on the structure column. The information on this anchor is referred to as an Anchor Volume Descriptor Pointer to be analyzed to obtain the position of a Volume Descriptor Sequence denoted reference numeral (2). In the volume structure, this anchor information is provided at a location indicated by an LSN of 256. As described above, reference numeral (2) denotes a Volume Descriptor Sequence indicated by LSNs of 32 to 47 as a sequence on the structure column. The Volume Descriptor Sequence corresponds to items on the descriptors column. These items on the descriptors column are a Primary Volume Descriptor, an Implementation Use Volume Descriptor, a Partition Descriptor, a Logical Volume Descriptor, an Unallocated Space Descriptor, a Terminating Descriptor and Trailing Logical Sectors. The Primary Volume Descriptor is information identifying the volume. The Implementation Use Volume Descriptor is information indicating compatibility. The Partition Descriptor is information on partitions. The Logical Volume Descriptor is information showing the position of a logical partition. The Unallocated Space Descriptor is information indicating an unused area. The Terminating Descriptor is information showing the last position in the area. The Trailing Logical Sectors is information on a remaining area.

In the volume structure shown in FIG. 8, reference numeral (3) denotes the Logical Volume Descriptor, which is provided at a location indicated by an LSN of 35. The Logical Volume Descriptor describes the position of a Logical Volume Integrity Sequence, the position of a target partition and the position of a File Set Descriptor inside the partition.

The position of a Logical Volume Integrity Sequence is the position of a Logical Volume Integrity Sequence denoted by reference numeral (4) and provided at a location indicated by an LSN of 48. The Logical Volume Integrity Sequence is a sequence to be analyzed to check the matching of the information on the volume. If there is no matching problem, the contents of a partition for the File Structure and Files are analyzed. The File Structure and Files are an item denoted by reference numeral (5) and provided at a position indicated by LSNs of 272 to (272Nall-272). A sequence represented by arrows between reference numerals (1) to (5) mentioned above is the sequence of a procedure for starting to make an access to the target partition.

The File Set Descriptor mentioned above is a File Set Descriptor denoted by reference numeral (11) and provided at a position indicated by an LBN of (A+1) in the structure shown in FIG. 9. The File Set Descriptor is information on the root. Thus, by analyzing the information on the root, the position of the root-directory file entry denoted by reference numeral (12) and provided at a position indicated by an LSN of (A+3) can be obtained. In the figure, the file entry of the root directory is referred to as an FE (Root Directory).

Then, the root-directory file entry denoted by reference numeral (12) and provided at a position indicated by an LBN of (A+3), that is, a file entry referred to as an FE (Root Directory) in the figure, is analyzed to obtain root-directory information stored at a location indicated by an LBN of (A+4). Then, an FID (File Identifier Descriptor) of the BDMV directory is analyzed to obtain the position of a BDMV-directory FE (file entry) denoted by reference numeral (14) and provided at a position indicated by an LBN of (A+5). The FID of the BDMV directory is information included in the information on the root directory and denoted by reference numeral (13). In the figure, the file entry of the BDMV directory is referred to as an FE (BDMV).

Subsequently, the BDMV-directory FE (file entry) denoted by reference numeral (14) is analyzed to obtain a location indicated by an LBN of (A+9) as a location used for storing information on the BDMV directory.

Then, the information on the BDMV directory is obtained. Subsequently, the File Identifier Descriptor of Unit_Key-_Gen_Value.inf accommodated in the BDMV directory and denoted by reference numeral (15) is analyzed to obtain the position of the file entry of Unit_Key_Gen_Value.inf. Then, the file entry of Unit_Key_Gen_Value.inf is analyzed to obtain a location used for recording data of Unit_Key_Gen_Value.inf. The file entry of Unit_Key_Gen_Value.inf is denoted by reference numeral (16). The location used for recording data of Unit_Key_Gen_Value.inf is the address of the data of Unit_Key_Gen_Value.inf. Subsequently, an access to the address is made to get the desired data. A sequence represented by arrows between reference numerals (11) to (17) mentioned above is the sequence of a procedure for obtaining the data of root/BDMV/Unit_Key_Gen_Value.inf.

If a metadata partition introduced by UDF2.50 is used, the File Set Descriptor denoted by reference numeral (11), the root-directory FE (file entry) denoted by reference numeral (12), the BDMV-directory FID (File Identifier Descriptor) denoted by reference numeral (13), the BDMV-directory FE (file entry) denoted by reference numeral (14), the FID (File Identifier Descriptor) of Unit_Key_Gen_Value.inf accommodated in the BDMV directory and denoted by reference numeral (15) and the file entry of Unit_Key_Gen_Value.inf accommodated in the BDMV directory and denoted by reference numeral (16) are relocated in the metadata partition by using logical addresses.

The location used for recording the metadata partition can be obtained from the file entry of the metadata file. By storing the data of the metadata partition in a memory, it is possible to avoid operations to read out three pieces of information, i.e., a file identifier descriptor, a file entry and information on a directory, from the recording medium every time the directory is changed to one at a lower level in a process to make an access to a file accommodated in a directory of a multi-layer structure. This is because, from the data of the metadata partition, information necessary for reading out a file from the recording medium can be obtained and analyzed.

Figure 10:
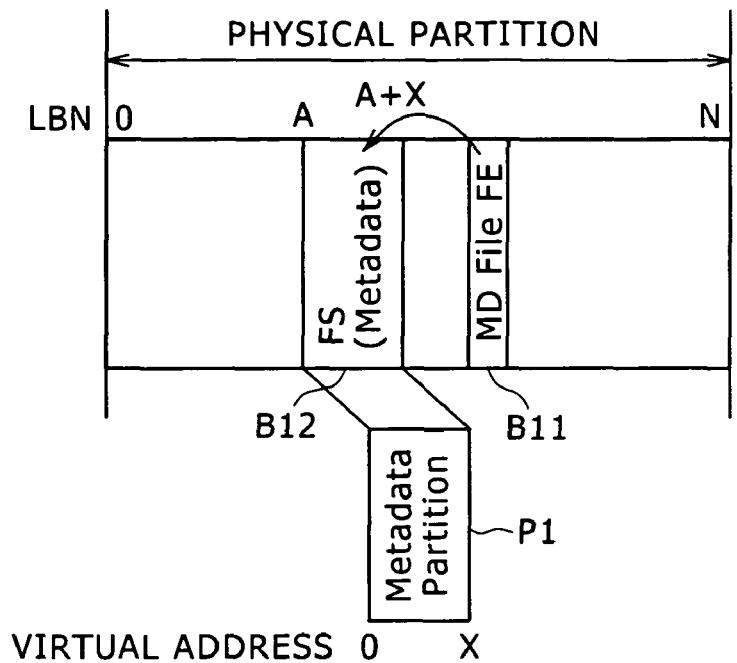
FIG. 10 is an explanatory diagram showing a technique of relocating file-system information at a virtual address.
Figure 11:
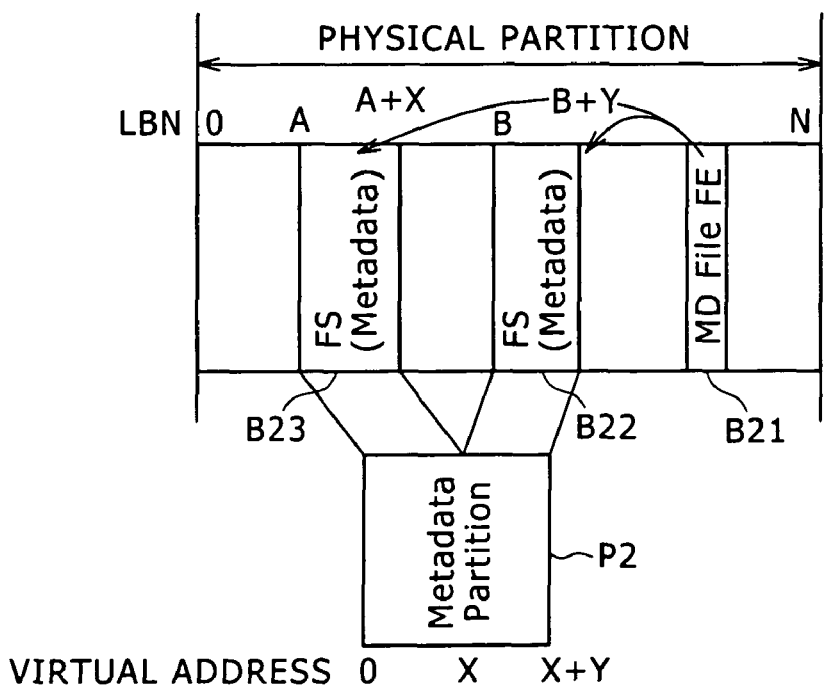
FIG. 11 is an explanatory diagram showing a technique of relocating file-system information at a virtual address.
Figure 12:
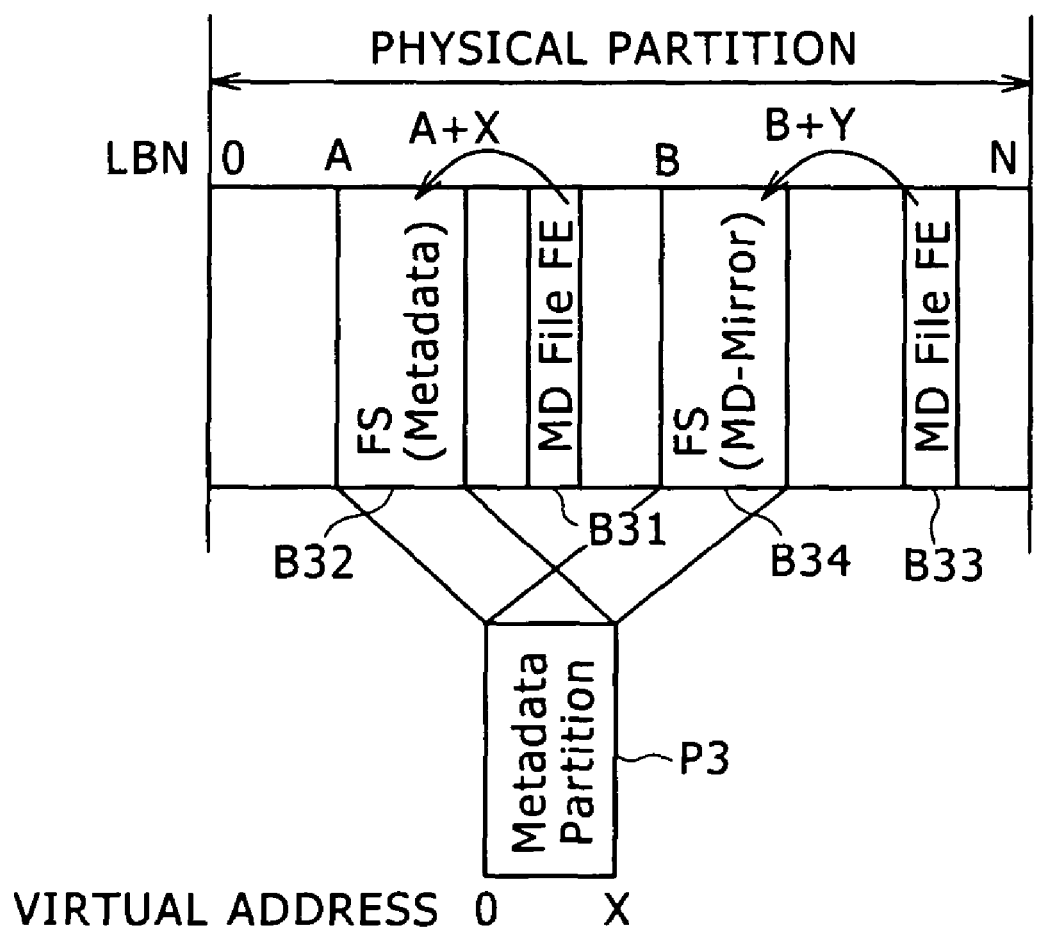
FIG. 12 is an explanatory diagram showing a technique of relocating file-system information at a virtual address.

By referring to FIGS. 10 to 12, the following description explains a technique of relocating file-system information at a virtual address.

The file-system information is relocated as a metadata file at a location identified by an address in an ordinary physical partition used in a file system. Virtual addresses are assigned to the contents of a metadata file with a virtual address of 0 corresponding to the beginning of a partition. Metadata information is constructed in a format referencing the virtual addresses in the metadata partition.

That is to say, by using virtual addresses in the metadata file, it is possible to trace (read out) pieces of information including the File Set Descriptor denoted by reference numeral (11), the root-directory FE (file entry) denoted by reference numeral (12), the BDMV-directory FID (File Identifier Descriptor) denoted by reference numeral (13), the BDMV-directory FE (file entry) denoted by reference numeral (14), the FID (File Identifier Descriptor) of Unit-_Key_Gen_Value.inf accommodated in the BDMV directory and denoted by reference numeral (15) and the file entry of Unit_Key_Gen_Value.inf accommodated in the BDMV directory and denoted by reference numeral (16), which have been explained earlier by referring to FIG. 9.

In the upper diagram of FIG. 10, a block B11 is an area used for recording an MD file FE (Metadata File File-Entry). On the basis of the MD file FE, the file-system information (FS) recorded in a block B12 can be traced. That is to say, the MD file FE recorded in the block B11 indicates that the file-system information (FS) has been recorded in the block B12, which is an area from an address A to an address (A+X) in a physical partition. As shown in the lower diagram of FIG. 10, on the other hand, the file-system information (FS) is recorded in an area P1, which is an area from the virtual address of 0 to a virtual address X in a metadata partition.

A metadata partition can be associated with a plurality of areas in a physical partition. As shown in the upper diagram of FIG. 11, for example, a metadata partition P2 is associated with two areas in a physical partition. One of the areas is a block B23 from an address A to an address (A+X) and the other area is a block B22 from an address B to an address (B+Y). In this case, the MD file FE in the block B21 indicates that the file-system information is recorded in the block B23 from an address A to an address (A+X) and the block B22 from an address B to an address (B+Y). As shown in the lower diagram of FIG. 11, the file-system information is recorded in an area P2 from a virtual address of 0 to a virtual address (X+Y) in a metadata partition.

In addition, an UDF2.50 function can be executed to relocate a metadata file as a double file in order to enhance the reliability of the file-system information. To put it concretely, the metadata file is recorded as two identical metadata files (FS). One of the files is referred to as a main metadata file (main FS) while the other file is referred to as a mirror metadata file (mirror FS).

That is to say, let us assume that a main metadata file containing file-system information is relocated in a block B32 from an address A to an address (A+X) in a physical partition as shown in the upper diagram of FIG. 12. On the other hand, a mirror metadata file containing the same file-system information is relocated in a block B34 from an address B to an address (B+Y) in the physical partition. In this case, the MD file FE in a block B31 indicates that the main metadata file containing file-system information is relocated in the block B32 from the address A to the address (A+X) in the physical partition. In addition, as a main metadata file, file-system information is recorded in an area P3 from a virtual address of 0 to a virtual address X in a metadata partition as shown in the lower diagram of FIG. 12. By the same token, the MD file FE in a block B33 indicates that the mirror metadata file containing the same file-system information is relocated in the block B34 from the address B to the address (B+Y) in the physical partition. In addition, in the same way as the main metadata file described above, as a mirror metadata file, file-system information is recorded in the area P3 from the virtual address of 0 to the virtual address X in the metadata partition as shown in the lower diagram of FIG. 12. By recording the same metadata file in different areas as described above, the reliability of the file-system information can be improved.

Figure 13:
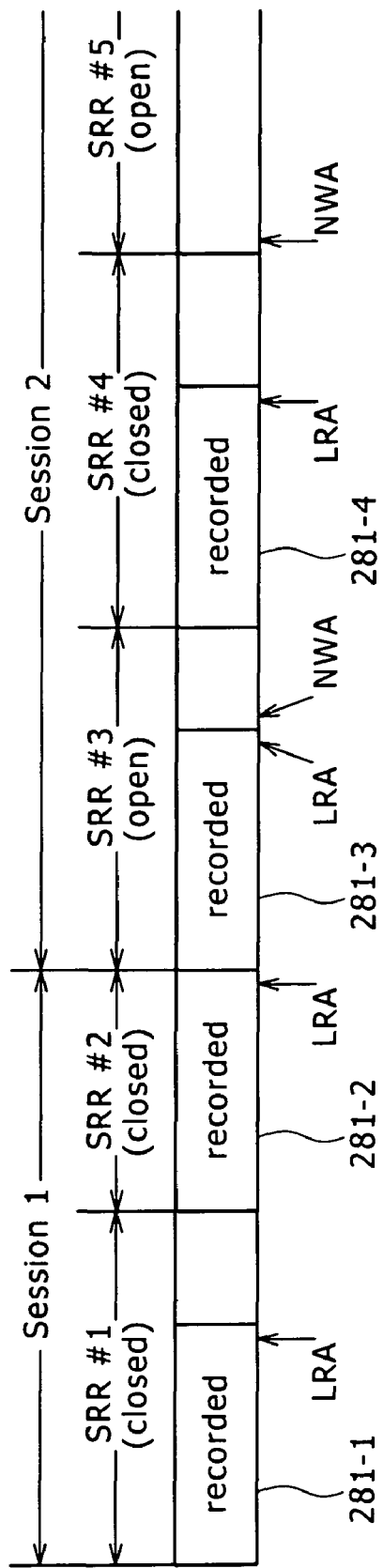
FIG. 13 is an explanatory diagram showing a recording method applied to a BD-R recording medium.

Next, by referring to FIG. 13, the following description explains a recording method provided for a case in which the recording medium 81 is a BD-R. In the recording method applied to the BD-R, there are two recording modes, i.e., a sequential recording mode and a random recording mode.

The sequential recording mode is a mode in which information is recorded sequentially onto a recording medium in a predetermined direction beginning from a recording start position of the recording medium. In the case of a recording medium with a shape resembling a disc, the recording start position is the center of the disc. On the other hand, the random recording mode is a mode in which information is recorded onto a recording medium at a recording location set at random. In the case of a recording medium with a shape resembling a disc, information recorded on the recording medium by adoption of the sequential recording mode can be read out from the recording medium at a speed higher than information recorded on the recording medium by adoption of the random recording mode. This is because, in the case of information already recorded on the recording medium by adoption of the sequential recording mode, the recording locations reflect a relation between preceding information and succeeding information. The following description assumes that information is recorded on a recording medium by adoption of the sequential recording mode. However, the embodiment of the present invention does not limit the mode for recording information onto the recording medium to the sequential recording mode. Instead, the random recording mode can also be adopted as the mode for recording information onto the recording medium.

FIG. 13 is a diagram showing an outline of the sequential recording mode adopted as the mode for recording information onto the BD-R recording medium.

Information is recorded into a user area on the BD-R in session units. In the example shown in FIG. 13, only two sessions, i.e., sessions 1 and 2 have been recorded in the user area. It is needless to say, however, that more sessions can also be recorded. A session includes at least one SRR (Sequential Recording Ranges). In addition, a multi-session recording area may also be resulted in. In this case, however, information can be recorded into only the last set session.

An SRR (Sequential Recording Ranges) includes a plurality of 64 KB clusters, which are each the smallest recording unit of information recorded onto the BD-R. The SRR is a recording unit corresponding to a track in a CD-R (Compact Disc-Recordable) medium. The SRR can be in one of two states, i.e., open and closed states. In an open state, information can be recorded into an SRR. After information is recorded into an SRR, the SRR is put in a closed state allowing no information to be recorded into the SRR. A session can have up to 16 SRRs put in an open state. A maximum of about 7,600 SRRs can be set in a BD-R. In the example shown in FIG. 13, SRRs #1 to #5 have been set and, in areas 281-1 to 281-4 of SRRs #1 to #4, pieces of data have been recorded. The end of each of areas 281-1 to 281-4, in which the pieces of data have been recorded, is referred to as an LRA (Last Recording Allocation) indicating the end recording position. In addition, in the example shown in FIG. 13, SRRs #3 and #5 are each in an open state while the other SRRs are closed. In each of SRRs #3 and #5, the LRA is immediately followed by an NWA (New Writing Allocation), which is the beginning of a free area used for newly recording information in the SRR.

Figure 14:
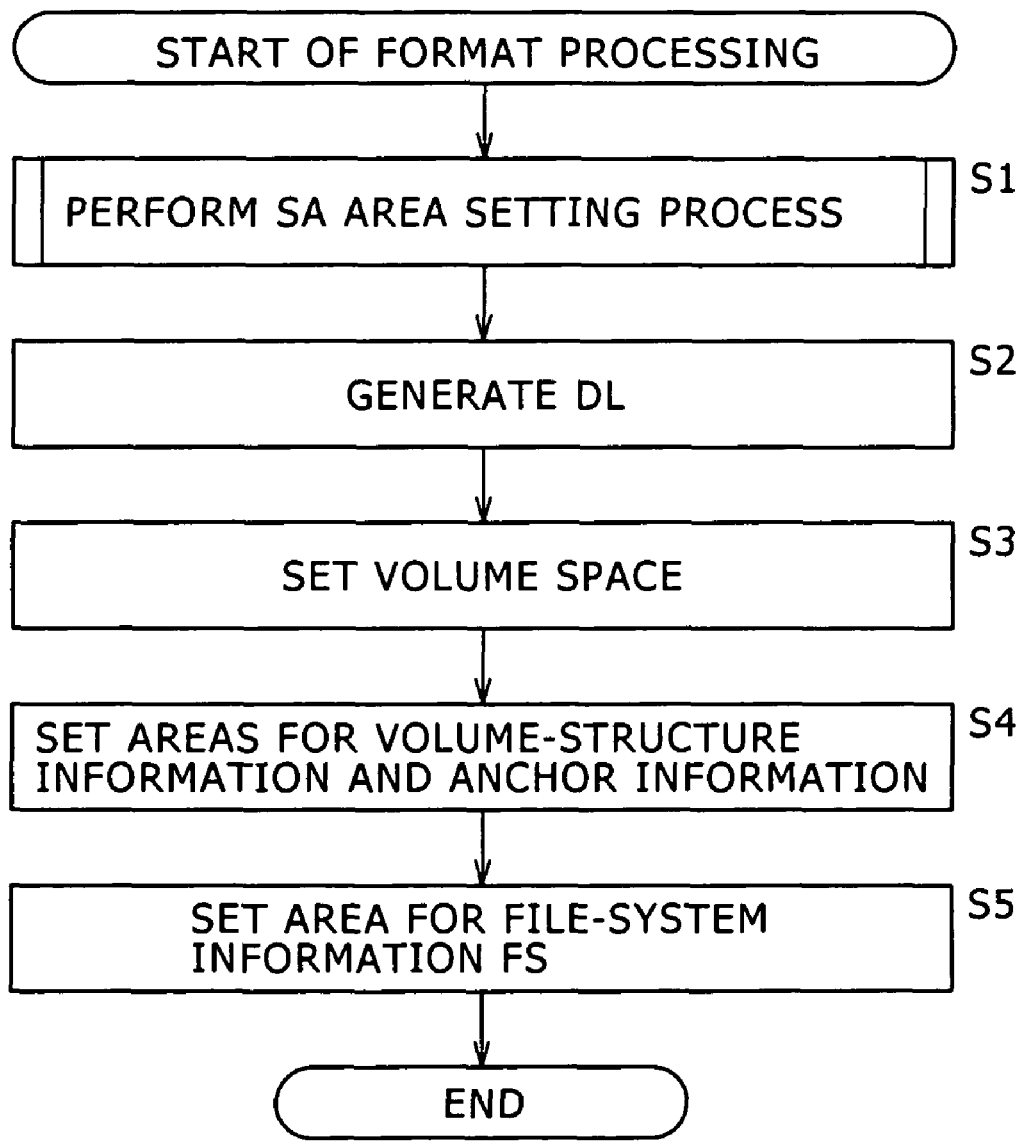
FIG. 14 shows a flowchart referred to in explanation of a formatting process.

Next, processing to format the recording medium 81 is explained by referring to a flowchart shown in FIG. 14.

The flowchart begins with a step S1 at which the initialization section 62a of the file-system information generation section 62 employed in the control section 51 controls the write section 73 to drive the recording/reproduction block 53 to carry out an SA-setting process to set an SA area (Spare Area) on the recording medium 81. Let us assume for example that the recording medium 81 is a single-layer BD-R. In this case, an SA area is set on the edge in a recording area on each of the inner and outer-circumference sides of the recording medium 81 as shown in FIG. 15.

Figure 15:
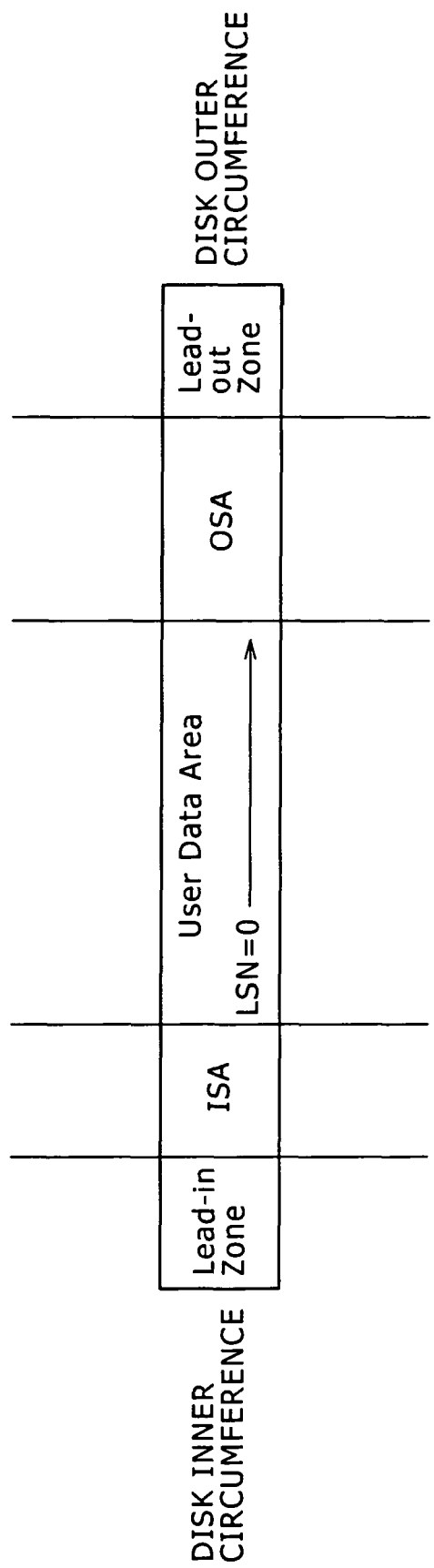
FIG. 15 is an explanatory diagram showing a process to set an SA area.

In the example shown in FIG. 15, the left side is the inner-circumference side of the recording medium 81 and the right side is the outer-circumference side of the recording medium 81. Information is recorded onto the recording medium 81 in the direction from the inner-circumference side to the outer-circumference side. In addition, the recording medium 81 includes a lead-in zone on the edge of the inner-circumference side and a lead-out zone on the edge of the outer-circumference side. The lead-in zone and the lead-out zone are each an area not used for recording information or an area containing no recorded information.

In this case, in particular, the initialization section 62a sets an ISA (inner spare area) as an area adjacent to the lead-in zone and an OSA (outer spare area) as an area adjacent to the lead-out zone. An area between the ISA and the OSA is used as a user area or a user data area. Virtually, various kinds of information are recorded in the user area. Information is thus recorded into the user area in the direction from the inner-circumference side to the outer-circumference side. Accordingly, increasing LSNs (logical Sector Numbers) are set in the direction from the inner-circumference side to the outer-circumference side as shown by an arrow in the figure.

It is to be noted that the sizes of the ISA and the OSA can be set arbitrarily. By setting the sizes of the ISA and the OSA at large values, processing to record information into a damaged cluster as described later can be stabilized. By setting the sizes of the ISA and the OSA at large values, however, the size of a valid area usable for recording information decreases.

Let us assume for example that the recording medium 81 is a double-layer BD-R. In this case, on each of the two layers, an ISA and an OSA are set on the edge in a recording area on each of the inner and outer-circumference sides of the recording medium 81 as shown in FIG. 16.

Figure 16:
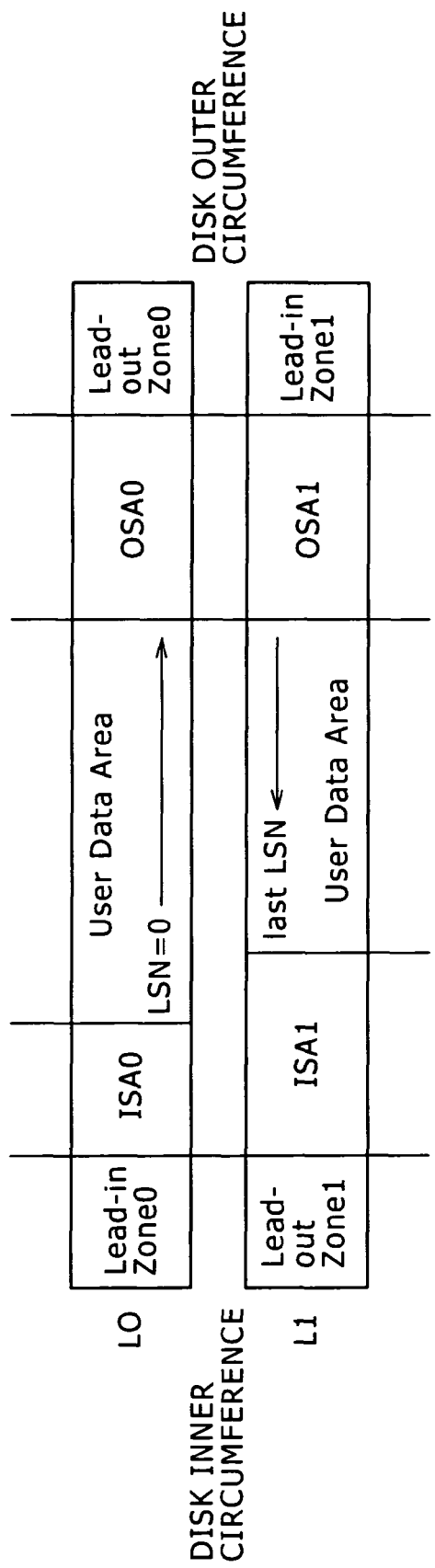
FIG. 16 is an explanatory diagram showing a process to set an SA area.

In an example shown in FIG. 16, the left side is the inner-circumference side of the recording medium 81 and the right side is the outer-circumference side of the recording medium 81. An upper layer L0 shown in the upper diagram of FIG. 16 is the first layer and a lower upper layer L1 shown in the lower diagram of the figure is the second layer.

In the case of the 2-layer BD-R recording medium 81, information is recorded onto the first layer of the recording medium 81 in the direction from the inner-circumference side to the outer-circumference side and the second layer of the recording medium 81 in the direction from the outer-circumference side to the inner-circumference side. The first layer of the recording medium 81 includes a lead-in zone 0 on the edge of the inner-circumference side and a lead-out zone 0 on the edge of the outer-circumference side. As described above, the lead-in zone 0 and the lead-out zone 0 are each an area not used for recording information or an area containing no recorded information. On the other hand, the second layer of the recording medium 81 includes a lead-out zone 1 on the edge of the inner-circumference side and a lead-in zone 1 on the edge of the outer-circumference side. By the same token, the lead-in zone 1 and the lead-out zone 1 are each an area not used for recording information or an area containing no recorded information.

In this case, the initialization section 62a sets an ISA 0 (inner spare area 0) as an area adjacent to the lead-in zone 0 and an OSA 0 (outer spare area 0) as an area adjacent to the lead-out zone 0 on the first layer. An area between the ISA 0 and the OSA 0 is used as a user area or a user data area. Virtually, various kinds of information are recorded in the user area. Information is thus recorded into the user area in the direction from the inner-circumference side to the outer-circumference side. Accordingly, increasing LSNs (Logical Sector Numbers) are set in the direction from the inner-circumference side to the outer-circumference side as shown by an arrow in the figure.

On the other hand, the initialization section 62a sets an ISA 1 (inner spare area 1) as an area adjacent to the lead-out zone 1 and an OSA 1 (outer spare area 1) as an area adjacent to the lead-in zone 1 on the second layer. An area between the ISA 0 and the OSA 0 is used as a user area or a user data area. Virtually, various kinds of information are recorded in the user area. Information is thus recorded into the user area in the direction from the outer-circumference side to the inner-circumference side. Accordingly, increasing LSNs (Logical Sector Numbers) are set in the direction from the outer-circumference side to the inner-circumference side as shown by an arrow in the figure.

It is to be noted that processing to set SA areas including TDMA areas will be described in detail by referring to a flowchart shown in FIG. 46.

Let us refer back to the flowchart shown in FIG. 14 and continue the explanation of the processing to format the recording medium 81.

In a process carried out at a step S2, the initialization section 62a requests the alternation-information management section 63 to generate a DL (Defect List). At this request, the alternation-information management section 63 generates a DL and stores the DL in the memory 63a. It is to be noted that, at this stage, the DL does not include any information.

Then, in a process carried out at the next step S3, the initialization section 62a controls the write section 73 in order to drive the recording/reproduction block 53 to set a volume space on the recording medium 81. That is to say, as shown in the upper diagram of FIG. 18, for example, a volume space is set. It is to be noted that FIG. 18 shows examples for a case in which the recording medium 81 is a single-layer BD-R.

Subsequently, in a process carried out at the next step S4, the initialization section 62a controls the write section 73 in order to drive the recording/reproduction block 53 to set a volume structure area used for storing information on the structure of the volume and an anchor area used for storing anchor information. In the upper diagram of FIG. 18, the volume structure area is indicated by the words 'Volume Str.' and the anchor area is indicated by the word 'Anchor'. It is to be noted that, in the example shown in FIG. 18, the same file-system information is stored at two locations. Thus, a volume structure area and anchor area corresponding to the main FS area and a volume structure area and anchor area corresponding to the mirror FS area are set. The volume structure area and anchor area corresponding to the main FS area are a volume structure area indicated by the words 'Volume Str.' and an anchor area indicated by the word 'Anchor' in a block B111 shown in the figure. On the other hand, the volume structure area and anchor area corresponding to the mirror FS area are a volume structure area indicated by the words 'Volume Str.' and an anchor area indicated by the word 'Anchor' in a block B113 shown in the figure.

Then, in a process carried out at the next step S5, the initialization section 62a controls the write section 73 in order to drive the recording/reproduction block 53 to set an FS area on the recording medium 81 as an area to be used for recording file-system information. That is to say, an area indicated by notation FS in the upper diagram of FIG. 18 to be described later is set. It is to be noted that, in the example shown in FIG. 18, the same file-system information is stored at two locations. Thus, a main FS area and a mirror FS area are set. In the figure, the main FS area is an area indicated by the words FS (Metadata) in the block B111. On the other hand, the mirror FS area is an area indicated by the words FS (MD-Mirror) in the block B113.

Figure 18:
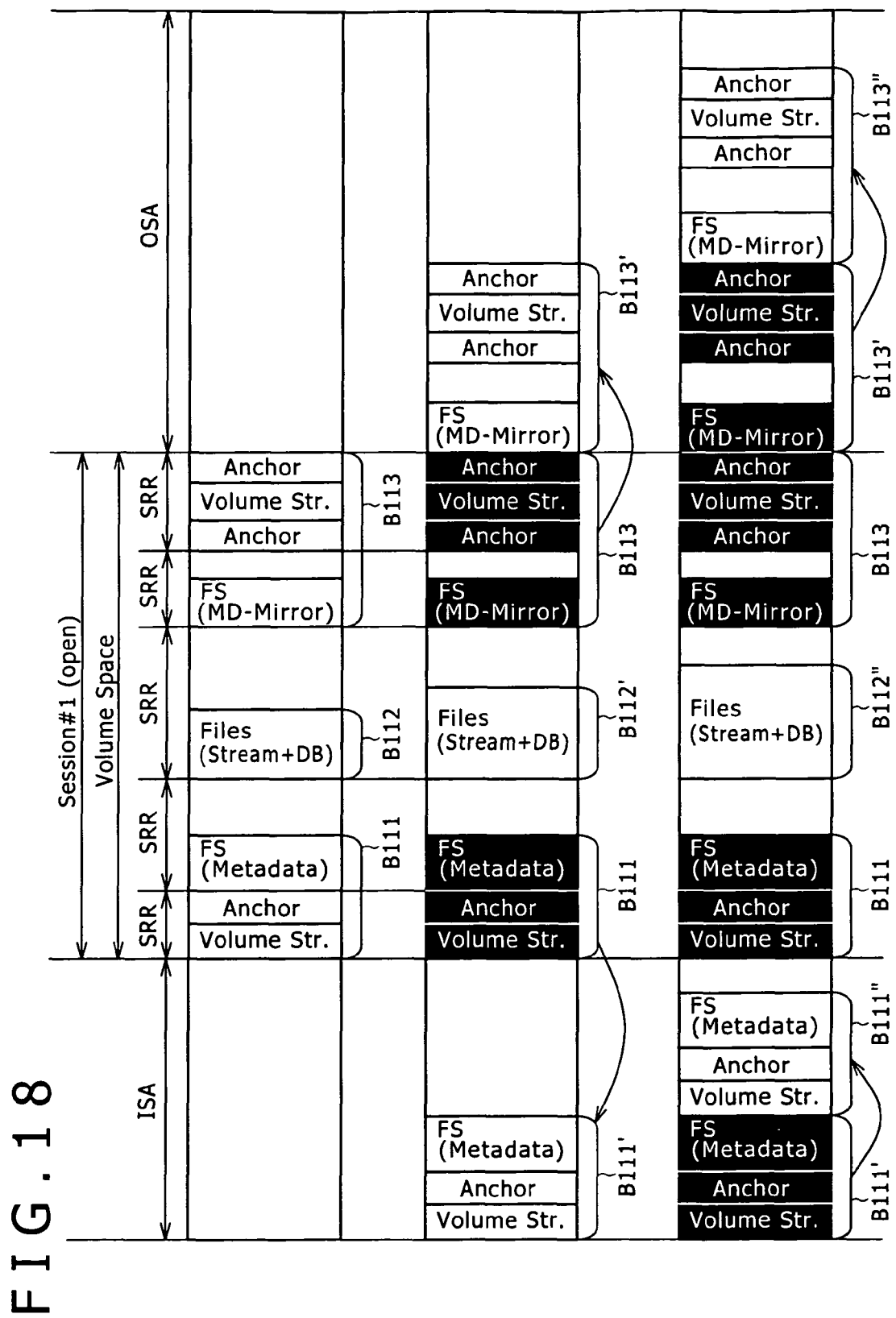
FIG. 18 is an explanatory diagram showing write processing carried out by the recording/reproduction mechanism section shown in FIG. 3.

It is to be noted that, in the example shown in FIG. 18, pieces of information are laid out, each being recorded in an SRR. From the left side, the pieces of information are inner-circumference-side information on the structure of the volume, anchor information on the inner-circumference side, a main FS, files (Stream+DB), a mirror FS, outer-circumference-side information on the structure of the volume and anchor information on the outer-circumference side.

By carrying out the processed described above, an ISA, an OSA, a volume space, anchor areas, areas each used for recording information on the structure of the volume and FS areas are set on the recording medium 81. The ISA and the OSA are each an area used as alternate sectors. It is to be noted that, in the formatting processing, only the areas described above are set. Virtually, no information is written into the set areas. The main FS indicated as the FS (Metadata) in the figure and the mirror FS indicated as the FS (MD-Mirror) can be swapped with each other. In addition, it is also possible to set only one FS. In this case, the FS can be set on the inner-circumference side or the outer-circumference side.

Figure 17:
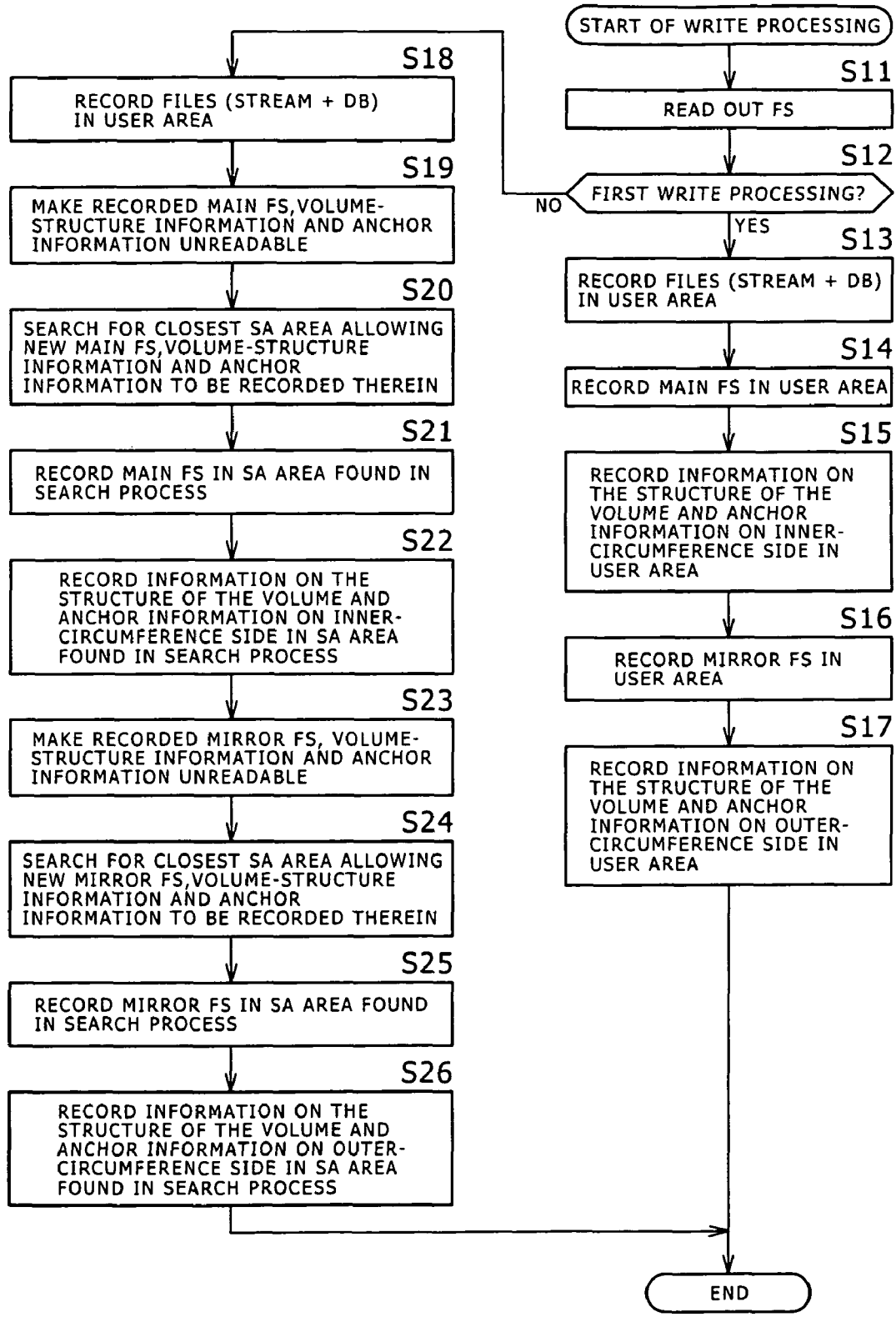
FIG. 17 shows a flowchart referred to in explanation of write processing carried out by the recording/reproduction mechanism section shown in FIG. 3.

Next, by referring to a flowchart shown in FIG. 17, the following description explains processing to write information onto the recording medium 81, which has been formatted (or initialized) in a process carried out by the recording/reproduction mechanism section 22 shown in FIG. 3 as represented by the flowchart shown in FIG. 14.

The flowchart shown in FIG. 17 begins with a step S11 at which the file-system information generation section 62 generates file-system information on the basis of information such as the attribute of a file, in which information is to be incrementally recorded, or a file to be updated and fetches the generated file-system information.

Then, in a process carried out at the next step S12, the file-system information generation section 62 produces a result of determination as to whether or not this write processing is being carried out for the first time.

If the determination result produced in the process carried out at the step S12 indicates that this write processing is being carried out for the first time, the flow of the processing goes on to a step S13 at which the file-system information generation section 62 drives the recording/reproduction block 53 to write files referred to as files (Stream+DB) in FIG. 18 into the user area on the recording medium 81. The written files are files supplied to the write section 73 from the ECC encoding section 71 by way of the modulation section 72. The files (Stream+DB) are a file containing stream data and a file containing a database used for controlling the stream data.

To be more specific, as shown in the upper diagram of FIG. 18, the file-system information generation section 62 drives the recording/reproduction block 53 to write the files (Stream+DB) shown in the figure as files supplied to the write section 73 from the ECC encoding section 71 by way of the modulation section 72 into a block B112 set on the recording medium 81 in the formatting processing. It is to be noted that, as described earlier, FIG. 18 shows a typical case in which the recording medium 81 is a single-layer BD-R.

Then, in a process carried out at the next step S14, the file-system information generation section 62 drives the recording/reproduction block 53 to write a main FS supplied to the write section 73 from the ECC encoding section 71 by way of the modulation section 72 into the user area set on the recording medium 81.

To be more specific, as shown in the upper diagram of FIG. 18, the file-system information generation section 62 drives the recording/reproduction block 53 to write an FS (Metadata) shown in the figure as file-system information supplied to the write section 73 from the ECC encoding section 71 by way of the modulation section 72 into a block B111 set on the recording medium 81 in the formatting processing as an area used for recording a main FS.

Then, in a process carried out at the next step S15, the file-system information generation section 62 drives the recording/reproduction block 53 to write inner-circumference-side information on the structure of the volume and anchor information on the inner-circumference side into the user area set on the recording medium 81. The inner-circumference-side information on the structure of the volume and anchor information on the inner-circumference side are pieces of information supplied to the write section 73 from the ECC encoding section 71 by way of the modulation section 72.

To be more specific, as shown in the upper diagram of FIG. 18, the file-system information generation section 62 drives the recording/reproduction block 53 to write 'Volume Str.' and 'Anchor' shown in the figure as respectively the inner-circumference-side information on the structure of the volume and the anchor information on the inner-circumference side into a block B111 set on the recording medium 81 in the formatting processing as an area used for recording inner-circumference-side information on the structure of the volume and anchor information on the inner-circumference side. The inner-circumference-side information on the structure of the volume and anchor information on the inner-circumference side are pieces of information are supplied to the write section 73 from the ECC encoding section 71 by way of the modulation section 72 as pieces of information corresponding to the main FS.

Then, in a process carried out at the next step S16, the file-system information generation section 62 drives the recording/reproduction block 53 to write a mirror FS supplied to the write section 73 from the ECC encoding section 71 by way of the modulation section 72 into the user area set on the recording medium 81.

To be more specific, as shown in the upper diagram of FIG. 18, the file-system information generation section 62 drives the recording/reproduction block 53 to write an FS (MD-Mirror) shown in the figure as file-system information supplied to the write section 73 from the ECC encoding section 71 by way of the modulation section 72 into a block B113 set on the recording medium 81 in the formatting processing as an area used for recording a mirror FS.

Then, in a process carried out at the next step S17, the file-system information generation section 62 drives the recording/reproduction block 53 to write outer-circumference-side information on the structure of the volume and anchor information on the outer-circumference side into the user area set on the recording medium 81. The outer-circumference-side information on the structure of the volume and the anchor information on the outer-circumference side are pieces of information supplied to the write section 73 from the ECC encoding section 71 by way of the modulation section 72.

To be more specific, as shown in the upper diagram of FIG. 18, the file-system information generation section 62 drives the recording/reproduction block 53 to write 'Volume Str.' and two 'Anchor's shown in the figure as respectively the outer-circumference-side information on the structure of the volume and the anchor information on the outer-circumference side into a block B113 set on the recording medium 81 in the formatting processing as an area used for recording outer-circumference-side information on the structure of the volume and anchor information on the outer-circumference side. The outer-circumference-side information on the structure of the volume and the anchor information on the outer-circumference side are pieces of information supplied to the write section 73 from the ECC encoding section 71 by way of the modulation section 72 as pieces of information corresponding to the mirror FS.

If the determination result produced in the process carried out at the step S12 indicates that this write processing was carried out at least once before at the steps S13 to S17, on the other hand, the flow of the processing goes on to a step S18.

In a process carried out at the step S18, the file-system information generation section 62 drives the recording/reproduction block 53 to write files referred to as files (Stream+ DB) into the user area on the recording medium 81. The written files are files supplied to the write section 73 from the ECC encoding section 71 by way of the modulation section 72. The files (Stream+DB) are a file containing stream data and a file containing a database used for controlling the stream data.

To be more specific, as shown in the middle diagram of FIG. 18, the file-system information generation section 62 drives the recording/reproduction block 53 to write the files (Stream+DB) shown in the figure as files supplied to the write section 73 from the ECC encoding section 71 by way of the modulation section 72 into a block B112' set on the recording medium 81 in the formatting processing, for example, if information has been recorded like in the processing state shown in the upper diagram of FIG. 18. To put it in more detail, in a process to incrementally record information in an already existing file, the file-system information generation section 62 incrementally records new additional information in the block B112' shown in the middle diagram of FIG. 18, adding the new information to the information already recorded in the block B112 shown in the upper diagram of FIG. 18. In a process to record a file containing new information as an update of the information already recorded in the block B112 shown in the upper diagram of FIG. 18, on the other hand, the file already recorded in the block B112 is put in a state of being unreadable and information to be recorded into the block B112' is constructed as a newly updated file to be recorded in the block B112' adjacent to the block B112.

Then, in a process carried out at the next step S19, the file-system information generation section 62 controls the write section 73 through the ECC encoding section 71 and the modulation section 72 to put the main FS referred to as an FS (Metadata), the information on the structure of the volume and the anchor information in a state of being unreadable by the recording/reproduction block 53 out from the recording medium 81.

To be more specific, the file-system information generation section 62 puts the main FS referred to as an FS (Metadata), the information on the structure of the volume and the anchor information in a state of being unreadable by the recording/ reproduction block 53 out from the recording medium 81. The main FS referred to as an FS (Metadata), the information on the structure of the volume and the anchor information are pieces of information already recorded in the block B111 as shown in the middle diagram of FIG. 18. It is to be noted that, in the diagrams shown in FIG. 18, an area put in a state of being unreadable by the recording/reproduction block 53 out from the recording medium 81 is shown as a black box marked with white characters. An unreadable area mentioned in the following description is also shown in figures as such a black box.

Then, in a process carried out at the next step S20, the file-system information generation section 62 searches the recording area for a closest SA area allowing new information to be recorded therein. The new information to be recorded into the closest SA area is a main FS referred to as an FS (Metadata), information on the structure of the volume and anchor information. The main FS referred to as an FS (Metadata), the information on the structure of the volume and the anchor information are pieces of information generated in a process carried out at the step S19 to incrementally record information in an already existing file or update an already existing file.

To be more specific, in the case of a single-layer BR-D, an SA area is an area in either the OSA provided on the outer-circumference side of the disk or the ISA provided on the inner-circumference side of the disk. In the example shown in the middle diagram of FIG. 18, for example, the closest SA area found in the search process is an ISA area. Thus, the file-system information generation section 62 selects the area in the ISA to be used for recording the main FS referred to as an FS (Metadata), the information on the structure of the volume and the anchor information as shown in the middle diagram of FIG. 18.

Then, in a process carried out at the next step S21, the file-system information generation section 62 supplies the main FS to the write section 73 by way of the ECC encoding section 71 and the modulation section 72 to be recorded by the recording/reproduction block 53 in an SA area found in the search process carried out at the step S20.

To be more specific, as shown in the middle diagram of FIG. 18, the file-system information generation section 62 supplies the main FS to the write section 73 by way of the ECC encoding section 71 and the modulation section 72 to be recorded in a block B111' of an SA area on the recording medium 81.

Then, in a process carried out at the next step S22, the file-system information generation section 62 supplies the inner-circumference-side information on the structure of the volume and the anchor information on the inner-circumference side to the write section 73 by way of the ECC encoding section 71 and the modulation section 72 as pieces of information corresponding to the main FS to be recorded by the recording/reproduction block 53 in an SA area found in the search process carried out at the step S20.

To be more specific, the file-system information generation section 62 supplies the inner-circumference-side information on the structure of the volume and the anchor information on the inner-circumference side to the write section 73 by way of the ECC encoding section 71 and the modulation section 72 to be recorded in the block B111' of an SA area on the recording medium 81 as shown in the middle diagram of FIG. 18.

Then, in a process carried out at the next step S23, the file-system information generation section 62 controls the write section 73 through the ECC encoding section 71 and the modulation section 72 to put the outer-circumference-side mirror FS referred to as an FS (MD-Mirror), the outer-circumference-side information on the structure of the volume and the anchor information on the outer-circumference side in a state of being unreadable by the recording/reproduction block 53 out from the recording medium 81.

To be more specific, the file-system information generation section 62 puts the mirror FS referred to as an FS (MD-Mirror), the information on the structure of the volume and the anchor information in a state of being unreadable by the recording/reproduction block 53 out from the recording medium 81. The mirror FS referred to as an FS (MD-Mirror), the information on the structure of the volume and the anchor information are pieces of information already recorded in the block B113 as shown in the middle diagram of FIG. 18.

Then, in a process carried out at the next step S24, the file-system information generation section 62 searches the recording area for a closest SA area allowing new information to be recorded therein. The new information to be recorded into the closest SA area is a mirror FS referred to as an FS (MD-Mirror), outer-circumference-side information on the structure of the volume and anchor information on the outer-circumference side. The mirror FS referred to as an FS (MD-Mirror), outer-circumference-side information on the structure of the volume and anchor information on the outer-circumference side are pieces of information already generated in a process carried out at the step S23.

To be more specific, in the case of a single-layer BR-D, an SA area is an area in either the OSA provided on the outer-circumference side of the disk or the ISA provided on the inner-circumference side of the disk. In the example shown in the middle diagram of FIG. 18, for example, the closest SA area found in the search process is an OSA area. Thus, the file-system information generation section 62 selects the area in the OSA as an area to be used for recording the mirror FS referred to as an FS (MD-Mirror), the outer-circumference-side information on the structure of the volume and the anchor information on the outer-circumference side as shown in the middle diagram of FIG. 18.

Then, in a process carried out at the next step S25, the file-system information generation section 62 supplies the mirror FS to the write section 73 by way of the ECC encoding section 71 and the modulation section 72 to be recorded by the recording/reproduction block 53 in an SA area found in the search process carried out at the step S24.

To be more specific, the file-system information generation section 62 supplies the mirror FS to the write section 73 by way of the ECC encoding section 71 and the modulation section 72 to be recorded in a block B113' in the OSA on the recording medium 81 as shown in the middle diagram of FIG. 18.

Then, in a process carried out at the next step S26, the file-system information generation section 62 supplies the outer-circumference-side information on the structure of the volume and the anchor information on the outer-circumference side to the write section 73 by way of the ECC encoding section 71 and the modulation section 72 to be recorded by the recording/reproduction block 53 in an SA area found in the search process carried out at the step S24. The outer-circumference-side information on the structure of the volume and the anchor information on the outer-circumference side are pieces of information corresponding to the mirror FS.

To be more specific, the file-system information generation section 62 supplies the outer-circumference-side information on the structure of the volume and the anchor information on the outer-circumference side to the write section 73 by way of the ECC encoding section 71 and the modulation section 72 to be recorded in the block B113' in the OSA on the recording medium 81 as shown in the middle diagram of FIG. 18.

In a process to add information to a file already recorded on the recording medium 81 as described above by referring to the middle diagram of FIG. 18 or update an already existing file shown in the middle diagram of FIG. 18, on the other hand, at the step S18, as shown in the lower diagram of FIG. 18, the file-system information generation section 62 drives the recording/reproduction block 53 to write the files (Stream+DB) shown in the figure as files supplied to the write section 73 from the ECC encoding section 71 by way of the modulation section 72 into the block B112", which has been set on the recording medium 81 in the formatting processing, as shown in the lower diagram of FIG. 18. To put it in more detail, in a process to incrementally record information in an already existing file, the file-system information generation section 62 incrementally records new additional information in the block B112" shown in the lower diagram of FIG. 18, adding the new information to the information already recorded in the block B112' shown in the middle diagram of FIG. 18. In a process to record a file containing new information as an update of the information already recorded in the block B112' shown in the middle diagram of FIG. 18, on the other hand, the file already recorded in the block B112' is put in a state of being unreadable and information to be recorded into the block B112" is constructed as a newly updated file to be recorded in the block B112" adjacent to the block B112'.

Then, in a process carried out at the next step S19, as shown in the lower diagram of FIG. 18, the file-system information generation section 62 puts the main FS referred to as an FS (Metadata), the information on the structure of the volume and the anchor information in a state of being unreadable by the recording/reproduction block 53 out from the recording medium 81. The main FS referred to as an FS (Metadata), the information on the structure of the volume and the anchor information are pieces of information already recorded in the block B111'.

Then, in a process carried out at the next step S20, in the case of the example shown in the lower diagram of FIG. 18, for example, the file-system information generation section 62 searches the recording area for a closest SA area allowing new information to be recorded therein. The new information to be recorded into the closest SA area is a new main FS referred to as an FS (Metadata), new information on the structure of the volume and new anchor information. If the closest SA area is an area in the ISA, the file-system information generation section 62 selects the area in the ISA as the closest SA area to be used for recording the new main FS referred to as an FS (Metadata), the new information on the structure of the volume and the new anchor information.

Then, in a process carried out at the next step S21, in the case of the example shown in the lower diagram of FIG. 18, the file-system information generation section 62 supplies the main FS to the write section 73 by way of the ECC encoding section 71 and the modulation section 72 to be recorded in a block B111" of an ISA area on the recording medium 81.

Then, in a process carried out at the next step S22, in the case of the example shown in the lower diagram of FIG. 18, the file-system information generation section 62 supplies the information on the structure of the volume and the anchor information to the write section 73 by way of the ECC encoding section 71 and the modulation section 72 to be recorded in the block B111" of an ISA area on the recording medium 81.

Then, in a process carried out at the next step S23, in the case of the example shown in the lower diagram of FIG. 18, the file-system information generation section 62 puts the mirror FS referred to as an FS (MD-Mirror), the information on the structure of the volume and the anchor information in a state of being unreadable by the recording/reproduction block 53 out from the recording medium 81 as shown in the lower diagram of FIG. 18. The mirror FS referred to as an FS (MD-Mirror), the information on the structure of the volume and the anchor information are pieces of information already recorded in the block B113' as shown in the middle diagram of FIG. 18.

Then, in a process carried out at the next step S24, in the case of the example shown in the lower diagram of FIG. 18, the file-system information generation section 62 searches the recording area for a closest SA area allowing new information to be recorded therein. The new information to be recorded into the closest SA area is a mirror FS referred to as an FS (MD-Mirror), information on the structure of the volume and anchor information. If the closest SA area is an area in the OSA, the file-system information generation section 62 selects the area in the OSA as the closest SA area to be used for recording the new mirror main FS referred to as an FS (MD-Mirror), the new information on the structure of the volume and the new anchor information.

Then, in a process carried out at the next step S25, in the case of the example shown in the lower diagram of FIG. 18, the file-system information generation section 62 supplies the mirror FS to the write section 73 by way of the ECC encoding section 71 and the modulation section 72 to be recorded in a block B113" in the OSA on the recording medium 81.

Then, in a process carried out at the next step S26, in the case of the example shown in the lower diagram of FIG. 18, the file-system information generation section 62 supplies the information on the structure of the volume and the anchor information to the write section 73 by way of the ECC encoding section 71 and the modulation section 72 to be recorded in the block B113" in the OSA on the recording medium 81.

In a process to add information to a file already recorded on the recording medium 81 or update the file, updates of the file-system information, the anchor information and the information on the structure of the volume are sequentially recorded into alternate sectors of an SA area instead of original sectors. Thus, a process to record a file onto the recording medium 81 can be carried out without changing the logical addresses of the file-system information, the anchor information and the information on the structure of the volume in spite of the fact that the file-system information, the anchor information and the information on the structure of the volume are sequentially recorded at the alternate sectors physically different from the original sectors. Thus, it is no longer necessary to change the logical addresses of information such as the file-system information, the anchor information and the information on the structure of the volume in every process to add information to a file already recorded on the recording medium 81 or update the file. As a result, even for a recording medium allowing no overwriting of data on the same location as is the case with a write-once recording medium, information that must be recorded at a fixed location in the logical-address space appears like information treatable in a way as if overwriting were permitted.

It is to be noted that the information-recording processes carried out at the steps S13 to S18 as well as the steps S21, S22, S25 and S26 of the flowchart shown in FIG. 17 will be described in more detail later.

The example described above is a typical case in which the file-system information is recorded by sequentially writing new updates of the information. For example, it is also possible to provide a configuration in which only a difference between file-system information before updating and file-system information after the updating is recorded into an SA area. An example of such a difference is information in a changed directory. In such a case, the post-updating file-system information on the recording medium 81 can be generated from the file-system information before the updating and the difference. As a result, the amount of information recorded in an SA area can be reduced.

In addition, in the processes carried out at the steps S20 and S24, the recording area is searched for a closest SA area allowing file-system information, anchor information and information on the structure of the volume to be recorded therein. In actuality, an SA area closest to the present location on the recording medium 81 is known in advance to a certain degree. Thus, pieces information on closest areas can be collected in a table or the like and, such a table can be generated in the formatting process so that the table can be used in a process to find out a closest SA area. By using such a table or the like, the process to search the recording area for a closest SA area can be completed in a shorter period of time.

In addition, the above description exemplifies a case in which the recording medium 81 is a single-layer BD-R. However, even if the recording medium 81 is a double-layer BD-R, for example, file-system information, anchor information and information on the structure of the volume can be recorded. In a process to search the recording area for a closest SA area, the closest SA area can be an area on the other layer as long as the distance to the closest SA area is physically shortest. That is to say, if file-system information, anchor information as well as information on the structure of the volume can be recorded and the closest SA area on the second layer is found physically closer than the closest SA area on the first layer in a process to search the recording area for a closest SA area, the closest SA area on the second layer is selected. By selecting the closest SA area in this way, the updated file-system information, the updated anchor information as well as the updated information on the structure of the volume can be read out fast from the closest area.

On top of that, the above description exemplifies a case in which a main FS and its mirror FS are both recorded in an SA area. In this case, a main FS and its mirror FS are both recorded in an SA area every time new information is incrementally recorded in an already existing file or an already existing file is updated. It is thus necessary to allocate an area in the ISA or the OSA as an area used for recording the main FS and its mirror FS so that, in consequence, it is feared that the size of the user area on the recording medium 81 is limited to a small value.

In order to solve the above problem, only the main FS or its mirror FS can be recorded in an SA area.

Figure 19:
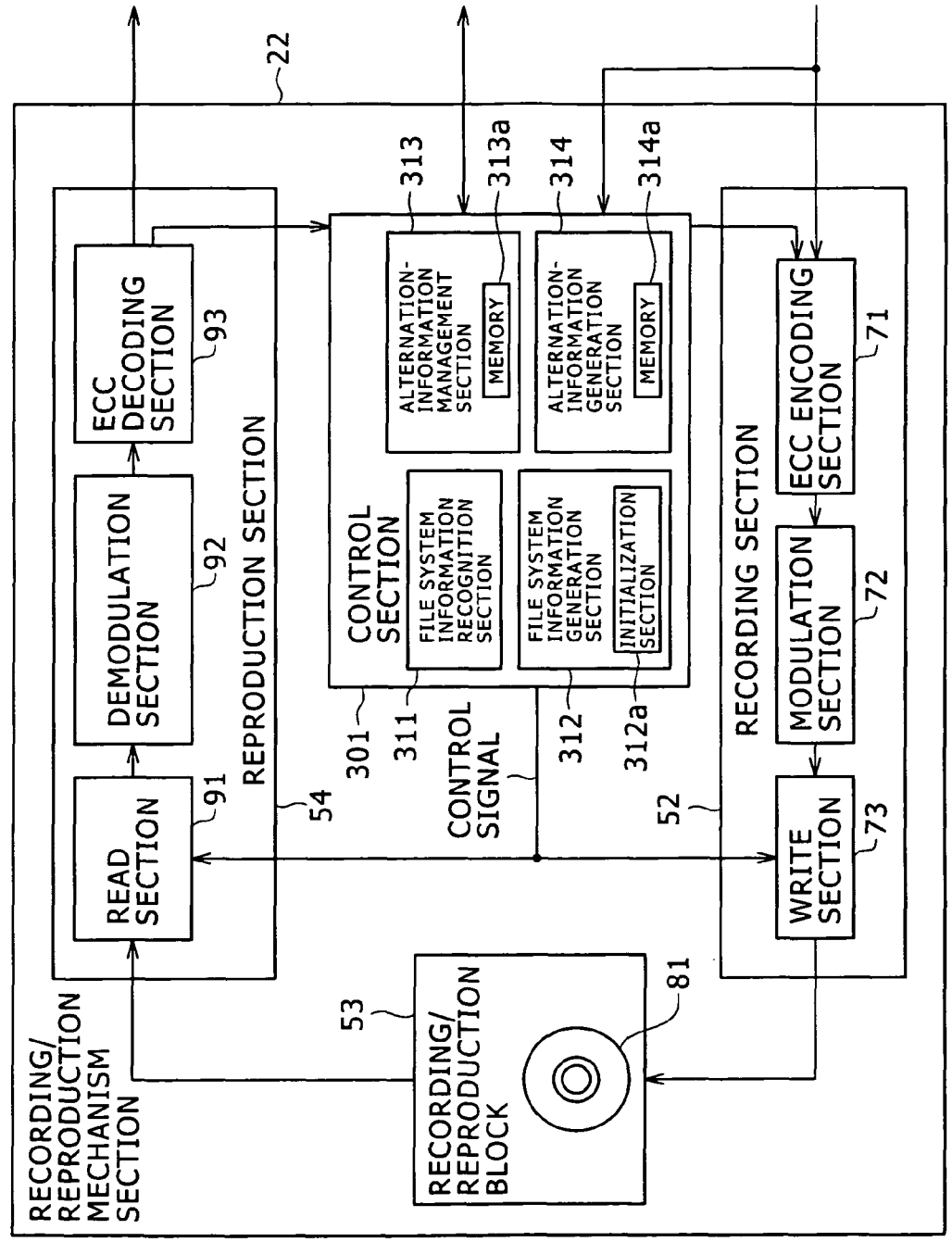
FIG. 19 is an explanatory diagram showing another configuration of the recording/reproduction mechanism section.

FIG. 19 is a diagram showing the configuration of the recording/reproduction mechanism section 22 in which only a mirror FS and inner-circumference-side file-system information, anchor information on the inner-circumference side as well as inner-circumference-side structure-volume information, which correspond to the mirror FS, are written into an SA area. It is to be noted that every component included in the recording/reproduction mechanism section 22 shown in FIG. 19 as a component identical with its counterpart employed in the recording/reproduction mechanism section 22 shown in FIG. 3 is denoted by the same reference numeral as the counterpart and the explanation of the component is properly omitted.

The configuration of the recording/reproduction mechanism section 22 shown in FIG. 19 is different from the configuration of the recording/reproduction mechanism section 22 shown in FIG. 3 in that the recording/reproduction mechanism section 22 shown in FIG. 19 employs a control section 301 as a substitute for the control section 51 employed in the recording/reproduction mechanism section 22 shown in FIG. 3. The control section 301 is different from the control section 51 in that the control section 301 employs a file-system information recognition section 311 as a substitute for the file-system information recognition section 61 employed in the control section 51, a file-system information generation section 312 as a substitute for the file-system information generation section 62 employed in the control section 51, an alternation-information management section 313 as substitute for the alternation-information management section 63 employed in the control section 51 and an alternation-information generation section 314 as a substitute for the alternation-information generation section 64 employed in the control section 51.

Basic functions of the file-system information recognition section 311 are the same as those of the file-system information recognition section 61 except that, in a process to recognize file-system information, the file-system information recognition section 311 reads out a mirror FS, inner-circumference-side information on the structure of the volume as well as anchor information on the inner-circumference side always from fixed logical addresses and a main FS, outer-circumference-side information on the structure of the volume as well as anchor information on the outer-circumference side from the user area.

Basic functions of the file-system information generation section 312 are the same as those of the file-system information generation section 62 except that, in a process to incrementally record information in an already existing file or update an already existing file, the file-system information generation section 312 records a main FS, outer-circumference-side information on the structure of the volume side as well as anchor information on the outer-circumference side into the user area and a mirror FS, inner-circumference-side information on the structure of the volume as well as anchor information on the inner-circumference side into an SA area.

Basic functions of an initialization section 312a employed in the file-system information generation section 312 are the same as those of the initialization section 62a employed in the file-system information generation section 62 except that, in the formatting process, the initialization section 312a swaps the locations of the mirror FS and the main FS with each other as well as the locations of the information on the inner side and the information on the outer side with each other. To be more specific, as shown in the upper diagram of FIG. 21 to be described later, the anchor information and information on the structure of the volume corresponding to the mirror FS is set in a block B131 whereas the anchor information and information on the structure of the volume corresponding to the main FS is set in a block B133. It is to be noted that, in the example shown in FIG. 21, the inner-circumference-side information on the structure of the volume, the anchor information on the inner-circumference side, the main FS, a file, the mirror FS, the outer-circumference-side information on the structure of the volume and the anchor information on the outer-circumference side are each set in an SRR.

As described above, in a process to incrementally record information in an already existing file or update an already existing file in this example, only the mirror FS, the inner-circumference-side information on the structure of the volume and the anchor information on the inner-circumference side are recorded in an SA area, but the main FS, the outer-circumference-side information on the structure of the volume and the anchor information on the outer-circumference side are recorded in the user area. It is to be noted, however, that the mirror FS, the inner-circumference-side information on the structure of the volume and the anchor information on the inner-circumference side can also be recorded in the user area, while the main FS, the outer-circumference-side information on the structure of the volume and the anchor information on the outer-circumference side are recorded in an SA area.

It is also worth noting that the alternation-information management section 313, a memory 313a, the alternation-information generation section 314 and a memory 314a are identical respectively with the alternation-information management section 63, the memory 63a, the alternation-information generation section 64 and the memory 64a, which are employed in the recording/reproduction apparatus 22 shown in FIG. 3 so that explanations of the alternation-information management section 313, the memory 313a, the alternation-information generation section 314 and the memory 314a are omitted.

Figure 20:
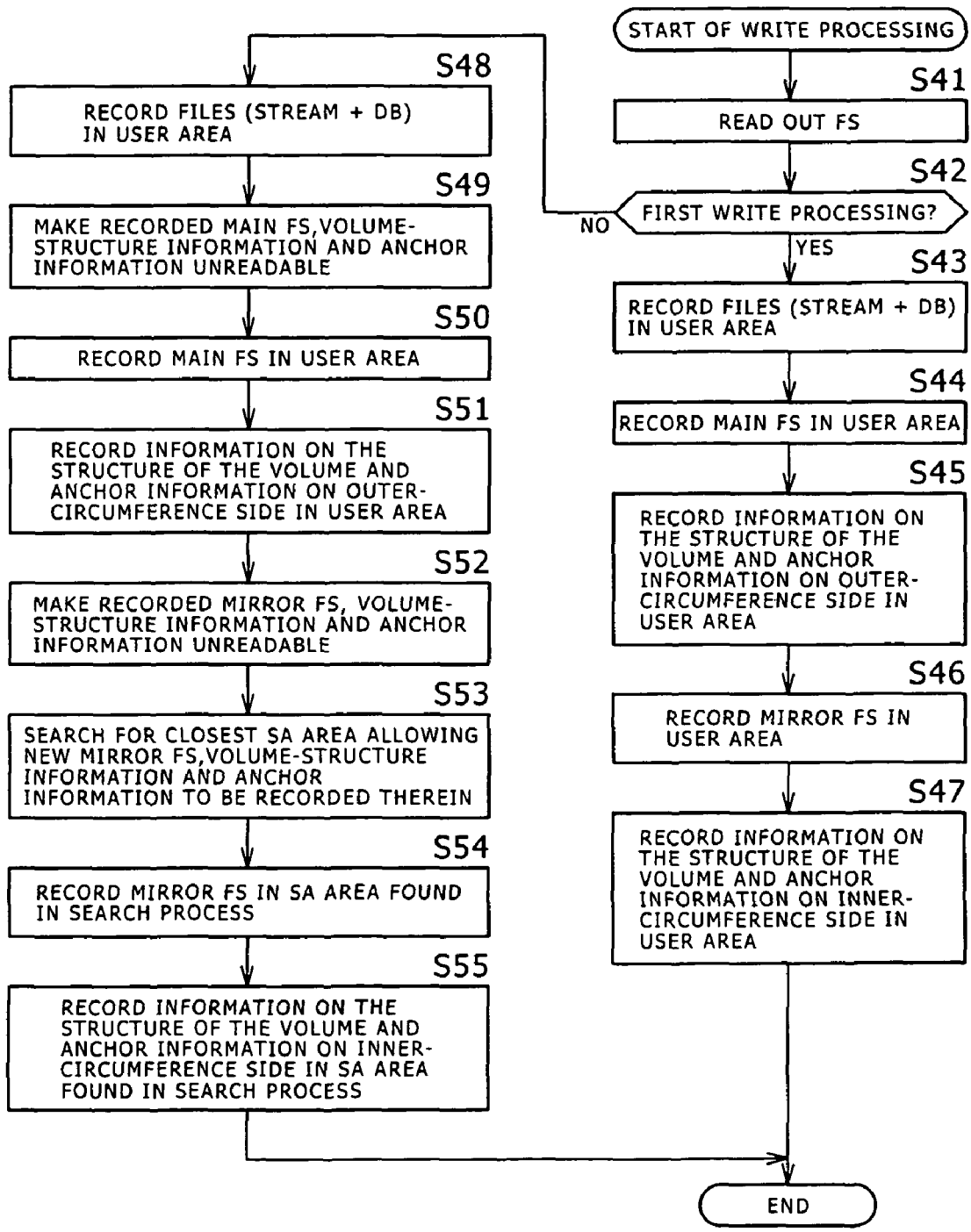
FIG. 20 shows a flowchart referred to in explanation of write processing carried out by the recording/reproduction mechanism section shown in FIG. 19.

Next, write processing carried out by the recording/reproduction mechanism section 22 shown in FIG. 19 is explained by referring to a flowchart shown in FIG. 20.

It is to be noted that since processes carried out at steps S41 to S49 and steps S52 to S55 of the flowchart shown in FIG. 20 are identical respectively with those carried out at the steps S11 to S19 and the steps S23 to S26 of the flowchart shown in FIG. 17, the processes are not explained in detail.

In a process carried out at the step S41, the file-system information generation section 312 generates file-system information. Then, in a process carried out at the next step S42, the file-system information generation section 312 produces a result of determination as to whether or not this write processing is being carried out for the first time. If the determination result produced in the process carried out at the step S42 indicates that this write processing is being carried out for the first time, the flow of the processing goes on to a step S43 at which the file-system information generation section 312 drives the recording/reproduction block 53 to write files (Stream+DB) shown in FIG. 21 into a block B132 set in the user area as shown in the upper diagram of the figure.

Figure 21:
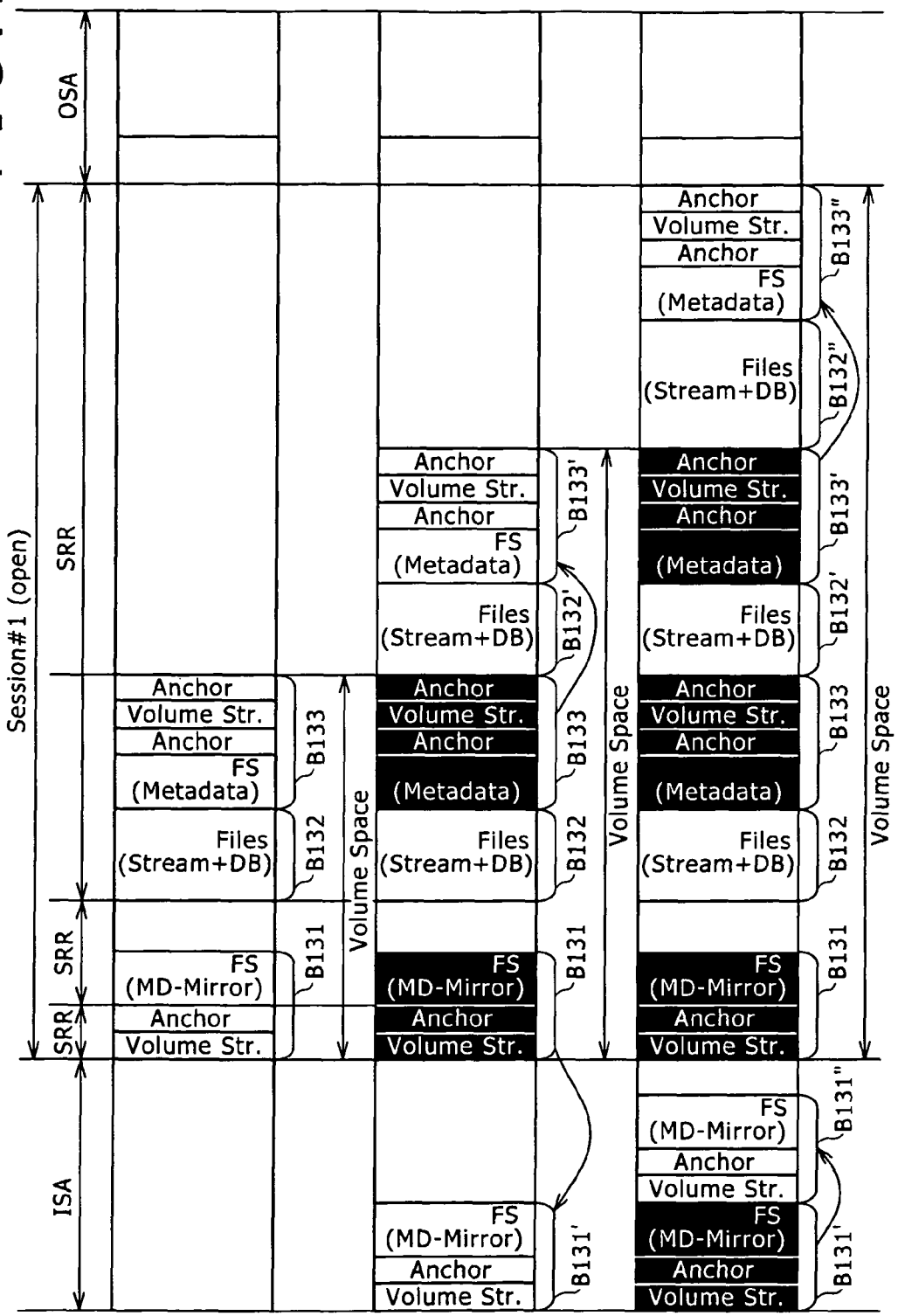
FIG. 21 is an explanatory diagram showing the write processing carried out by the recording/reproduction mechanism section shown in FIG. 19.

Then, in a process carried out at the next step S44, the file-system information generation section 312 drives the recording/reproduction block 53 to write an FS (Metadata) shown in FIG. 21 as a main FS into a block B133 set in the user area as shown in the upper diagram of the figure.

Subsequently, in a process carried out at the next step S45, the file-system information generation section 312 drives the recording/reproduction block 53 to write 'Volume Str.' and 'Anchor' shown in FIG. 21 into the block B133 set in the user area as respectively outer-circumference-side information on the structure of the volume and anchor information on the outer-circumference side as shown in the upper diagram of the figure. The outer-circumference-side information on the structure of the volume and the anchor information on the outer-circumference side are pieces of information corresponding to the main FS.

Then, in a process carried out at the next step S46, the file-system information generation section 312 drives the recording/reproduction block 53 to write an FS (MD-Mirror) shown in FIG. 21 as a mirror FS into a block B131 set in the user area as shown in the upper diagram of the figure.

Subsequently, in a process carried out at the next step S47, the file-system information generation section 312 drives the recording/reproduction block 53 to write 'Volume Str.' and 'Anchor' shown in FIG. 21 as respectively inner-circumference-side information on the structure of the volume and anchor information on the inner-circumference side into the block B131 set in the user area as shown in the upper diagram of the figure. The inner-circumference-side information on the structure of the volume and the anchor information on the inner-circumference side are pieces of information corresponding to the mirror FS.

If the determination result produced in the process carried out at the step S42 indicates that this write processing has been carried out before, that is, files have been recorded before at the steps S43 to S47 and then information is to be added to the files or the files are to be updated this time, on the other hand, the flow of the processing goes on to a step S48 at which the file-system information generation section 312 drives the recording/reproduction block 53 to incrementally record information referred to as files (Stream+DB) shown in FIG. 21 into a block B132' set in the user area as shown in the middle diagram of the figure.

Then, in a process carried out at the next step S49, the file-system information generation section 312 puts the main FS, the outer-circumference-side information on the structure of the volume and the anchor information on the outer-circumference side in a state of being unreadable as shown in the middle diagram of the figure. The outer-circumference-side information on the structure of the volume and the anchor information on the outer-circumference side are pieces of information already recorded in the immediately preceding write processing.

Then, in a process carried out at the next step S50, the file-system information generation section 312 supplies the main FS to the write section 73 by way of the ECC encoding section 71 and the modulation section 72 to be recorded by the recording/reproduction block 53 in a block B133' of the user area as shown in the middle diagram of FIG. 21.

Then, in a process carried out at the next step S51, the file-system information generation section 312 supplies the outer-circumference-side information on the structure of the volume and the anchor information on the outer-circumference side to the write section 73 by way of the ECC encoding section 71 and the modulation section 72 to be recorded by the recording/reproduction block 53 in the block B133' as shown in the middle diagram of FIG. 21. The outer-circumference-side information on the structure of the volume and the anchor information on the outer-circumference side are pieces of information corresponding to the main FS.

Subsequently, in a process carried out at the next step S52, the file-system information generation section 312 puts the mirror FS referred to as an FS (MD-Mirror), the inner-circumference-side information on the structure of the volume and the anchor information on the inner-circumference side in a state of being unreadable. The mirror FS, the information on the structure of the volume and the anchor information have been recorded in a block B131 as shown in the middle diagram of FIG. 21.

Then, in a process carried out at the next step S53, the file-system information generation section 312 searches the recording area for a closest SA area allowing new information to be recorded therein. The new information to be recorded into the closest SA area is a mirror FS referred to as an FS (MD-Mirror), inner-circumference-side information on the structure of the volume and anchor information on the inner-circumference side. The closest SA area being searched for is the area closest to the block B131 at which the mirror FS, the inner-circumference-side information on the structure of the volume and the anchor information on the inner-circumference side have been recorded. In the example shown in the middle diagram of FIG. 21, the closest SA area found in the search process is an ISA area.

Then, in a process carried out at the next steps S54 and S55, the file-system information generation section 312 supplies the mirror FS as well as the inner-circumference-side information on the structure of the volume and the anchor information on the inner-circumference side to the write section 73 to be recorded by the recording/reproduction block 53 in a block B131', which has been found in the search process as an area in the ISA, as shown in the middle diagram of FIG. 21. The inner-circumference-side information on the structure of the volume and the anchor information on the inner-circumference side are pieces of information corresponding to the mirror FS.

If information is further incrementally recorded into an already existing file in the state shown in the middle diagram of FIG. 21 or the file is updated, at the step S48, as shown in the lower diagram of FIG. 21, the file-system information generation section 312 drives the recording/reproduction block 53 to incrementally record information referred to as the files (Stream+DB) shown in the figure into a block B132" in the user area as shown in the lower diagram of FIG. 21.

Then, in a process carried out at the next step S49, the file-system information generation section 312 puts the main FS, the outer-circumference-side information on the structure of the volume and the anchor information on the outer-circumference side in a state of being unreadable as shown in the lower diagram of FIG. 21. The main FS, the outer-circumference-side information on the structure of the volume and the anchor information on the outer-circumference side are pieces of information already recorded in a block B133' in the immediately preceding write processing.

Then, in a process carried out at the next step S50, the file-system information generation section 312 supplies the main FS to the write section 73 by way of the ECC encoding section 71 and the modulation section 72 to be recorded by the recording/reproduction block 53 in a block B133" of the user area as shown in the lower diagram of FIG. 21.

Subsequently, in a process carried out at the next step S51, the file-system information generation section 312 supplies the outer-circumference-side information on the structure of the volume and the anchor information on the outer-circumference side to the write section 73 by way of the ECC encoding section 71 and the modulation section 72 to be recorded by the recording/reproduction block 53 in the block B133" of the user area as shown in the lower diagram of FIG. 21. The outer-circumference-side information on the structure of the volume and the anchor information on the outer-circumference side are pieces of information corresponding to the main FS.

Then, in a process carried out at the next step S52, the file-system information generation section 312 puts the mirror FS referred to as an FS (MD-Mirror), the inner-circumference-side information on the structure of the volume and the anchor information on the inner-circumference side in a state of being unreadable as shown in the lower diagram of FIG. 21. The inner-circumference-side information on the structure of the volume and the anchor information on the inner-circumference side have been recorded in the block B131'.

Subsequently, in a process carried out at the next step S53, the file-system information generation section 312 searches the recording area for a closest SA area allowing new information to be recorded therein. The new information to be recorded into the closest SA area is a mirror FS referred to as an FS (MD-Mirror), inner-circumference-side information on the structure of the volume and anchor information on the inner-circumference side. The closest SA area being searched for is the area closest to the block B131' at which the mirror FS, the inner-circumference-side information on the structure of the volume and the anchor information on the inner-circumference side have been recorded. In the example shown in the lower diagram of FIG. 21, the closest SA area found in the search process is an ISA area.

Then, in a process carried out at the next steps S54 and S55, the file-system information generation section 312 supplies the mirror FS as well as the inner-circumference-side information on the structure of the volume and the anchor information on the inner-circumference side to the write section 73 to be recorded by the recording/reproduction block 53 in a block B131", which has been found in the search process as an area in the SA area, as shown in the lower diagram of FIG. 21. The inner-circumference-side information on the structure of the volume and the anchor information on the inner-circumference side are pieces of information corresponding to the mirror FS.

As described above, in a process to add information to a file already recorded on the recording medium 81 or update the file, only the mirror FS is recorded to an SA area in addition to the inner-circumference-side information on the structure of the volume and the anchor information on the inner-circumference side. The inner-circumference-side information on the structure of the volume and the anchor information on the inner-circumference side are pieces of information corresponding to the mirror FS. Thus, in comparison with the recording/reproduction mechanism section 22 shown in FIG. 3, the size of the consumed SA area can be reduced to about half the original size. In this case, however, the recording locations of the main FS as well as the information on the structure of the volume and the anchor information are changed, making it necessary to alter their logical addresses. The information on the structure of the volume and the anchor information are pieces of information corresponding to the main FS. In the case of the configuration shown in FIG. 21, for example, the recording locations are changed from the block B133 to the block B133' and finally to the block B133". In order to solve this problem, usually, only the mirror FS recorded at a fixed logical address is read out to acquire the mirror FS from the recording medium 81. The main FS is read out from the user area only if the mirror FS cannot be read out from the recording medium 81 by all means for some reasons. In this way, this configuration offers both a merit of reading out file-system information from a fixed logical address and a merit of having the same FS recorded at two different locations in addition to the efficient utilization of an SA area.

It is to be noted that the information-recording processes carried out at the steps S43 to S48 as well as the steps S48, S50, S51, S54 and S55 of the flowchart shown in FIG. 20 will be described in more detail later.

The above descriptions have explained typical FS double recording in which the same FS is recorded at two different locations as a main FS and a mirror FS respectively. In a process to add information to a file already recorded on the recording medium 81 or update the file, however, only the main FS is recorded in the user area as file-system information. Since only the inner-circumference-side information on the structure of the volume and the anchor information on the inner-circumference side are recorded in an SA area, the size of the required SA area can be reduced.

Figure 22:
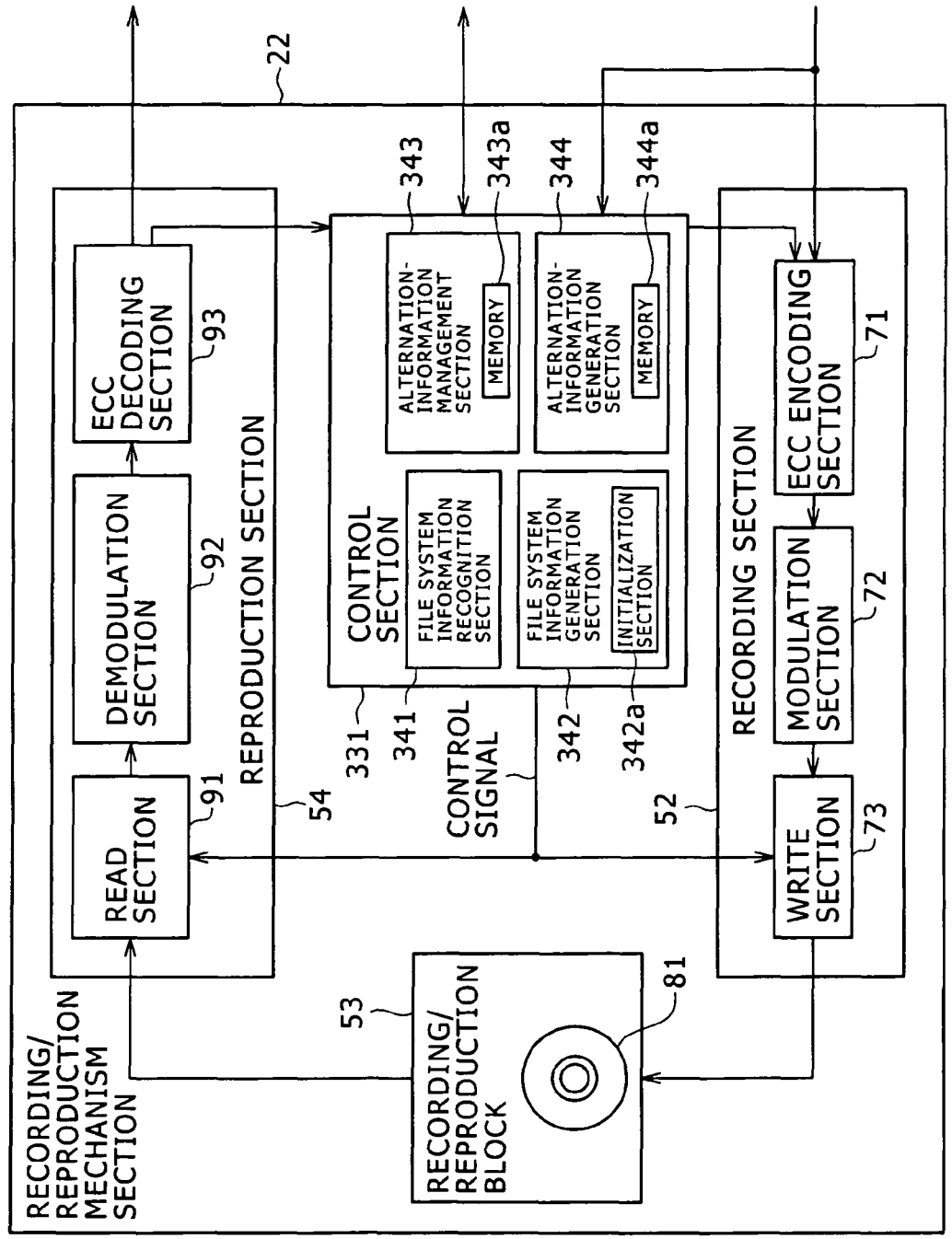
FIG. 22 is an explanatory diagram showing a further configuration of the recording/reproduction mechanism section.

FIG. 22 is a diagram showing the configuration of the recording/reproduction mechanism section 22 in which only a main FS is recorded in the user area and only anchor information on the inner-circumference side as well as inner-circumference-side information on the structure of the volume are written into an SA area during a process to incrementally record information in an already existing file or update an already existing file. It is to be noted that every component included in the recording/reproduction mechanism section 22 shown in FIG. 22 as a component identical with its counterpart employed in the recording/reproduction mechanism section 22 shown in FIG. 19 is denoted by the same reference numeral as the counterpart and the explanation of the component is properly omitted.

The configuration of the recording/reproduction mechanism section 22 shown in FIG. 22 is different from the configuration of the recording/reproduction mechanism section 22 shown in FIG. 19 in that the recording/reproduction mechanism section 22 shown in FIG. 22 employs a control section 331 as a substitute for the control section 301 employed in the recording/reproduction mechanism section 22 shown in FIG. 19. The control section 331 is different from the control section 301 in that the control section 331 employs a file-system information recognition section 341 as a substitute for the file-system information recognition section 311 employed in the control section 301, a file-system information generation section 342 as a substitute for the file-system information generation section 312 employed in the control section 301, an alternation-information management section 343 as substitute for the alternation-information management section 313 employed in the control section 301 and an alternation-information generation section 344 as a substitute for the alternation-information generation section 314 employed in the control section 301.

Basic functions of the file-system information recognition section 341 are the same as those of the file-system information recognition section 311 except that, in a process to recognize file-system information, the file-system information recognition section 341 reads out a main FS, outer-circumference-side information on the structure of the volume as well as anchor information on the outer-circumference side. It is to be noted that in the typical configuration shown in FIG. 22, only a standalone main FS is recorded. Thus, the file-system information recognition section 341 reads out only a main FS as file-system information.

Basic functions of the file-system information generation section 342 are the same as those of the file-system information generation section 312 except that, in a process to incrementally record information in an already existing file or update an already existing file, the file-system information generation section 342 records standalone file-system information, outer-circumference-side information on the structure of the volume as well as anchor information on the outer-circumference side into the user area and inner-circumference-side information on the structure of the volume as well as anchor information on the inner-circumference side into an SA area.

Basic functions of an initialization section 342a employed in the file-system information generation section 342 are the same as those of the initialization section 312a employed in the file-system information generation section 312 except that, unlike the initialization section 312a, the initialization section 342a sets a standalone main FS in the user area. To be more specific, as shown in the upper diagram of FIG. 24 to be described later, the standalone main FS, anchor information on the outer-circumference side and outer-circumference-side information on the structure of the volume are set in a block B153 whereas anchor information on the inner-circumference side and inner-circumference-side information on the structure of the volume are set in a block B151. It is to be noted that, in the example shown in FIG. 24, the inner-circumference-side information on the structure of the volume, the anchor information on the inner-circumference side, the main FS, files, the mirror FS, the information on the structure of the volume and the anchor information are each set in an SRR.

It is to be noted that the alternation-information management section 343, a memory 343a, the alternation-information generation section 344 and a memory 344a are identical respectively with the alternation-information management section 63, the memory 63a, the alternation-information generation section 64 and the memory 64a, which are employed in the recording/reproduction apparatus 22 shown in FIG. 3, so that explanations of the alternation-information management section 343, the memory 343a, the alternation-information generation section 344 and the memory 344a are omitted.

Figure 23:
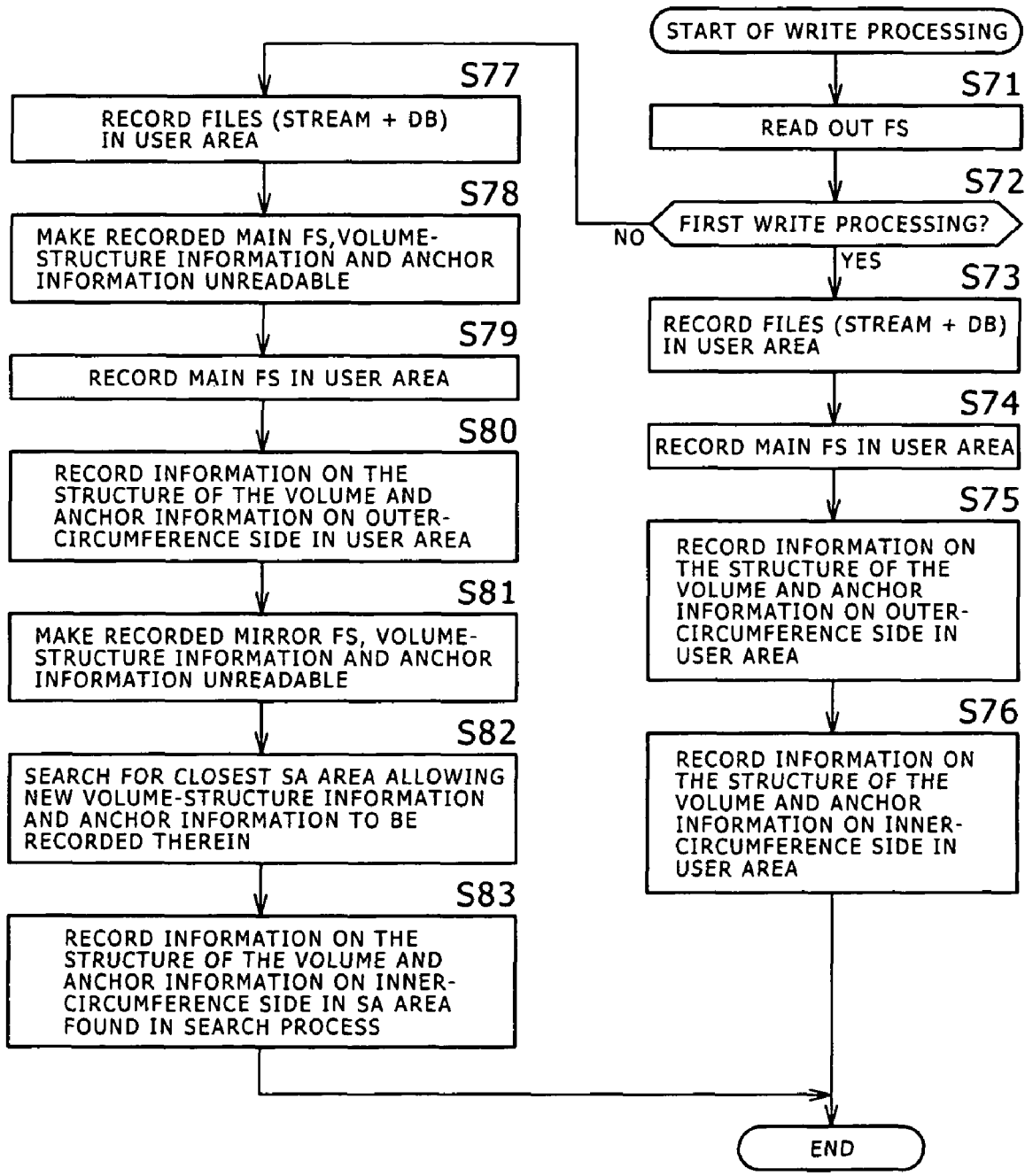
FIG. 23 shows a flowchart referred to in explanation of write processing carried out by the recording/reproduction mechanism section shown in FIG. 22.

Next, write processing carried out by the recording/reproduction mechanism section 22 shown in FIG. 22 is explained by referring to a flowchart shown in FIG. 23.

It is to be noted that, since processes carried out at steps S71 to S81 of the flowchart shown in FIG. 23 are identical with the processes carried out at the steps S41 to S45 and S47 to S51 of the flowchart shown in FIG. 20, the processes carried out at steps S71 to S81 are not explained in detail.

In a process carried out at the step S71, file-system information is read in. Then, in a process carried out at the next step S72, the file-system information generation section 342 produces a result of determination as to whether or not this write processing is being carried out for the first time. If the determination result produced in the process carried out at the step S72 indicates that this write processing is being carried out for the first time, the flow of the processing goes on to a step S73 at which the file-system information generation section 342 drives the recording/reproduction block 53 to write files (Stream+DB) shown in FIG. 24 into a block B152 set in the user area as shown in the upper diagram of the figure.

Figure 24:
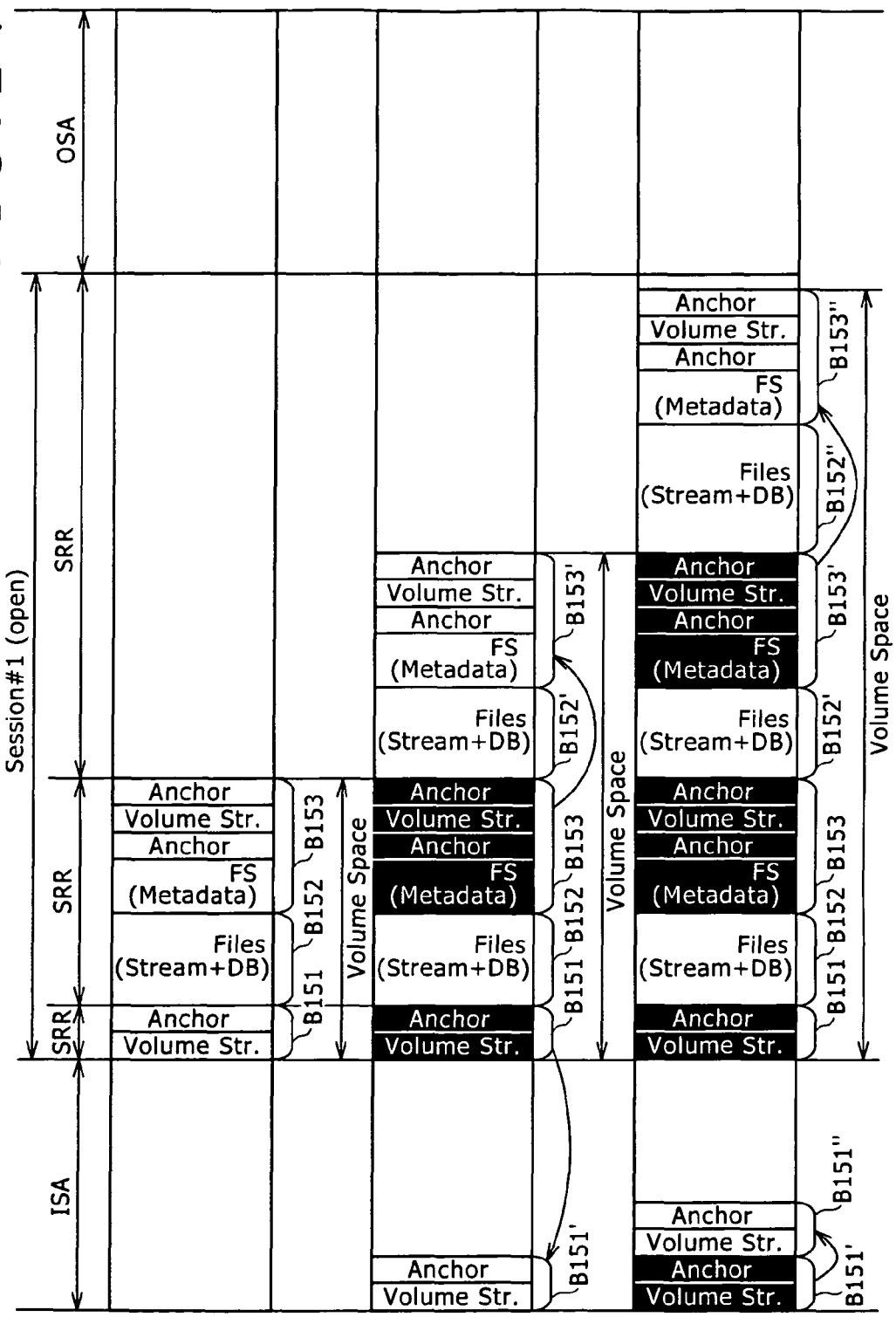
FIG. 24 is an explanatory diagram showing the write processing carried out by the recording/reproduction mechanism section shown in FIG. 22.

Then, in a process carried out at the next step S74, the file-system information generation section 342 drives the recording/reproduction block 53 to write an FS (Metadata) shown in FIG. 24 as a standalone main FS into a block B153 set in the user area as shown in the upper diagram of the figure.

Subsequently, in a process carried out at the next step S75, the file-system information generation section 342 drives the recording/reproduction block 53 to write 'Volume Str.' and 'Anchor' shown in FIG. 24 into the block B153 as respectively outer-circumference-side information on the structure of the volume and anchor information on the outer-circumference side as shown in the upper diagram of the figure.

Then, in a process carried out at the next step S76, the file-system information generation section 342 drives the recording/reproduction block 53 to write 'Volume Str.' and 'Anchor' shown in FIG. 24 into a block B151 of the user area as respectively inner-circumference-side information on the structure of the volume and anchor information on the inner-circumference side as shown in the upper diagram of the figure.

If the determination result produced in the process carried out at the step S72 indicates that this write processing has been carried out before, that is, files have been recorded before at the steps S73 to S76 and then information is to be added to the files or the files are to be updated this time, on the other hand, the flow of the processing goes on to a step S77 at which the file-system information generation section 342 drives the recording/reproduction block 53 to incrementally record information in files (Stream+DB) shown in the FIG. 24 into a block B152' set the user area as shown in the middle diagram of the figure.

Then, in a process carried out at the next step S78, the file-system information generation section 342 puts the main FS, the outer-circumference-side information on the structure of the volume and the anchor information on the outer-circumference side in a state of being unreadable. The main FS, the outer-circumference-side information on the structure of the volume and the anchor information on the outer-circumference side are pieces of information already recorded in the block B153 in the immediately preceding write processing.

Then, in a process carried out at the next step S79, as shown in the middle diagram of FIG. 24, the file-system information generation section 342 supplies the main FS to the write section 73 to be recorded in a block B153' of the user area as file-system information.

Subsequently, in a process carried out at the next step S80, the file-system information generation section 342 supplies the outer-circumference-side information on the structure of the volume and the anchor information on the outer-circumference side to the write section 73 to be recorded by the recording/reproduction block 53 in the block B153' of the user area as shown in the middle diagram of FIG. 24.

Then, in a process carried out at the next step S81, the file-system information generation section 342 puts the inner-circumference-side information on the structure of the volume and the anchor information on the inner-circumference side in a state of being unreadable. The inner-circumference-side information on the structure of the volume and the anchor information on the inner-circumference side are pieces of information already recorded in the block B151 shown in the middle diagram of FIG. 24.

Subsequently, in a process carried out at the next step S82, the file-system information generation section 342 searches the recording area for a closest SA area allowing new information to be recorded therein. The new information to be recorded into the closest SA area is inner-circumference-side information on the structure of the volume and anchor information on the inner-circumference side. The closest SA area being searched for is an area closest to the block B151 at which the inner-circumference-side information on the structure of the volume and the anchor information on the inner-circumference side have been recorded. In the example shown in the middle diagram of FIG. 24, the closest SA area found in the search process is an ISA area.

Then, in a process carried out at the next step S83, the file-system information generation section 342 supplies the inner-circumference-side information on the structure of the volume and the anchor information on the inner-circumference side to the write section 73 to be recorded by the recording/reproduction block 53 in a block B151' of the ISA area found in the search process as shown in the middle diagram of FIG. 24.

If information is further incrementally recorded into an already existing file in the state shown in the middle diagram of FIG. 24 or the file is updated, at the step S77, as shown in the lower diagram of FIG. 24, the file-system information generation section 342 drives the recording/reproduction block 53 to incrementally record information referred to as the files (Stream+DB) shown in the figure into a block B152" of the user area.

Then, in a process carried out at the next step S78, the file-system information generation section 342 puts the main FS, the information on the structure of the volume and the anchor information in a state of being unreadable as shown in the lower diagram of FIG. 24. The main FS, the information on the structure of the volume and the anchor information have been recorded in the block B153'.

Then, in a process carried out at the next step S79, the file-system information generation section 342 supplies the main FS to the write section 73 to be recorded by the recording/reproduction block 53 in a block B153" of the user area as shown in the lower diagram of FIG. 24.

Subsequently, in a process carried out at the next step S80, the file-system information generation section 342 supplies the outer-circumference-side information on the structure of the volume and the anchor information on the outer-circumference side to the write section 73 to be recorded by the recording/reproduction block 53 in the block B153" of the user area as shown in the lower diagram of FIG. 24.

Then, in a process carried out at the next step S81, the file-system information generation section 342 puts the inner-circumference-side information on the structure of the volume and the anchor information on the inner-circumference side in a state of being unreadable. The inner-circumference-side information on the structure of the volume and the anchor information on the inner-circumference side have been recorded in a block B151' as shown in the lower diagram of FIG. 24.

Subsequently, in a process carried out at the next step S82, the file-system information generation section 342 searches the recording area for a closest SA area allowing new information to be recorded therein. The new information to be recorded into the closest SA area is the information on the structure of the volume and anchor information. The closest SA area being searched for is the area closest to the block B151' at which the information on the structure of the volume and the anchor information have been recorded. In the example shown in the lower diagram of FIG. 24, the closest SA area found in the search process is an ISA area.

Then, in a process carried out at the next step S83, the file-system information generation section 342 supplies the inner-circumference-side information on the structure of the volume and the anchor information on the inner-circumference side to the write section 73 to be recorded by the recording/reproduction block 53 in a block B151" of the ISA area found in the search process as shown in the lower diagram of FIG. 24.

As described above, in a process to add information to a file already recorded on the recording medium 81 or update the already recorded file, only the inner-circumference-side information on the structure of the volume and the anchor information on the inner-circumference side are recorded in the SA. Thus, the information on the structure of the volume and the anchor information can be read out by specifying fixed logical addresses. In addition, in comparison with the recording/reproduction apparatus 22 shown in FIG. 3 or FIG. 19, the size of the consumed SA area is small. Even in the configuration described above, however, the recording locations of the main FS, the outer-circumference-side information on the structure of the volume and the anchor information on the outer-circumference side are changed to, for example, the blocks B153, B153' and B153" shown in FIG. 24 so that it is necessary to modify their logical addresses.

It is to be noted that the information-recording processes carried out at the steps S73 to S77 as well the steps S79, S80 and S83 of the flowchart shown in FIG. 23 will be described in more detail later.

The above description explains a typical case in which file-system information, information on the structure of the volume and anchor information or only information on the structure of the volume and anchor information are set at the beginning of the volume space and, in every updating process, they are recorded in an SA area. In this case, the file-system information is both a main FS and a mirror FS or only a main FS. It is to be noted, however, that the information set and recorded is not limited to this combination. For example, the information set and recorded can be only file-system information and information on the structure of the volume or anchor information.

In addition, the above description also explains a typical case in which only one of file-system information, information on the structure of the volume and anchor information, which have been set at the beginning of the volume space, is recorded in an SA area so that, by updating the recorded file-system information, the information on the structure of the volume or the anchor information in a process to incrementally record information in an already existing file or update the already existing file, it is possible to read out the file-system information, the information on the structure of the volume or the anchor information without the need to change its logical address. However, in a process to incrementally record information in an already existing file or update the already existing file, a portion of the file can also be recorded in an SA area.

Figure 25:
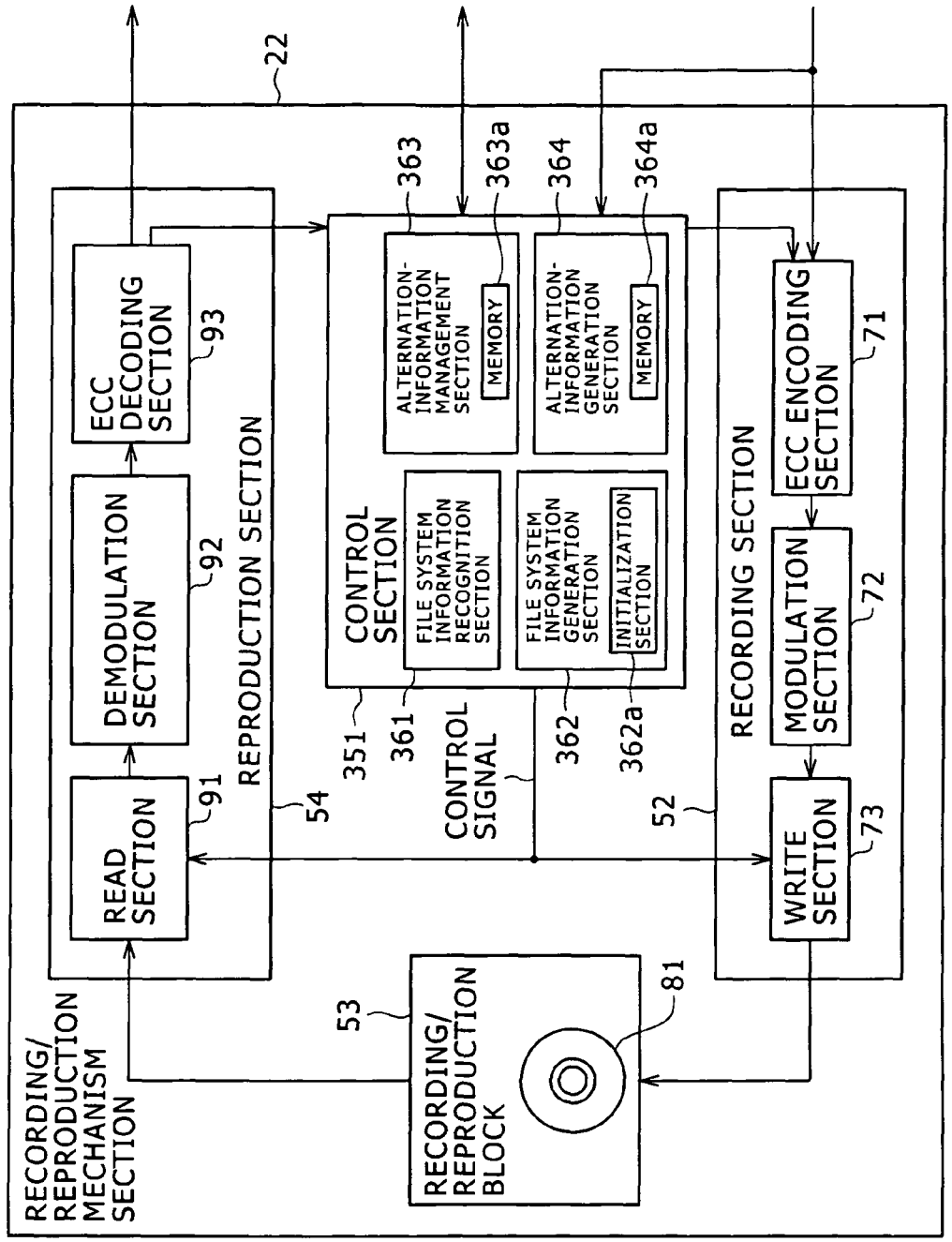
FIG. 25 is an explanatory diagram showing a still further configuration of the recording/reproduction mechanism section.

FIG. 25 is a diagram showing the configuration of a recording/reproduction apparatus 22 in which, during a process to incrementally record information in an already existing file or update the already existing file, a portion of the file is recorded in an SA area in addition to file-system information, information on the structure of the volume or anchor information.

It is to be noted that every component included in the recording/reproduction mechanism section 22 shown in FIG. 25 as a component identical with its counterpart employed in the recording/reproduction mechanism section 22 shown in FIG. 3 is denoted by the same reference numeral as the counterpart and the explanation of the component is properly omitted.

The configuration of the recording/reproduction mechanism section 22 shown in FIG. 25 is different from the configuration of the recording/reproduction mechanism section 22 shown in FIG. 3 in that the recording/reproduction mechanism section 22 shown in FIG. 25 employs a control section 351 as a substitute for the control section 51 employed in the recording/reproduction mechanism section 22 shown in FIG. 3. The control section 351 is different from the control section 51 in that the control section 351 employs a file-system information recognition section 361 as a substitute for the file-system information recognition section 61 employed in the control section 51, a file-system information generation section 362 as a substitute for the file-system information generation section 62 employed in the control section 51, an alternation-information management section 363 as substitute for the alternation-information management section 63 employed in the control section 51 and an alternation-information generation section 364 as a substitute for the alternation-information generation section 64 employed in the control section 51.

Basic functions of the file-system information recognition section 361 are the same as those of the file-system information recognition section 61 except that, in a process to recognize file-system information, the file-system information recognition section 361 reads out file-system information, information on the structure of the volume, anchor information and a file always through fixed logical addresses from the ISA on the inner-circumference side but reads out outer-circumference-side file-system information, outer-circumference-side information on the structure of the volume and anchor information on the outer-circumference side from the user area. Referred to hereafter as files (DB), files read out from the ISA are the database (DB) of stream data.

Basic functions of the file-system information generation section 362 are the same as those of the file-system information generation section 62 except that, in a process to incrementally record information in an already existing file or update an already existing file, the file-system information generation section 362 records file-system information on the inner-circumference side, inner-circumference-side information on the structure of the volume, anchor information on the inner-circumference side as well as files (DB) into an SA area and file-system information on the outer-circumference side, outer-circumference-side information on the structure of the volume as well as anchor information on the outer-circumference side into the user area.

Basic functions of an initialization section 362a employed in the file-system information generation section 362 are the same as those of the initialization section 62a employed in the file-system information generation section 62 except that the initialization section 362a sets files separately as stream data referred to as files (Stream) and databases referred to as files (DB). To be more specific, as shown in the upper diagram of FIG. 27 to be described later, database information referred to as files (DB) is set in a block B171 in addition to anchor information and volume-structure information, which correspond to a main FS referred to as an FS (Metadata). On the other hand, anchor information and information on the structure of the volume, which correspond to a mirror FS referred to as an FS (MD-Mirror), are set in a block B173.

It is to be noted that the alternation-information management section 363, a memory 363a, the alternation-information generation section 364 and a memory 364a are identical respectively with the alternation-information management section 63, the memory 63a, the alternation-information generation section 64 and the memory 64a, which are employed in the recording/reproduction apparatus 22 shown in FIG. 3, so that explanations of the alternation-information management section 363, the memory 363a, the alternation-information generation section 364 and the memory 364a are omitted.

Figure 26:
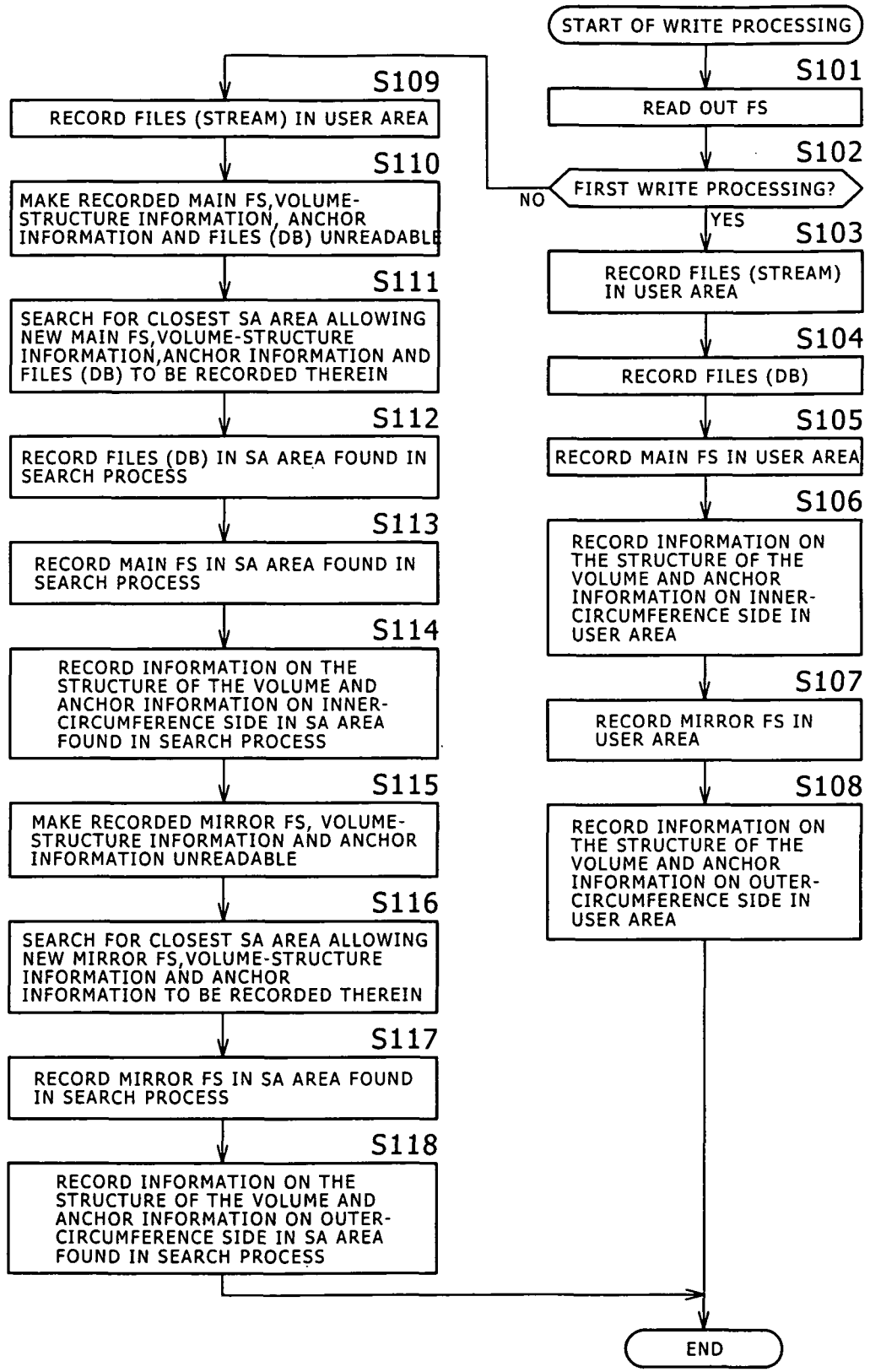
FIG. 26 shows a flowchart referred to in explanation of write processing carried out by the recording/reproduction mechanism section shown in FIG. 25.

Next, write processing carried out by the recording/reproduction mechanism section 22 shown in FIG. 25 is explained by referring to a flowchart shown in FIG. 26.

It is to be noted that, since processes carried out at steps S101, S102, S105 to S108 and steps S113 to S118 of the flowchart shown in FIG. 26 are identical with the processes carried out respectively at steps S11, S12, S14 to S17 and steps S21 to S26 of the flowchart shown in FIG. 17. The processes carried out at the steps S101, S102, S105 to S108 and steps S113 to S118 are not explained in detail.

The flowchart shown in FIG. 26 begins with a step S101 at which the file-system information generation section 362 reads in file-system information FS. Then, in a process carried out at the next step S102, the file-system information generation section 362 produces a result of determination as to whether or not this write processing is being carried out for the first time. If the determination result produced in the process carried out at the step S102 indicates that this write processing is being carried out for the first time, the flow of the processing goes on to a step S103 at which the file-system information generation section 362 drives the recording/reproduction block 53 to write files into the user area on the recording medium 81. The written files are files (Stream) supplied to the write section 73 from the ECC encoding section 71 by way of the modulation section 72. The files (Stream) are each a file containing stream data.

Figure 27:
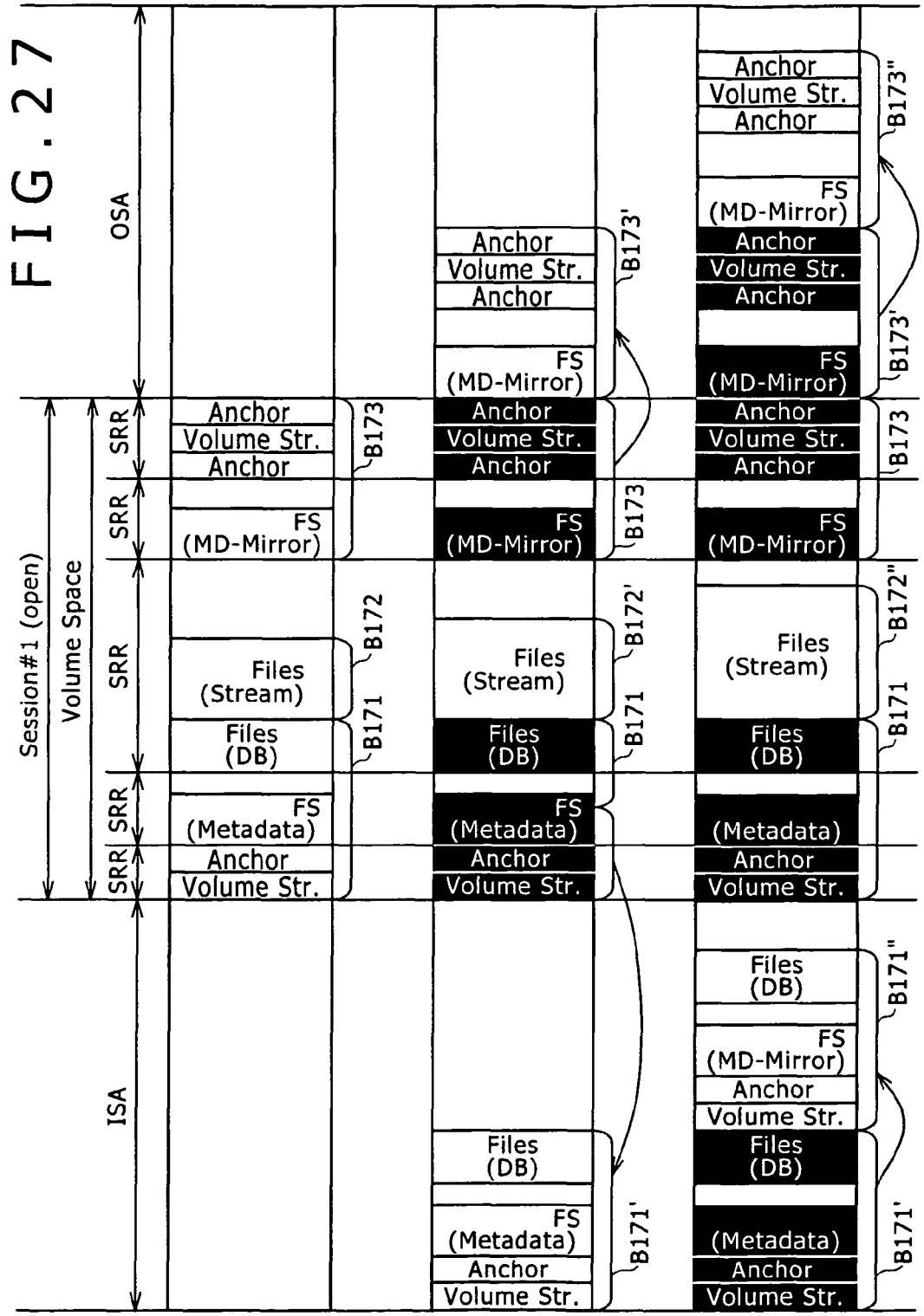
FIG. 27 is an explanatory diagram showing the write processing carried out by the recording/reproduction mechanism section shown in FIG. 25.

To be more specific, as shown in the upper diagram of FIG. 27, the file-system information generation section 362 drives the recording/reproduction block 53 to write the files (Stream) shown in the figure into a block B172 set on the recording medium 81 in the formatting processing. The files (Stream) are stream-data files supplied to the write section 73 from the ECC encoding section 71 by way of the modulation section 72 as described above.

Then, in a process carried out at the next step S104, the file-system information generation section 362 drives the recording/reproduction block 53 to write files into the user area on the recording medium 81. The written files are files (DB: a database for managing stream data stored in the stream-data files) supplied to the write section 73 from the ECC encoding section 71 by way of the modulation section 72.

To be more specific, as shown in the upper diagram of FIG. 27, the file-system information generation section 362 drives the recording/reproduction block 53 to write the files (DB) shown in the figure into a block B171 set on the recording medium 81 in the formatting processing. As described above, the written files are files (DB) supplied to the write section 73 from the ECC encoding section 71 by way of the modulation section 72.

Then, in a process carried out at the next step S105, as shown in the upper diagram of FIG. 27, the file-system information generation section 362 drives the recording/reproduction block 53 to write a main FS referred to as an FS (Metadata) shown in the figure into the block B171 in the user area set on the recording medium 81. Subsequently, in a process carried out at the next step S106, the file-system information generation section 362 drives the recording/reproduction block 53 to write inner-circumference-side information on the structure of the volume (referred to as 'Volume Str.' shown in the figure) and anchor information (referred to as 'Anchor' shown in the figure) on the inner-circumference side into the block B171 in the user area. The inner-circumference-side information on the structure of the volume and the anchor information on the inner-circumference side are pieces of information corresponding to the main FS.

Then, in a process carried out at the next step S107, the file-system information generation section 362 drives the recording/reproduction block 53 to write an FS (MD-Mirror) shown in the figure as a mirror FS into a block B173 in the user area.

Subsequently, in a process carried out at the next step S108, the file-system information generation section 362 drives the recording/reproduction block 53 to write outer-circumference-side information on the structure of the volume and anchor information on the outer-circumference side into the block B173 set in the user area as an area used for recording outer-circumference-side information on the structure of the volume and anchor information on the outer-circumference side. The outer-circumference-side information on the structure of the volume and the anchor information on the outer-circumference side are pieces of information corresponding to the mirror FS.

If the determination result produced in the process carried out at the step S102 indicates that this write processing has been carried out at least once before, that files have been recorded before at the steps S103 to S108 and then information is to be incrementally recorded in the files or the files are to be updated this time, the flow of the processing goes on to a step S109.

In a process carried out at the step S109, the file-system information generation section 362 drives the recording/reproduction block 53 to write files into the user area on the recording medium 81. The written files are files (Stream) supplied to the write section 73 from the ECC encoding section 71 by way of the modulation section 72.

To be more specific, as shown in the middle diagram of FIG. 27, the file-system information generation section 362 drives the recording/reproduction block 53 to write the files (Stream) shown in the figure as files supplied to the write section 73 from the ECC encoding section 71 by way of the modulation section 72 into the block B172' set on the recording medium 81 in the formatting processing, for example, if information has been recorded like in the processing state shown in the upper diagram of FIG. 27. To put it in more detail, in a process to incrementally record information to an already existing file, the file-system information generation section 362 incrementally records new additional information in the block B172' shown in the middle diagram of FIG. 27, adding the new information to the information already recorded in the block B172 shown in the upper diagram of FIG. 27. In a process to record a file containing new information as an update of the information already recorded in the block B172 shown in the upper diagram of FIG. 27, on the other hand, the file already recorded in the block B172 is put in a state of being unreadable and information to be recorded into the block B172' is constructed as a newly updated file to be recorded in the block B172' adjacent to the block B172.

Then, in a process carried out at the next step S110, the file-system information generation section 362 controls the write section 73 through the ECC encoding section 71 and the modulation section 72 to put the main FS referred to as an FS (Metadata), the inner-circumference-side information on the structure of the volume, the anchor information, and the files (DB) in a state of being unreadable by the recording/reproduction block 53 out from the recording medium 81 as shown in the middle diagram of FIG. 27.

To be more specific, the file-system information generation section 362 puts the main FS referred to as an FS (Metadata), the inner-circumference-side information on the structure of the volume, the anchor information on the inner-circumference side and the files (DB) in a state of being unreadable by the recording/reproduction block 53 out from the recording medium 81 as shown in the middle diagram of FIG. 27. The files (DB) are defined as database files, which are updated when information is incrementally recorded in the already existing files or when the files are updated. The main FS referred to as an FS (Metadata) is file-system information recorded in a block B171.

Then, in a process carried out at the next step S111, the file-system information generation section 362 searches the recording area for a closest SA area allowing new information to be recorded therein. Generated in a process carried out at the step S110, the new information to be recorded into the closest SA area is a main FS referred to as an FS (Metadata), inner-circumference-side information on the structure of the volume, anchor information on the inner-circumference side and the files (DB).

To be more specific, in the case of a single-layer BR-D, an SA area is an area in either the OSA provided on the outer-circumference side or the ISA provided on the inner-circumference side. In the example shown in the middle diagram of FIG. 27, for example, the closest SA area found in the search process is an ISA area. Thus, the file-system information generation section 362 selects the ISA area to be used for recording the main FS referred to as an FS (Metadata), the inner-circumference-side information on the structure of the volume, the anchor information on the inner-circumference side and the files (DB).

Subsequently, in a process carried out at the next step S112, the file-system information generation section 362 supplies the database files referred to as the files (DB) to the write section 73 to be recorded into an SA area found in the search process carried out at the step S111. To be more specific, the database files are recorded in a block B171' in an area in the ISA, which has been found as the closest SA area in the search process, as shown in the middle diagram of FIG. 27.

Then, in a process carried out at the next step S113, the file-system information generation section 362 supplies file-system information to the write section 73 to be recorded as the main FS by the recording/reproduction block 53 in an SA area found in the search process. To be more specific, as shown in the middle diagram of FIG. 27, for example, the main FS is recorded into the block B171' in an SA area in the ISA area as shown in the middle diagram of FIG. 27.

Subsequently, in a process carried out at the next step S114, the file-system information generation section 362 supplies the inner-circumference-side information on the structure of the volume and the anchor information to the write section 73 to be recorded by the recording/reproduction block 53 into the block B171' in an SA area as shown in the middle diagram of FIG. 27. The inner-circumference-side information on the structure of the volume and the anchor information are pieces of information corresponding to the main FS.

Then, in a process carried out at the next step S115, the file-system information generation section 362 controls the write section 73 to put the mirror FS referred to as an FS (MD-Mirror), the outer-circumference-side information on the structure of the volume and the anchor information on the outer-circumference side in a state of being unreadable from the block B173 shown in the middle diagram of FIG. 27. Subsequently, in a process carried out at the next step S116, the file-system information generation section 362 searches the recording area for a closest SA area allowing new information to be recorded therein. The new information to be recorded into the closest SA area is a mirror FS, outer-circumference-side information on the structure of the volume and anchor information on the outer-circumference side. In the example shown in the middle diagram of FIG. 27, for example, the closest SA area found in the search process is an area in the OSA.

Then, in a process carried out at the next step S117, the file-system information generation section 362 supplies the mirror FS to the write section 73 to be recorded by the recording/reproduction block 53 in the OSA area found in the search process carried out at the step S116. To be more specific, the mirror FS is recorded in a block B173' of the OSA as shown in the middle diagram of FIG. 27.

Subsequently, in a process carried out at the next step S118, the file-system information generation section 362 supplies the outer-circumference-side information on the structure of the volume and the anchor information on the outer-circumference side to the write section 73 to be recorded by the recording/reproduction block 53 in the area in the OSA. The outer-circumference-side information on the structure of the volume and the anchor information on the outer-circumference side are pieces of information corresponding to the mirror FS. To be more specific, as shown in the middle diagram of FIG. 27, the outer-circumference-side information on the structure of the volume and the anchor information on the outer-circumference side are recorded in the block B173' as shown in the middle diagram of FIG. 27.

In addition, in a process to add information to a file already recorded on the recording medium 81 as shown in the middle diagram of FIG. 27 or update the already existing file, at the step S109, as shown in the lower diagram of FIG. 27, the file-system information generation section 362 drives the recording/reproduction block 53 to write the files (Stream) shown in the into the block B172" of the user area.

Then, in a process carried out at the next step S110, the file-system information generation section 362 puts the main FS, the inner-circumference-side information on the structure of the volume and the anchor information in a state of being unreadable as shown in the lower diagram of FIG. 27. The main FS, the inner-circumference-side information on the structure of the volume and the anchor information are pieces of information already recorded in the block B171' during the immediately preceding write processing.

Subsequently, in a process carried out at the next step S111, in the case of the example shown in the lower diagram of FIG. 27, for example, the file-system information generation section 362 searches the recording area for a closest SA area allowing new information to be recorded therein. Obtained as a result of the process carried out at the step S110, the new information to be recorded into the closest SA area is a new main FS referred to as an FS (Metadata), new inner-circumference-side information on the structure of the volume and new anchor information on the inner-circumference side. If the closest SA area is an area in the ISA, the file-system information generation section 362 selects the area in the ISA as the closest SA area to be used for recording the new main FS referred to as an FS (Metadata), the new inner-circumference-side information on the structure of the volume, the new anchor information and the new files (DB).

Subsequently, in a process carried out at the next step S112, the file-system information generation section 362 supplies the database files referred to as the files (DB) to the write section 73 to be recorded into an SA area found in the search process. To be more specific, the database files are recorded in a block B171" in an ISA area, which has been found as an SA area in the search process, as shown in the lower diagram of FIG. 27.

Then, in a process carried out at the next step S113, in the case of the example shown in the lower diagram of FIG. 27, the file-system information generation section 362 supplies the main FS to the write section 73 to be recorded in a block B171" in the ISA.

Subsequently, in a process carried out at the next step S114, in the case of the example shown in the lower diagram of FIG. 27, the file-system information generation section 362 supplies the inner-circumference-side information on the structure of the volume and the anchor information on the inner-circumference side to the write section 73 to be recorded in the block B171" in the ISA on the recording medium 81.

Then, in a process carried out at the next step S115, in the case of the example shown in the lower diagram of FIG. 27, the file-system information generation section 362 puts the mirror FS referred to as an FS (MD-Mirror), the outer-circumference-side information on the structure of the volume and the anchor information on the outer-circumference side in a state of being unreadable. The mirror FS, the outer-circumference-side information on the structure of the volume and the anchor information on the outer-circumference side are pieces of information already recorded in the block B173' as shown in the middle diagram of FIG. 27.

Subsequently, in a process carried out at the next step S116, in the case of the example shown in the lower diagram of FIG. 27, the file-system information generation section 362 searches the recording area for a closest SA area allowing new information to be recorded therein. The new information to be recorded into the closest SA area is a mirror FS, outer-circumference-side information on the structure of the volume and anchor information on the outer-circumference side. If the closest SA area is an area in the OSA, the file-system information generation section 362 selects the area in the OSA as the closest SA area to be used for recording the new mirror main FS, the new outer-circumference-side information on the structure of the volume and the new anchor information on the outer-circumference side.

Then, in a process carried out at the next step S117, in the case of the example shown in the lower diagram of FIG. 27, the file-system information generation section 362 supplies the main FS to the write section 73 to be recorded in a block B173" in the OSA area found in the search process carried out at the step S116.

Subsequently, in a process carried out at the next step S118, in the case of the example shown in the lower diagram of FIG. 27, the file-system information generation section 362 supplies the new outer-circumference-side information on the structure of the volume and the new anchor information on the outer-circumference side to the write section 73 to be recorded in the block B173" in the OSA area.

As described above, in a process to add information to files already recorded on the recording medium 81 or update the already recorded files, database files referred to as files (DB) are recorded in the SA in addition to inner-circumference-side information on the structure of the volume and anchor information on the inner-circumference side. Thus, in a read process to reproduce stream data, the stream data can be read out without changing the allocation of the file-system information.

In addition, in the case of recording/reproduction apparatus 22 shown in FIG. 19 or 22, database files referred to as files (DB) can also be recorded in an SA area.

It is needless to say that the information-recording order of the processes carried out in the write processing described above can be changed to provide the same effects. It is desirable, however, to carry out a process to record information onto the recording medium 81 continuously in a consistent manner in either the direction from the inner-circumference side to the outer-circumference side or the direction from the outer-circumference side to the inner-circumference side. In this way, the write or read processing can be processed at a high speed.

It is to be noted that the information-recording processes carried out at the steps S103 to S109, S112 to S114, S117 and S118 of the flowchart shown in FIG. 26 will be described later in detail.

The above descriptions explain a typical case in which all or some of updating information of file-system information, anchor information and information on the structure of the volume is recorded sequentially into an SA area during a process to add information to a file already recorded on the recording medium 81 or update the already recorded file. In a process to add information to a file already recorded on the recording medium 81 or update the already recorded file, however, all or some of updating information of file-system information, anchor information and information on the structure of the volume can be recorded in an area, which is not limited to an SA area. For example, the information can also be recorded in a user area.

Figure 28:
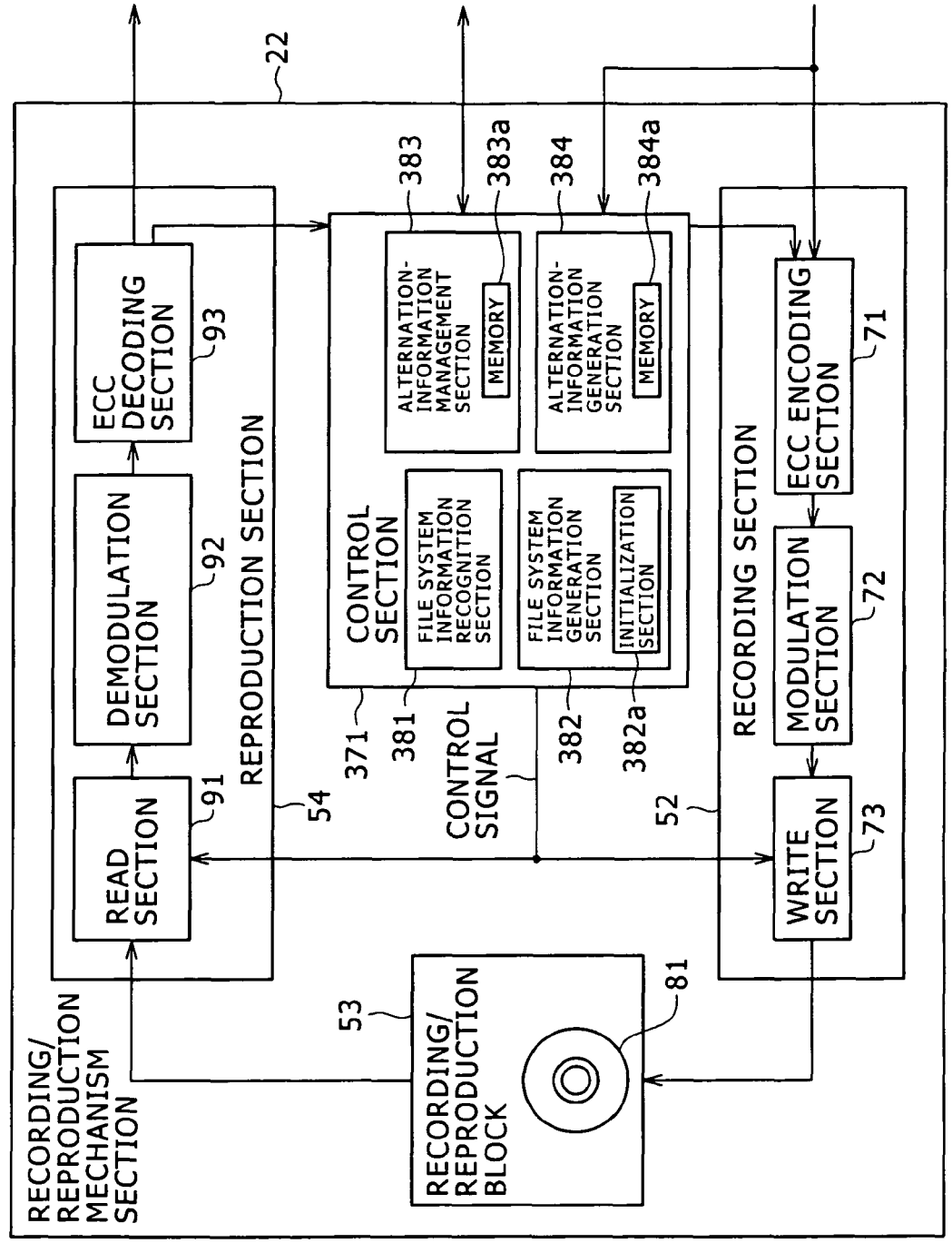
FIG. 28 is an explanatory diagram showing a still further configuration of the recording/reproduction mechanism section.

FIG. 28 is a diagram showing the configuration of a recording/reproduction apparatus 22 in which, during a process to incrementally record information in an already existing file or update the already existing file, updating information of file-system information, anchor information and information on the structure of the volume can be recorded in an area, which is not limited to an SA area, that is, the updating information can also recorded in a user area. It is to be noted that every component included in the recording/reproduction mechanism section 22 shown in FIG. 28 as a component identical with its counterpart employed in the recording/reproduction mechanism section 22 shown in FIG. 3 is denoted by the same reference numeral as the counterpart and the explanation of the component is properly omitted.

The configuration of the recording/reproduction mechanism section 22 shown in FIG. 28 is different from the configuration of the recording/reproduction mechanism section 22 shown in FIG. 3 in that the recording/reproduction mechanism section 22 shown in FIG. 28 employs a control section 371 as a substitute for the control section 51 employed in the recording/reproduction mechanism section 22 shown in FIG. 3. The control section 371 is different from the control section 51 in that the control section 371 employs a file-system information recognition section 381 as a substitute for the file-system information recognition section 61 employed in the control section 51, a file-system information generation section 382 as a substitute for the file-system information generation section 62 employed in the control section 51, an alternation-information management section 383 as substitute for the alternation-information management section 63 employed in the control section 51 and an alternation-information generation section 384 as a substitute for the alternation-information generation section 64 employed in the control section 51.

Functions of the file-system information recognition section 381 are the same as those of the file-system information recognition section 61.

Basic functions of the file-system information generation section 382 are the same as those of the file-system information generation section 62 except that, in a process to incrementally record information in an already existing file or update an already existing file, the file-system information generation section 382 records a main FS, inner-circumference-side information on the structure of the volume, anchor information on the inner-circumference side, a mirror FS on the outer-circumference side, outer-circumference-side information on the structure of the volume and anchor information on the outer-circumference side as alternation information of pre-processing information into areas close to the original locations of the pre-processing information. The main FS, the inner-circumference-side information on the structure of the volume, the anchor information on the inner-circumference side, the mirror FS on the outer-circumference side, the outer-circumference-side information on the structure of the volume and the anchor information on the outer-circumference side are pieces of information obtained as a result of the process to incrementally record information in an already existing file or update an already existing file. The pre-processing information is a main FS, inner-circumference-side information on the structure of the volume, anchor information on the inner-circumference side, a mirror FS on the outer-circumference side, outer-circumference-side information on the structure of the volume and anchor information on the outer-circumference side. The main FS, the inner-circumference-side information on the structure of the volume, the anchor information on the inner-circumference side, the mirror FS on the outer-circumference side, the outer-circumference-side information on the structure of the volume and the anchor information on the outer-circumference side have been recorded in their original locations before the process to incrementally record information in an already existing file or update an already existing file. The close locations can be locations in the user or SA area. In this way, also in a process to record information in a user area, the file-system information generation section 382 records the actually updated information at another location on the recording medium 81 without changing the location in the logical-address space in the same way as if the information were recorded in an SA area.

It is to be noted that the alternation-information management section 383, a memory 383a, the alternation-information generation section 384 and a memory 384a are identical respectively with the alternation-information management section 63, the memory 63a, the alternation-information generation section 64 and the memory 64a, which are shown in FIG. 3, so that explanations are omitted.

Figure 29:
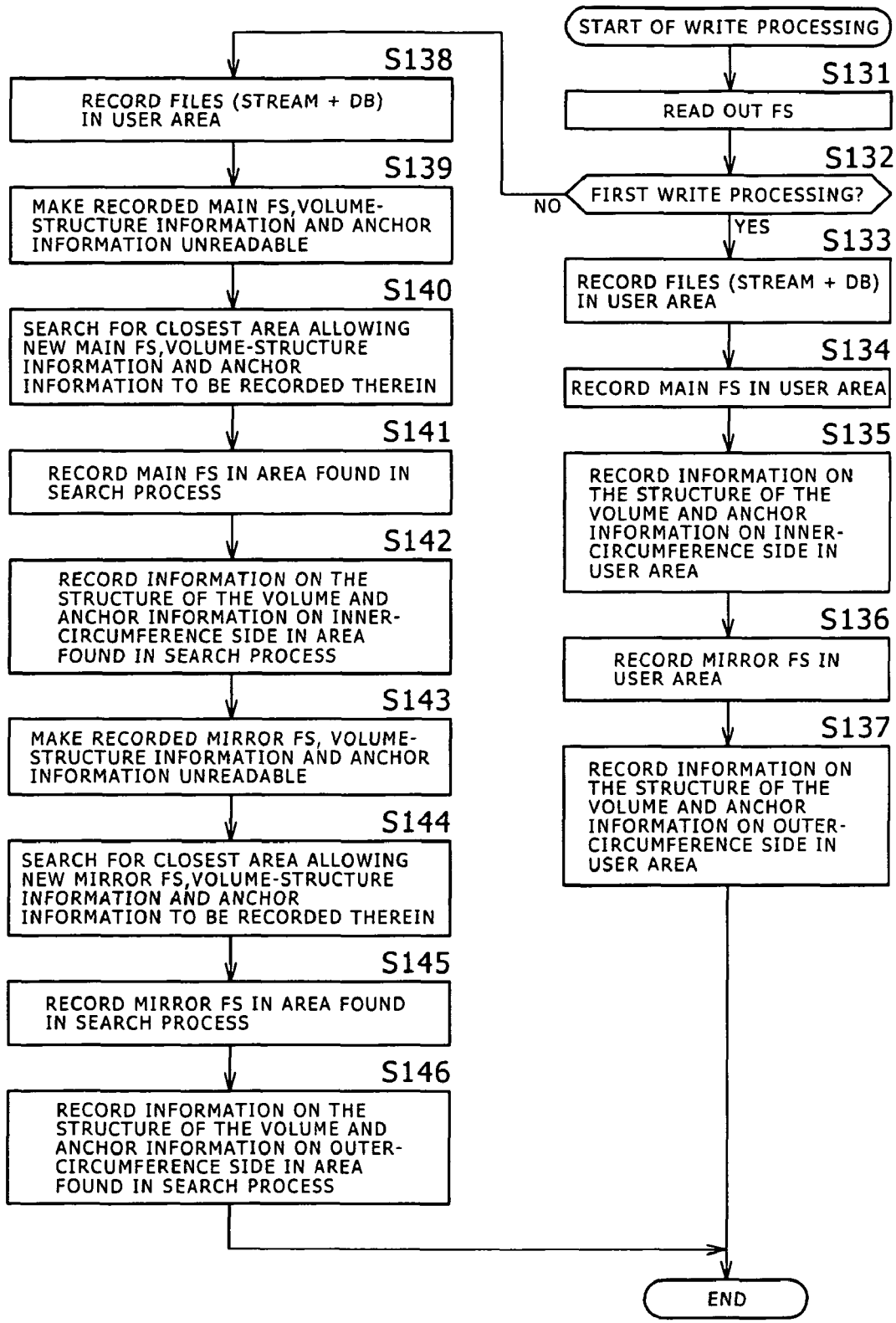
FIG. 29 shows a flowchart referred to in explanation of write processing carried out by the recording/reproduction mechanism section shown in FIG. 28.

Next, by referring to a flowchart shown in FIG. 29, the following description explains write processing carried out by the recording/reproduction mechanism section 22 shown in FIG. 28 to record information onto the recording medium 81, which has been formatted (or initialized) in the formatting processing represented by the flowchart shown in FIG. 14. It is to be noted that, since processes carried out at steps S131 to S137 as well as S139 and S143 of the flowchart shown in FIG. 29 are identical with the processes carried out at steps S11 to S19 and step S23 of the flowchart shown in FIG. 17, so the processes are not explained in detail.

In a process carried out at the step S138, the file-system information generation section 382 drives the recording/reproduction block 53 to write files into the user area on the recording medium 81. The written files are files (Stream+DB) supplied to the write section 73 from the ECC encoding section 71 by way of the modulation section 72.

Figure 30:
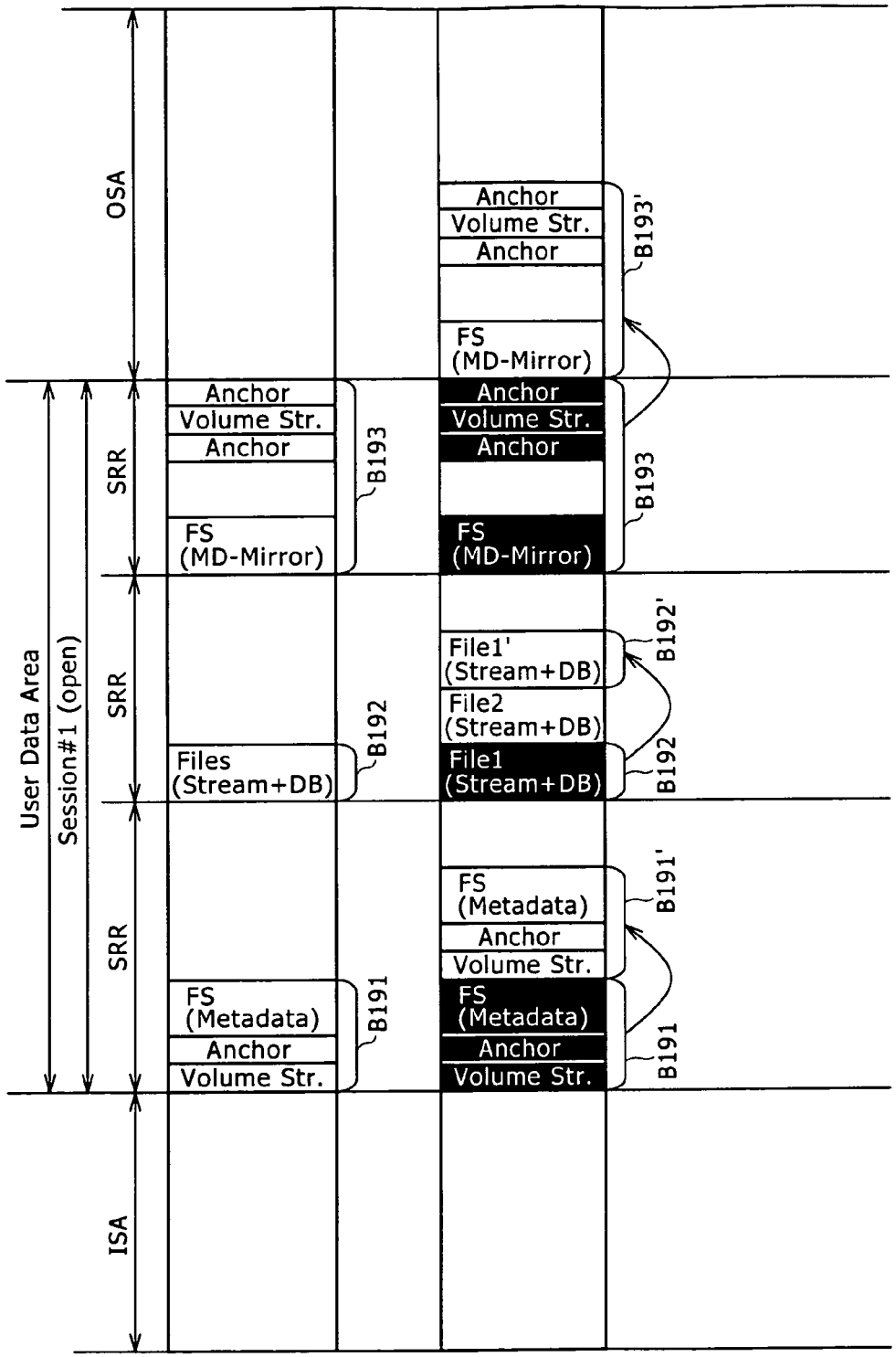
FIG. 30 is an explanatory diagram showing the write processing carried out by the recording/reproduction mechanism section shown in FIG. 28.

To be more specific, as shown in the lower diagram of FIG. 30, the file-system information generation section 382 drives the recording/reproduction block 53 to write the files (Stream+DB) shown in the figure as files supplied to the write section 73 from the ECC encoding section 71 by way of the modulation section 72 into a block B192' set on the recording medium 81 in the formatting processing, for example, if information has been recorded like in the state shown in the upper diagram of FIG. 30. To put it in more detail, in a process to incrementally record information in an already existing file, the file-system information generation section 382 incrementally records new additional information in the block B192' shown in the lower diagram of FIG. 30, adding the new information to the information already recorded in the block B192 shown in the upper diagram of FIG. 30. In a process to record a file containing new information as an update of the information already recorded in the block B192 shown in the upper diagram of FIG. 30, on the other hand, the file already recorded in the block B192 is put in a state of being unreadable and information to be recorded into the block B192' is constructed as a newly updated file to be recorded in the block B192' adjacent to the block B192. It is to be noted that, in the example shown in the lower diagram of FIG. 30, a file2 (Stream+DB) is a file recorded with a timing different from that of a file1 (Stream+DB).

Then, in a process carried out at the next step S140, the file-system information generation section 382 searches the recording area for a closest user or SA area allowing new information to be recorded therein. The new information to be recorded into the closest user area or SA area is an inner-circumference-side main FS referred to as an FS (Metadata), inner-circumference-side information on the structure of the volume and anchor information on the inner-circumference side. The inner-circumference-side main FS referred to as an FS (Metadata), the inner-circumference-side information on the structure of the volume and the anchor information on the inner-circumference side are pieces of information already generated in a process carried out at the step S139 to incrementally record information in an already existing file or update an already existing file.

In the case of the example shown in the upper diagram of FIG. 30, a free user area closest to a block B191 exists at a location adjacent to the block B191, being separated from B191 in the direction toward the outer-circumference side. A free closest area in the ISA also exists at a location adjacent to the block B191 in the direction toward the inner-circumference side. In the upper diagram of FIG. 30, the free user area and the free area in the SA exist respectively on the right and left sides of the block B191. The free user area and the free area in the SA are each an area that can be used for storing a new inner-circumference-side main FS referred to as an FS (Metadata), new inner-circumference-side information on the structure of the volume and new anchor information on the inner-circumference side. Let us assume that the file-system information generation section 382 finds a block B191' as the free closest user area as shown in the lower diagram of FIG. 30. It is to be noted that the block B191' can also be the closest free area in the ISA.

Then, in a process carried out at the next step S141, the file-system information generation section 382 supplies the main FS to the write section 73 by way of the ECC encoding section 71 and the modulation section 72 to be recorded by the recording/reproduction block 53 in an SA or user area found in the search process carried out at the step S140.

To be more specific, as shown in the lower diagram of FIG. 30, the file-system information generation section 382 supplies the main FS on the inner-circumference side to the write section 73 by way of the ECC encoding section 71 and the modulation section 72 to be recorded in a block B191' in the user area on the recording medium 81.

Then, in a process carried out at the next step S142, the file-system information generation section 382 supplies the inner-circumference-side information on the structure of the volume and the anchor information on the inner-circumference side to the write section 73 by way of the ECC encoding section 71 and the modulation section 72 to be recorded by the recording/reproduction block 53 in a user or SA area found in the search process carried out at the step S140. The innercircumference-side information on the structure of the volume and the anchor information on the inner-circumference side are pieces of information corresponding to the main FS on the inner-circumference side.

To be more specific, the file-system information generation section 382 supplies the inner-circumference-side information on the structure of the volume and the anchor information on the inner-circumference side to the write section 73 by way of the ECC encoding section 71 and the modulation section 72 to be recorded in the block B191' of the user area on the recording medium 81 as shown in the lower diagram of FIG. 30.

Then, in a process carried out at the next step S144, the file-system information generation section 382 searches the recording area for a closest SA or user area allowing new information to be recorded therein. The new information to be recorded into the closest SA area is an outer-circumference-side mirror FS referred to as an FS (MD-Mirror), outer-circumference-side information on the structure of the volume and anchor information on the outer-circumference side. The FS (MD-Mirror) on the outer-circumference side, the outer-circumference-side information on the structure of the volume and the anchor information on the outer-circumference side are pieces of information already generated in a process carried out at the step S143.

To be more specific, in the example shown in the lower diagram of FIG. 30, a block B193' found as an area closet to the block B193 in the search process is an area in the OSA. Thus, the file-system information generation section 382 selects the block B193' in the OSA as an area to be used for recording the new outer-circumference-side mirror FS referred to as an FS (MD-Mirror), the new outer-circumference-side information on the structure of the volume and the new anchor information on the outer-circumference side as shown in the lower diagram of FIG. 30. On the other hand, the block B193 is an area used for storing the previous outer-circumference-side mirror FS referred to as an FS (MD-Mirror), the previous outer-circumference-side information on the structure of the volume and the anchor information on the outer-circumference side. The block B193' exists at a location adjacent to the block B191, being separated from the block B191 in the direction toward the outer-circumference side.

Then, in a process carried out at the next step S145, the file-system information generation section 382 supplies the outer-circumference-side mirror FS to the write section 73 by way of the ECC encoding section 71 and the modulation section 72 to be recorded by the recording/reproduction block 53 in an SA or user area found in the search process carried out at the step S144.

To be more specific, the file-system information generation section 382 supplies the mirror FS to the write section 73 by way of the ECC encoding section 71 and the modulation section 72 to be recorded in a block B193' in the OSA on the recording medium 81 as shown in the lower diagram of FIG. 30.

Then, in a process carried out at the next step S146, the file-system information generation section 382 supplies the outer-circumference-side information on the structure of the volume and the anchor information on the outer-circumference side to the write section 73 by way of the ECC encoding section 71 and the modulation section 72 to be recorded by the recording/reproduction block 53 in the SA or user area found in the search process carried out at the step S144. The outer-circumference-side information on the structure of the volume and the anchor information on the outer-circumference side are pieces of information corresponding to the mirror FS.

To be more specific, the file-system information generation section 382 supplies the outer-circumference-side information on the structure of the volume and the anchor information on the outer-circumference side to the write section 73 by way of the ECC encoding section 71 and the modulation section 72 to be recorded in a block B193' in the OSA on the recording medium 81 as shown in the lower diagram of FIG. 30.

In the processing carried out as described above in order to incrementally record information in an already existing file or update an already existing file, pieces of updating information including file-system information, information on the structure of the volume and anchor information are recorded sequentially in alternate sectors in a closest user or SA area. Thus, in spite of the fact that the pieces of updating information including file-system information, information on the structure of the volume and anchor information are recorded at locations physically different from their original locations, information can be recorded onto the recording medium without modifying the logical addresses of the file-system information, the information on the structure of the volume and the anchor information. In addition, it is no longer necessary to change the logical addresses of the file-system information, the information on the structure of the volume, the anchor information and other information for every process to incrementally record information in an already existing file or update an already existing file. As a result, even for a recording medium allowing no overwriting of data on the same location as is the case with a write-once recording medium, information that must be recorded at a fixed location in the logical-address space appears like information treatable in a way as if overwriting were permitted. In addition, in a process to incrementally record information in an already existing file or update an already existing file, pieces of updating information including file-system information, information on the structure of the volume and anchor information can be recorded in a closest user or SA area as described above. Thus, if necessary, an SA area provided originally as an alternate area of an area with a defective sector detected in a recording medium can be used in a process to incrementally record information in an already existing ordinary file or update an already existing ordinary file while assuring an area in the SA for its original purpose.

In the example described above, management information is recorded in closest areas at locations adjacently separated from areas used for recording previous management area in the direction toward the outer-circumference side. It is to be noted, however, that the management information can also be recorded in closest areas at locations adjacently separated from the areas used for recording previous management area in the direction toward the inner-circumference side. The information-recording processes carried out at the steps S133 to S138 as well the steps S141, S142, S145 and S146 of the flowchart shown in FIG. 29 will be described in more detail later.

The above descriptions explain a case in which during the processing carried out in order to incrementally record information in an already existing file or update an already existing file, pieces of updating information including file-system information, information on the structure of the volume and anchor information are recorded sequentially in alternate sectors in a closest user or SA area. However, it is also possible to provide a configuration in which a dedicated SRR is provided as an area used for recording each of the file-system information, information on the structure of the volume and anchor information and, in a process to incrementally record information in an already existing file or update an already existing file, pieces of updating information including file-system information, information on the structure of the volume and anchor information are each recorded in a free area in a dedicated SRR allocated to the information. It is to be noted that, in this case, if a free area no longer exists in a dedicated SRR, the information to which the dedicated SRR is allocated can be recorded in an SA area.

Figure 31:
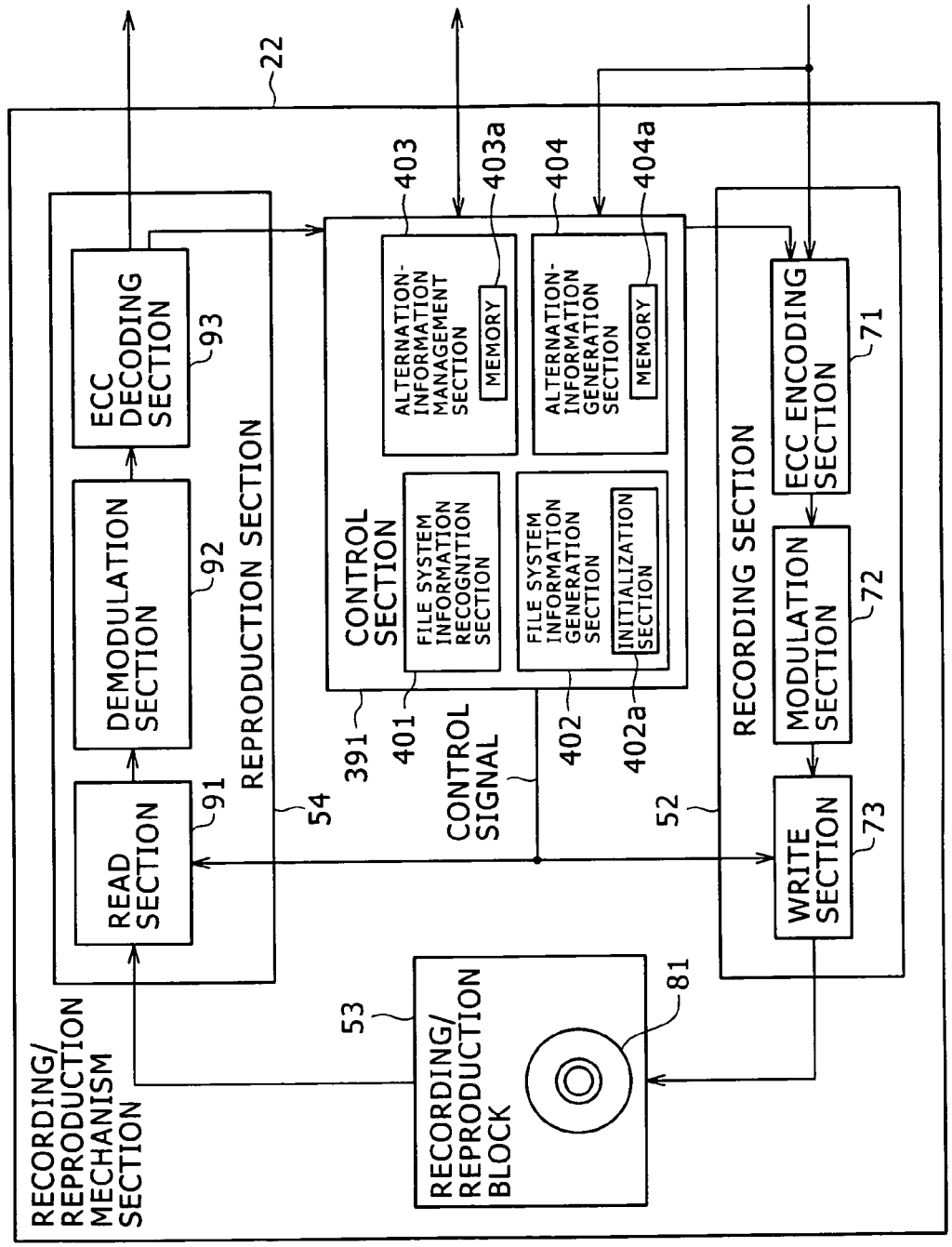
FIG. 31 is an explanatory diagram showing a still further configuration of the recording/reproduction mechanism section.

FIG. 31 is a diagram showing the configuration of a recording/reproduction apparatus 22 in which a dedicated SRR is provided as an area used for recording each of the file-system information, information on the structure of the volume and anchor information and, in a process to incrementally record information in an already existing file or update an already existing file, pieces of updating information including file-system information, information on the structure of the volume and anchor information are each recorded in a free area in a dedicated SRR allocated to the information. It is to be noted that every component included in the recording/reproduction mechanism section 22 shown in FIG. 31 as a component identical with its counterpart employed in the recording/reproduction mechanism section 22 shown in FIG. 3 is denoted by the same reference numeral as the counterpart and the explanation of the component is properly omitted.

The configuration of the recording/reproduction mechanism section 22 shown in FIG. 31 is different from the configuration of the recording/reproduction mechanism section 22 shown in FIG. 3 in that the recording/reproduction mechanism section 22 shown in FIG. 31 employs a control section 391 as a substitute for the control section 51 shown in FIG. 3. The control section 391 is different from the control section 51 in that the control section 391 employs a file-system information recognition section 401 as a substitute for the file-system information recognition section 61 employed in the control section 51, a file-system information generation section 402 as a substitute for the file-system information generation section 62 employed in the control section 51, an alternation-information management section 403 as substitute for the alternation-information management section 63 employed in the control section 51 and an alternation-information generation section 404 as a substitute for the alternation-information generation section 64 employed in the control section 51.

Functions of the file-system information recognition section 401 are the same as those of the file-system information recognition section 61.

Basic functions of the file-system information generation section 402 are the same as those of the file-system information generation section 62 except that, in a process to newly record a file, the file-system information generation section 402 records a main FS, inner-circumference-side information on the structure of the volume, anchor information on the inner-circumference side, a mirror FS, outer-circumference-side information on the structure of the volume and anchor information on the outer-circumference side in a dedicated SRR allocated to each of the pieces of information. In a process to incrementally record information in an already existing file or update an already existing file, on the other hand, the file-system information generation section 402 records a main FS, inner-circumference-side information on the structure of the volume, anchor information on the inner-circumference side, a mirror FS, outer-circumference-side information on the structure of the volume and anchor information on the outer-circumference side as replacement information of pre-processing information into an area in a dedicated SRR allocated to each of the pieces of information. The main FS, the inner-circumference-side information on the structure of the volume, the anchor information on the inner-circumference side, the mirror FS, the outer-circumference-side information on the structure of the volume and the anchor information on the outer-circumference side are pieces of information obtained as a result of the process to incrementally record information in an already existing file or update an already existing file. Recorded in their original locations before the process to incrementally record information in an already existing file or update an already existing file, the pre-processing information is a main FS, inner-circumference-side information on the structure of the volume, anchor information on the inner-circumference side, a mirror FS, outer-circumference-side information on the structure of the volume and anchor information on the outer-circumference side. The area in a dedicated SRR can be an area in the user or SA area. In this way, also in a process to record information in a user area, the file-system information generation section 402 records the actually updated information at another location on the recording medium 81 without changing the location in the logical-address space in the same way as if the information were recorded in an SA area.

It is to be noted that the alternation-information management section 403, a memory 403a, the alternation-information generation section 404 and a memory 404a are identical respectively with the alternation-information management section 63, the memory 63a, the alternation-information generation section 64 and the memory 64a, which are employed in the recording/reproduction apparatus 22 shown in FIG. 3, so that explanations are omitted.

Figure 32:
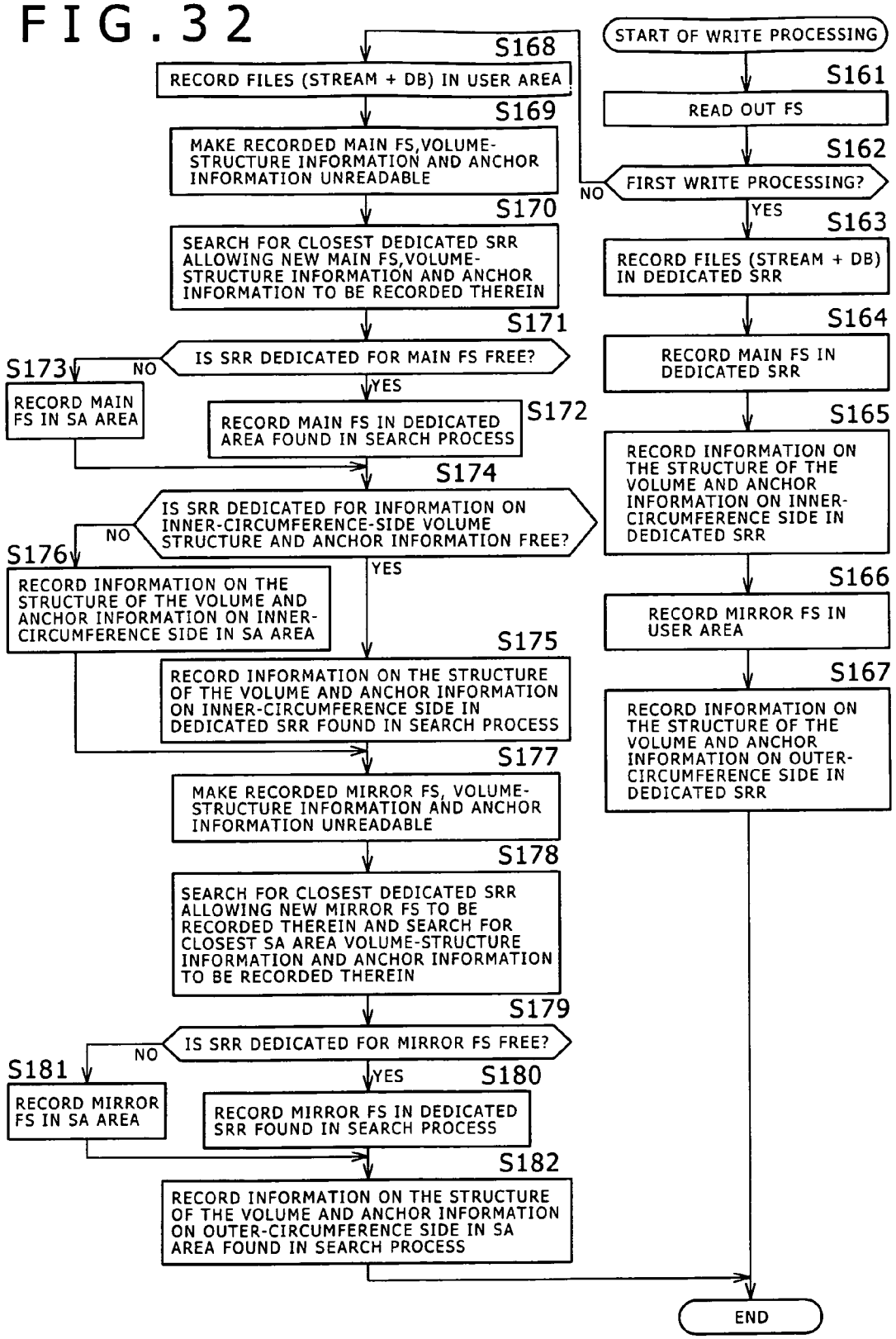
FIG. 32 shows a flowchart referred to in explanation of write processing carried out by the recording/reproduction mechanism section shown in FIG. 31.

Next, by referring to a flowchart shown in FIG. 32, the following description explains write processing carried out by the recording/reproduction mechanism section 22 shown in FIG. 31 to record information onto the recording medium 81, which has been formatted (or initialized) in the formatting processing represented by the flowchart shown in FIG. 14.

The flowchart shown in FIG. 32 begins with a step S161 at which the file-system information generation section 402 generates file-system information on the basis of information such as the attribute of a file, in which information is to be incrementally recorded, or a file to be updated and fetches the generated file-system information.

Then, in a process carried out at the next step S162, the file-system information generation section 402 produces a result of determination as to whether or not this write processing is being carried out for the first time.

If the determination result produced in the process carried out at the step S162 indicates that this write processing is being carried out for the first time, the flow of the processing goes on to a step S163 at which the file-system information generation section 402 drives the recording/reproduction block 53 to write files into dedicated SRRs in the user area on the recording medium 81. The written files are files (Stream+DB) supplied to the write section 73 from the ECC encoding section 71 by way of the modulation section 72. The files (Stream+DB) are files (Stream) shown in FIG. 33 as files each containing stream data and files (DB) shown in the same figure as files each containing a database used for controlling the stream data.

Figure 33:
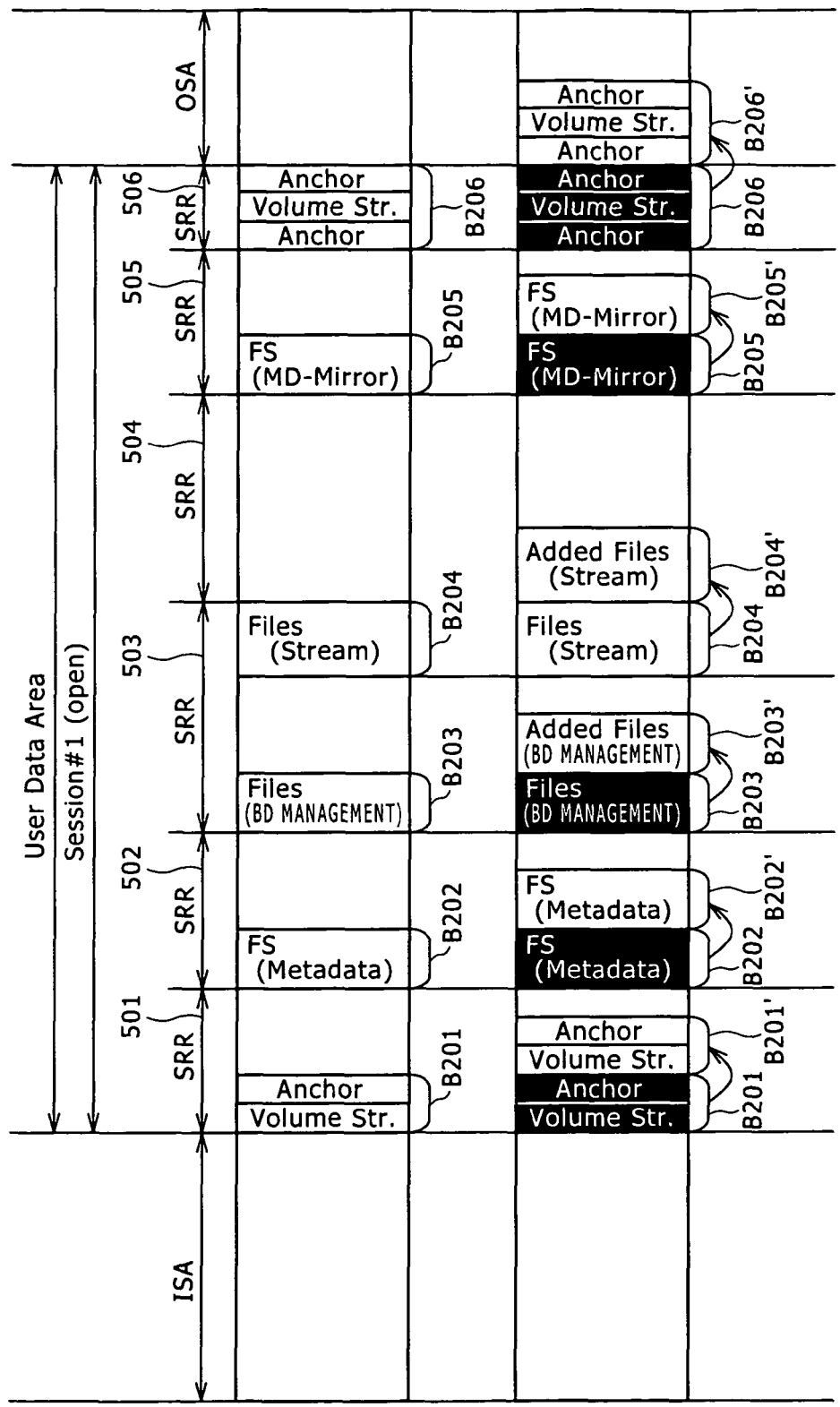
FIG. 33 is an explanatory diagram showing the write processing carried out by the recording/reproduction mechanism section shown in FIG. 31.

To be more specific, as shown in the upper diagram of FIG. 33, the file-system information generation section 402 drives the recording/reproduction block 53 to write the files (Stream) shown in the figure as files supplied to the write section 73 from the ECC encoding section 71 by way of the modulation section 72 into the block B204 in a dedicated SRR 504 set among areas on the recording medium 81 in the formatting processing as an SRR used for recording the files (Stream), and write the files (BD management) shown in the figure as files supplied to the write section 73 from the ECC encoding section 71 by way of the modulation section 72 into the block B203 in a dedicated SRR 503 set among areas on the recording medium 81 in the formatting processing as an SRR used for recording the files (BD management). It is to be noted that, as described earlier, FIG. 33 shows a typical case in which the recording medium 81 is a single-layer BD-R.

Then, in a process carried out at the next step S164, the file-system information generation section 402 drives the recording/reproduction block 53 to write a main FS supplied to the write section 73 from the ECC encoding section 71 by way of the modulation section 72 into a dedicated SRR 502 set in the user area as an SRR used for recording the main FS on the recording medium 81.

To be more specific, as shown in the upper diagram of FIG. 33, the file-system information generation section 402 drives the recording/reproduction block 53 to write an FS (Metadata) shown in the figure as file-system information supplied to the write section 73 from the ECC encoding section 71 by way of the modulation section 72 into a block B202 in the dedicated SRR 502 set on the recording medium 81 in the formatting processing as an SRR used for recording the main FS.

Then, in a process carried out at the next step S165, the file-system information generation section 402 drives the recording/reproduction block 53 to write inner-circumference-side information on the structure of the volume and anchor information on the inner-circumference side into a dedicated SRR set in the user area on the recording medium 81. The inner-circumference-side information on the structure of the volume and the anchor information on the inner-circumference side are pieces of information supplied to the write section 73 from the ECC encoding section 71 by way of the modulation section 72.

To be more specific, as shown in the upper diagram of FIG. 33, the file-system information generation section 402 drives the recording/reproduction block 53 to write 'Volume Str.' and 'Anchor' shown in the figure as respectively the inner-circumference-side information on the structure of the volume and the anchor information on the inner-circumference side into a block B201 in a dedicated SRR 501 set on the recording medium 81 in the formatting processing as an SRR 501 used for the recording inner-circumference-side information on the structure of the volume and the anchor information on the inner-circumference side. Supplied to the write section 73 from the ECC encoding section 71 by way of the modulation section 72, the inner-circumference-side information on the structure of the volume and the anchor information on the inner-circumference side are pieces of information corresponding to the main FS.

Then, in a process carried out at the next step S166, the file-system information generation section 402 drives the recording/reproduction block 53 to write a mirror FS supplied to the write section 73 from the ECC encoding section 71 by way of the modulation section 72 into a dedicated SRR in the user area set on the recording medium 81.

To be more specific, as shown in the upper diagram of FIG. 33, the file-system information generation section 402 drives the recording/reproduction block 53 to write an FS (MD-Mirror) shown in the figure as file-system information supplied to the write section 73 from the ECC encoding section 71 by way of the modulation section 72 into a block B205 in a dedicated SRR 505 set on the recording medium 81 in the formatting processing as an SRR used for recording the mirror FS.

Then, in a process carried out at the next step S167, the file-system information generation section 402 drives the recording/reproduction block 53 to write outer-circumference-side information on the structure of the volume and anchor information, which are supplied to the write section 73 from the ECC encoding section 71 by way of the modulation section 72, into a dedicated SRR in the user area set on the recording medium 81.

To be more specific, as shown in the upper diagram of FIG. 33, the file-system information generation section 402 drives the recording/reproduction block 53 to write 'Volume Str.' and 'Anchor' shown in the figure as respectively the outer-circumference-side information on the structure of the volume and the anchor information into a block B206 in a dedicated SRR 506 set on the recording medium 81 in the formatting processing as a dedicated SRR used for recording the outer-circumference-side information on the structure of the volume and the anchor information. Supplied to the write section 73 from the ECC encoding section 71 by way of the modulation section 72, the outer-circumference-side information on the structure of the volume and the anchor information are pieces of information corresponding to the mirror FS.

If the determination result produced in the process carried out at the step S162 indicates that this write processing has been carried out at least once before at the steps S163 to S167, on the other hand, the flow of the processing goes on to a step S168.

In a process carried out at the step S168, the file-system information generation section 402 drives the recording/reproduction block 53 to write files into dedicated SRRs in the user area on the recording medium 81. The written files are stream data (Files (stream) shown in FIG. 33) and database (Files (BD management) also shown in the figure) for managing the stream data. These files are supplied to the write section 73 from the ECC encoding section 71 by way of the modulation section 72.

To be more specific, as shown in the lower diagram of FIG. 33, the file-system information generation section 402 drives the recording/reproduction block 53 to write the files (Files (Stream) and Files (BD management) shown in the figure) as files supplied to the write section 73 from the ECC encoding section 71 by way of the modulation section 72 into a block B204' in a dedicated SRR 504 and a block B203' in a dedicated SRR 503 respectively, set on the recording medium 81 in the formatting processing, for example, if information has been recorded like in the processing state shown in the upper diagram of FIG. 33. To put it in more detail, in a process to incrementally record information (Added Files (stream) in the figure) in already existing files (Stream), the file-system information generation section 402 incrementally records new additional information in the block B204' of the dedicated SRR 504 shown in the lower diagram of FIG. 33, adding the new information to the information already recorded in the block B204 of the dedicated SRR 504 shown in the upper diagram of FIG. 33. In a process to record a file containing new information (Added Files (BD management)) as an update of the files already recorded in the block B203 of the dedicated SRR 503 shown in the upper diagram of FIG. 33, on the other hand, the files already recorded in the block B203 of the dedicated SRR 503 are put in a state of being unreadable, and information to be recorded into the block B203' of the dedicated SRR 503 is constructed as a newly updated file to be recorded in the block B203' adjacent to the block B203 in the SRR 503.

Then, in a process carried out at the next step S169, the file-system information generation section 402 controls the write section 73 through the ECC encoding section 71 and the modulation section 72 to put the inner-circumference-side main FS referred to as an FS (Metadata), the inner-circumference-side information on the structure of the volume and the anchor information in a state of being unreadable by the recording/reproduction block 53 out from the recording medium 81.

To be more specific, the file-system information generation section 402 puts the main FS referred to as an FS (Metadata) recorded in the block B202 in the dedicated SRR 502 as shown in the lower diagram of FIG. 33 and the inner-circumference-side information on the structure of the volume and the anchor information in a state of being unreadable by the recording/reproduction block 53 out from the recording medium 81. The inner-circumference-side information on the structure of the volume and the anchor information are pieces of information already recorded in the block B201 of the dedicated SRR 501 as shown in the lower diagram of FIG. 33. It is to be noted that, in the diagrams shown in FIG. 33, an area put in a state of being unreadable by the recording/reproduction block 53 out from the recording medium 81 is shown as a black box marked with white characters. An unreadable area mentioned in the following description is also shown in figures as such a black box.

Then, in a process carried out at the next step S170, the file-system information generation section 402 searches each of the dedicated SRRs for a closest location allowing new information to be recorded therein. The new information to be recorded into the closest location is an inner-circumference-side main FS referred to as an FS (Metadata) and inner-circumference-side information on the structure of the volume and anchor information to which the dedicated SRRs are allocated. The main FS referred to as an FS (Metadata), the information on the structure of the volume and the anchor information have been generated in a process carried out at the step S169 to incrementally record information in an already existing file or update an already existing file.

To be more specific, in the case of the example of shown in the upper diagram of FIG. 33, the closest location found in the search process carried out by the file-system information generation section 402 as a location allowing the new FS (Metadata) to be recorded in the SRR 502 allocated to main FSes is a block B202' adjacent to the block B202 provided in the dedicated SRR 502 as an area used for recording the main FS, which has been put in a state of being unreadable from the block B202 as shown in the lower diagram of FIG. 33. By the same token, the closest location found in the search process carried out by the file-system information generation section 402 as a location allowing new inner-circumference-side information on the structure of the volume and new anchor information to be recorded in the SRR 501 allocated to inner-circumference-side information on the structure of the volume and anchor information is a block B201' adjacent to the block B201 provided in the dedicated SRR 501 as an area used for recording the inner-circumference-side information on the structure of the volume and the anchor information as shown in the lower diagram of FIG. 33. The block B201 is put in a state of being unreadable.

Then, in a process carried out at the next step S171, the file-system information generation section 402 produces a result of determination as to whether or not the dedicated SRR 502 allocated to inner-circumference-side main FSes includes a free area allowing a new main FS on the inner-circumference side to be recorded therein. Since the dedicated SRR 502 includes such a free area in the case of the example shown in FIG. 33, the flow of the processing goes on to a step S172.

In a process carried out at the step S172, the file-system information generation section 402 supplies the main FS on the inner-circumference side to the write section 73 by way the ECC encoding section 71 and the modulation section 72 to be recorded by the recording/reproduction block 53 in the free area found in the search process carried out at the step S170.

To be more specific, as shown in the lower diagram of FIG. 33, the file-system information generation section 402 supplies the new file-system information to the write section 73 by way the ECC encoding section 71 and the modulation section 72 to be recorded in a block B202' in the dedicated SRR 502 on the recording medium 81.

Then, in a process carried out at the next step S174, the file-system information generation section 402 produces a result of determination as to whether or not the dedicated SRR 501 allocated to inner-circumference-side information on the structure of the volume and anchor information includes a free area allowing new information on the structure of the volume and new anchor information to be recorded therein. Since the dedicated SRR 501 includes such a free area in the case of the example shown in FIG. 33, the flow of the processing goes on to a step S175.

In a process carried out at the step S175, the file-system information generation section 402 supplies the new inner-circumference-side information on the structure of the volume and the new anchor information corresponding to the main FS to the write section 73 by way the ECC encoding section 71 and the modulation section 72 to be recorded by the recording/reproduction block 53 in the free area found in the search process carried out at the step S170 as an area in a dedicated SRR allocated to information on the structure of the volume and new anchor information.

To be more specific, as shown in the lower diagram of FIG. 33, the file-system information generation section 402 supplies the new inner-circumference-side information on the structure of the volume and the new anchor information to the write section 73 by way the ECC encoding section 71 and the modulation section 72 to be recorded in a block B201' in the dedicated SRR 501 set on the recording medium 81 as an SRR allocated to inner-circumference-side information on the structure of the volume and anchor information.

Then, in a process carried out at the next step S177, the file-system information generation section 402 controls the write section 73 through the ECC encoding section 71 and the modulation section 72 to put the outer-circumference-side mirror FS referred to as an FS (MD-Mirror), the information on the structure of the volume and the anchor information in a state of being unreadable by the recording/reproduction block 53 out from the recording medium 81. The FS (MD-Mirror), the information on the structure of the volume and the anchor information have been recorded in dedicated SRRs allocated to the outer-circumference-side mirror FS, the information on the structure of the volume and the anchor information.

To be more specific, as shown in the lower diagram of FIG. 33, the file-system information generation section 402 puts the FS (MD-Mirror) recorded in a block B205 of a dedicated SRR 505 as well as the information on the structure of the volume and the anchor information recorded in the block B206 of a dedicated SRR 506 in a state of being unreadable by the recording/reproduction block 53 out from the recording medium 81.

Then, in a process carried out at the next step S178 corresponding to the process at the step S177, the file-system information generation section 402 searches dedicated SRRs for a closest user or SA area allowing new information to be recorded therein. The new information to be recorded into the closest user or SA area is an outer-circumference-side mirror FS, information on the structure of the volume and anchor information.

To be more specific, in the case of the example of shown in the upper diagram of FIG. 33, the closest location found in the search process carried out by the file-system information generation section 402 as a location allowing a new outer-circumference-side mirror FS referred to as the FS (MD-Mirror) to be recorded in the SRR 505 allocated to mirror FSes is a block B205' adjacent to the block B205 provided in the dedicated SRR 505, which has been put in a state of being unreadable as shown in the diagram of FIG. 33. By the same token, the closest location found in the search process carried out by the file-system information generation section 402 as a location allowing new outer-circumference-side information on the structure of the volume and new anchor information to be recorded in the SRR 506 allocated to information on the structure of the volume and anchor information is a block B206' adjacent to the block B206 provided in the dedicated SRR 506, which has been put in a state of being unreadable, as shown in the diagram of FIG. 33.

Then, in a process carried out at the next step S179, the file-system information generation section 402 produces a result of determination as to whether or not the dedicated SRR 505 allocated to mirror FSes includes a free area allowing a new outer-circumference-side mirror FS to be recorded therein. Since the dedicated SRR 505 includes such a free area in the case of the example shown in FIG. 33, the flow of the processing goes on to a step S180.

In a process carried out at the step S180, the file-system information generation section 402 supplies the outer-circumference-side mirror FS to the write section 73 by way the ECC encoding section 71 and the modulation section 72 to be recorded by the recording/reproduction block 53 in the free area found in the search process carried out at the step S178.

To be more specific, as shown in the lower diagram of FIG. 33, the file-system information generation section 402 supplies the new file-system information to the write section 73 by way the ECC encoding section 71 and the modulation section 72 to be recorded in the block B205' of the dedicated SRR 505 on the recording medium 81.

Then, in a process carried out at the next step S182, the file-system information generation section 402 supplies the outer-circumference-side information on the structure of the volume and the anchor information corresponding to the mirror FS to the write section 73 by way of the ECC encoding section 71 and the modulation section 72 to be recorded by the recording/reproduction block 53 in an OSA area found in the search process carried out at the step S178.

To be more specific, the file-system information generation section 402 supplies the outer-circumference-side information on the structure of the volume and the anchor information to be recorded in the block B206' of the OSA on the recording medium 81 as shown in the lower diagram of FIG. 33.

Figure 34:
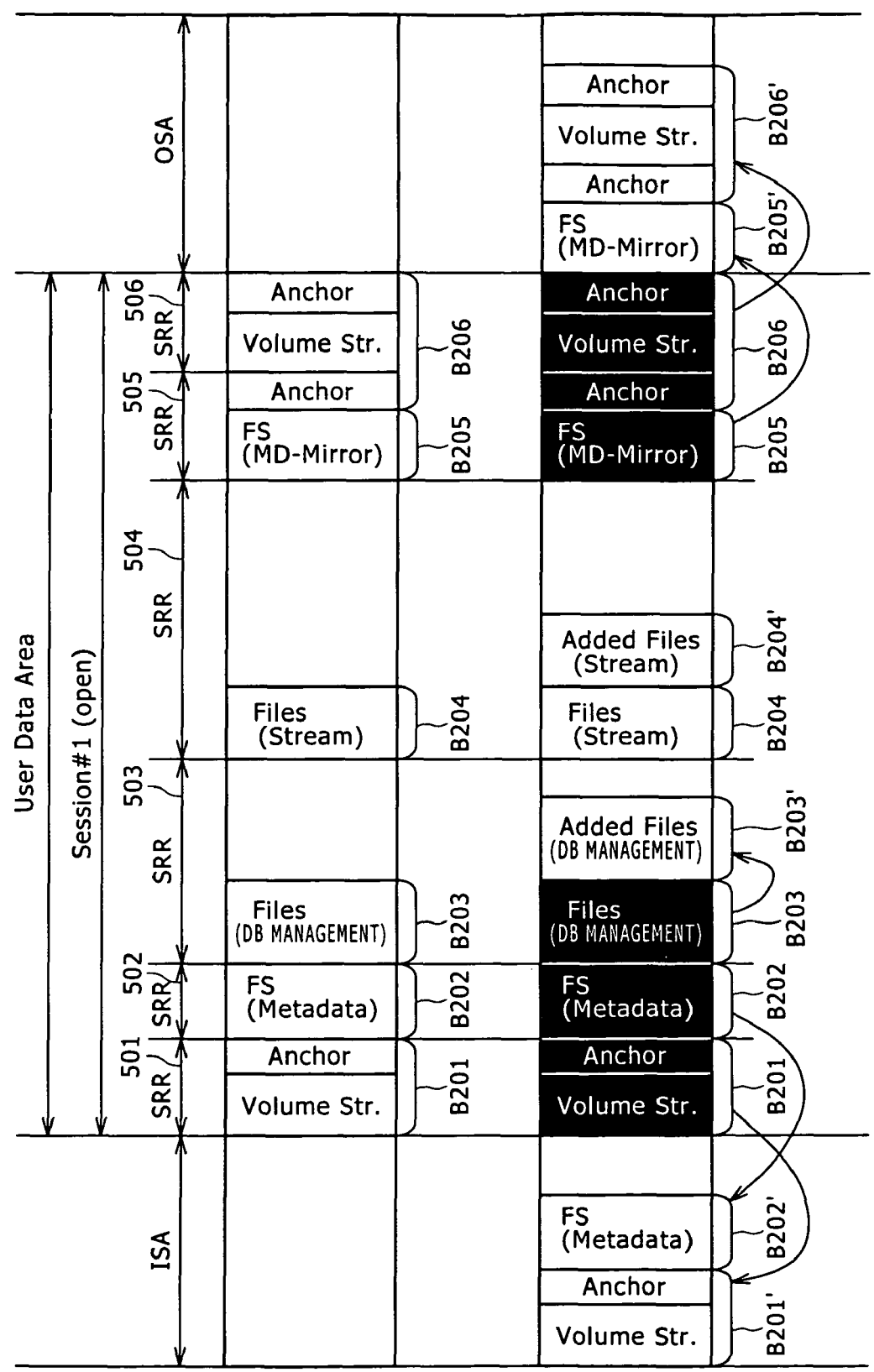
FIG. 34 is an explanatory diagram showing the write processing carried out by the recording/reproduction mechanism section shown in FIG. 31.

For example, if recorded main FSes on the inner-circumference side occupy the block B202 in the entire dedicated SRR 502 allocated to main FSes as shown in the upper diagram of FIG. 34, on the other hand, the block B202 in the entire dedicated SRR 502 will become an unreadable area in the process carried out at the step S169 so that the SRR 502 will no longer include a free area used for recording a new main FS as shown in the lower diagram of FIG. 34. In this case, the determination result produced in the process carried out at the step S171 indicates that the SRR 502 does not include such a free area, causing the flow of the processing to go on to the step S173.

In a process carried out at the step S173, the file-system information generation section 402 supplies the main FS to the write section 73 by way the ECC encoding section 71 and the modulation section 72 to be recorded by the recording/reproduction block 53 in a closest SA area.

To be more specific, as shown in the lower diagram of FIG. 34, the file-system information generation section 402 supplies the new file-system information to the write section 73 by way the ECC encoding section 71 and the modulation section 72 to be recorded in the block B202' in the ISA on the recording medium 81.

By the same token, for example, if recorded information on the structure of the volume and recorded anchor information corresponding to the main FS occupy the block B201 in the entire dedicated SRR 501 allocated to information on the structure of the volume and anchor information as shown in the upper diagram of FIG. 34, on the other hand, the block B201 in the entire dedicated SRR 501 will become an unreadable area in the process carried out at the step S169 so that the SRR 501 will no longer include a free area used for recording new information on the structure of the volume and new anchor information as shown in the lower diagram of FIG. 34. In this case, the determination result produced in the process carried out at the step S174 indicates that the SRR 501 does not include such a free area, causing the flow of the processing to go on to the step S176.

In a process carried out at the step S176, the file-system information generation section 402 supplies new inner-circumference-side information on the structure of the volume and new anchor information corresponding to the main FS to the write section 73 by way the ECC encoding section 71 and the modulation section 72 to be recorded by the recording/reproduction block 53 in a closest SA area.

To be more specific, as shown in the lower diagram of FIG. 34, the file-system information generation section 402 supplies the new inner-circumference-side information on the structure of the volume and the new anchor information to the write section 73 by way the ECC encoding section 71 and the modulation section 72 to be recorded in the block B201' in the ISA on the recording medium 81.

In addition, for example, if recorded mirror FSes occupy the block B205 in the entire dedicated SRR 505 allocated to mirror FSes as shown in the upper diagram of FIG. 34, on the other hand, the block B205 in the entire dedicated SRR 505 will become an unreadable area in the process carried out at the step S177 so that the SRR 505 will no longer include a free area used for recording a new mirror FS as shown in the lower diagram of FIG. 34. In this case, the determination result produced in the process carried out at the step S179 indicates that the SRR 505 does not include such a free area, causing the flow of the processing to go on to the step S181.

In a process carried out at the step S181, the file-system information generation section 402 supplies the mirror FS to the write section 73 by way the ECC encoding section 71 and the modulation section 72 to be recorded by the recording/reproduction block 53 in a closest SA area.

To be more specific, as shown in the lower diagram of FIG. 34, the file-system information generation section 402 supplies the new file-system information to the write section 73 by way the ECC encoding section 71 and the modulation section 72 to be recorded in the block B205' in the OSA on the recording medium 81.

It is to be noted that the information-recording processes carried out at the steps S163 to S168, S172, S173, S175, S176 and S180 to S182 of the flowchart shown in FIG. 32 will be described in more detail later.

In the processing carried out as described above in order to incrementally record information in an already existing file or update an already existing file, pieces of updating information including incrementally recorded or updated file-system information, information on the structure of the volume and anchor information are written sequentially in SRRs as replacements of the pre-updating file-system information, the information on the structure of the volume and the anchor information. Thus, in spite of the fact that the pieces of updating information including the incrementally recorded or updated file-system information, the information on the structure of the volume and the anchor information are recorded at locations physically different from their original locations, information can be recorded onto the recording medium without modifying the logical addresses of the recorded file-system information, the information on the structure of the volume and the anchor information. In addition, it is no longer necessary to change the logical addresses of the file-system information, the information on the structure of the volume, the anchor information and other for every process to incrementally record information in an already existing file or update an already existing file. As a result, even for a recording medium allowing no overwriting of data on the same location as is the case with a write-once recording medium, information that must be recorded at a fixed location in the logical-address space appears like information treatable in a way as if overwriting were permitted.

In addition, pieces of data to be recorded in a process to incrementally record information in an already existing file or update an already existing file are written basically in user areas in dedicated SRRs respectively allocated to the pieces of data. It is thus possible to prevent the SA area, which is to be used naturally when a defective sector on the recording medium 81 is detected, from being utilized wastefully. On top of that, when the dedicated SRRs each no longer have a sufficient size due to repeated execution of the process to incrementally record information in an already existing file or update an already existing file, the SA area can be used. Thus, the SA area can be used effectively in the process of recording data while it is possible to prevent the SA area from being utilized wastefully.

The following description explains the information-recording processes carried out at the steps S13 to S18 as well as the steps S21, S22, S25 and S26 of the flowchart shown in FIG. 17, the information-recording processes carried out at the steps S43 to S48 as well as the steps S50, S51, S54 and S55 of the flowchart shown in FIG. 20, the information-recording processes carried out at the steps S73 to S77 as well the steps S79, S80 and S83 of the flowchart shown in FIG. 23, the information-recording processes carried out at the steps S103 to S109, S112 to S114, S117 and S118 of the flowchart shown in FIG. 26, the information-recording processes carried out at the steps S133 to S138 as well the steps S141, S142, S145 and S146 of the flowchart shown in FIG. 29 and the information-recording processes carried out at the steps S163 to S168, S172, S173, S175, S176 and S180 to S182 of the flowchart shown in FIG. 32 in detail as follows.

Each of the above information-processing processes is carried out as alternation-information management processing followed by actual information-recording processing. The alternation-information management processing is carried out to generate a temporary DL (Defect List), which is a list of alternate-management pairs each provided for an ECC cluster of data of a file being overwritten or updated. An alternate-management pair is a pair of an alternation original location and an alternation replacement location. On the other hand, the actual information-recording processing is carried out to rearrange the order of the pairs each including an alternation original location and an alternation replacement location to generate a DL to be eventually recorded onto the recording medium 81 and to actually record the data onto the recording medium 81. In the following description, the DL to be eventually recorded onto the recording medium 81 is referred to as a final DL.

Figure 35:
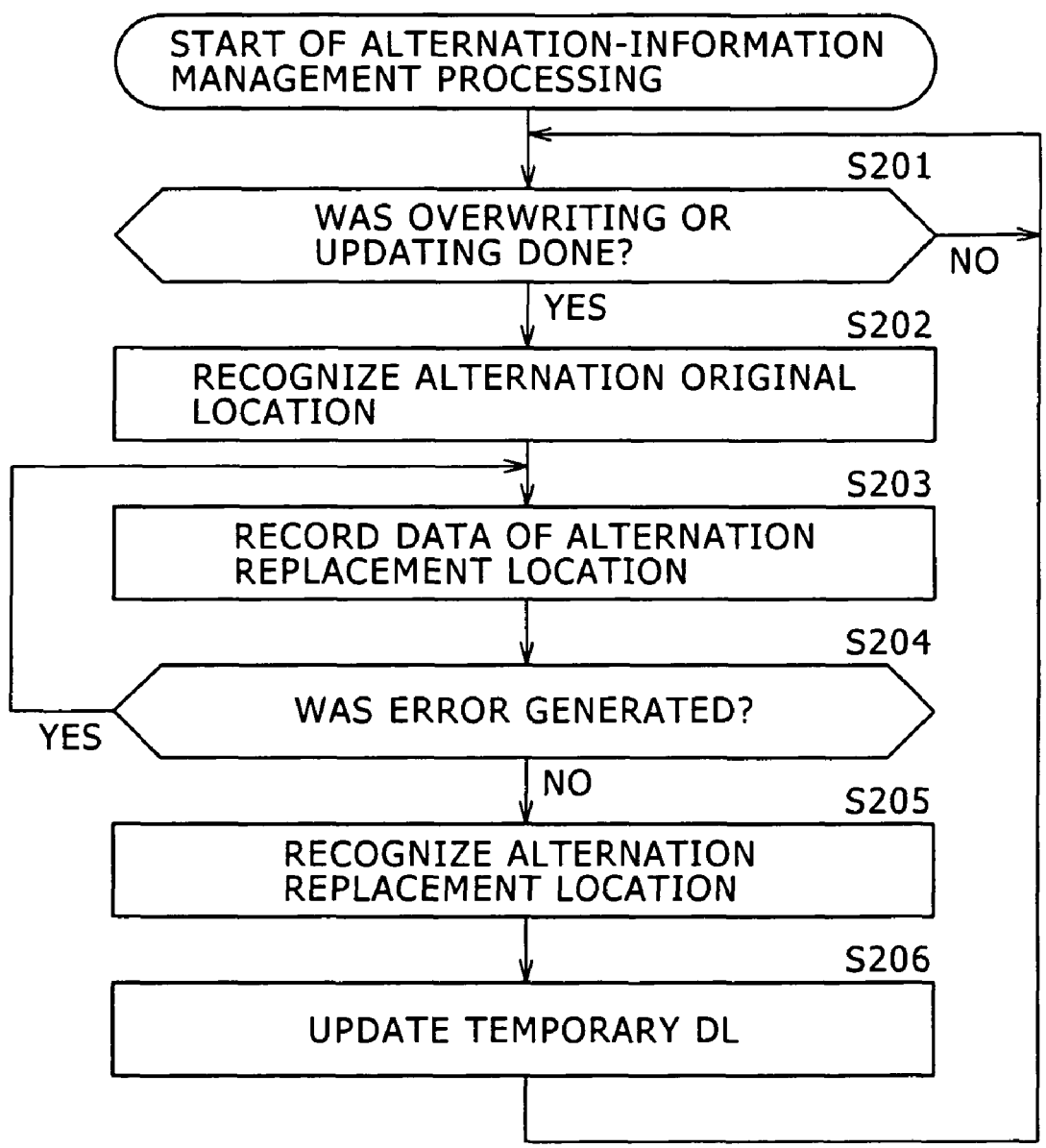
FIG. 35 shows a flowchart referred to in explanation of alternation-information management processing carried out by the recording/reproduction mechanism section shown in FIG. 3.

First of all, the alternation-information management processing is explained by referring to a flowchart shown in FIG. 35.

The flowchart begins with a step S201 at which the alternation-information management section 63 produces a result of determination as to whether or not a cluster is to be overwritten or updated. This process is carried out repeatedly till the result of determination indicates that a cluster is to be overwritten or updated. As the result of determination indicates that a cluster is to be overwritten or updated, the flow of the processing goes on to a step S202. An example leading to such a result of determination is explained as follows. In the process carried out at the step S21 of the flowchart shown in FIG. 17 to record a main FS into an SA area, for example, the main FS recorded in a block B111 shown in FIG. 18 as an alternation original location is updated into a main FS recorded in a block B111' shown in FIG. 18 as an alternation replacement location.

Then, in a process carried out at the next step S202, the alternation-information management section 63 verifies alternation original locations of predetermined clusters containing data of a file being overwritten or updated. For example, a cluster to be overwritten or updated is a cluster at an alternation original address A as shown in the upper diagram of FIG. 36. In this case, the alternation-information management section 63 verifies the alternation original address A as the alternation original location. It is to be noted that, at the left upper corner of FIG. 36, each box represents data of one cluster. Notations A and B each represent an address of the location of a cluster. In the direction toward the right side in the figure, the value of the address increases by 1 from box to box, that is, from cluster to cluster. To be more specific, the address increases from A to (A+1), from (A+1) to (A+2) and so on, or the address increases from B to (B+1), from (B+1) to (B+2) and so on. A box hatched with slanting lines represents a cluster with data actually relocated therein and a black box shown in FIG. 37 represents a cluster with no data actually relocated therein.

Then, in a process carried out at the next step S203, the alternation-information management section 63 sets the alternation replacement locations of the predetermined clusters containing data of the file being overwritten or updated and records the data at the locations. For example, the alternation original location is A and the alternation replacement location is B as shown at the left upper corner of FIG. 36. In this case, the data is stored at the location B serving as the alternation replacement location in the memory 63a.

Then, in a process carried out at the next step S204, the alternation-information management section 63 produces a result of determination as to whether or not an error has been generated in the process carried out at the step S203. If the result of determination indicates that no error has been generated in the process carried out at the step S203, on the other hand, the flow of the processing goes on to a step S205.

Subsequently, in a process carried out at the step S205, the alternation-information management section 63 verifies alternation original locations of predetermined clusters containing data of a file being overwritten or updated.

Then, in a process carried out at the next step S206, the alternation-information management section 63 updates a DL generated in a formatting process and stored in the memory 63a on the basis of the alternation original and alternation replacement addresses of the predetermined clusters containing data of the file being overwritten or updated. Subsequently, the flow of the processing goes back to the step S201.

Figure 36:
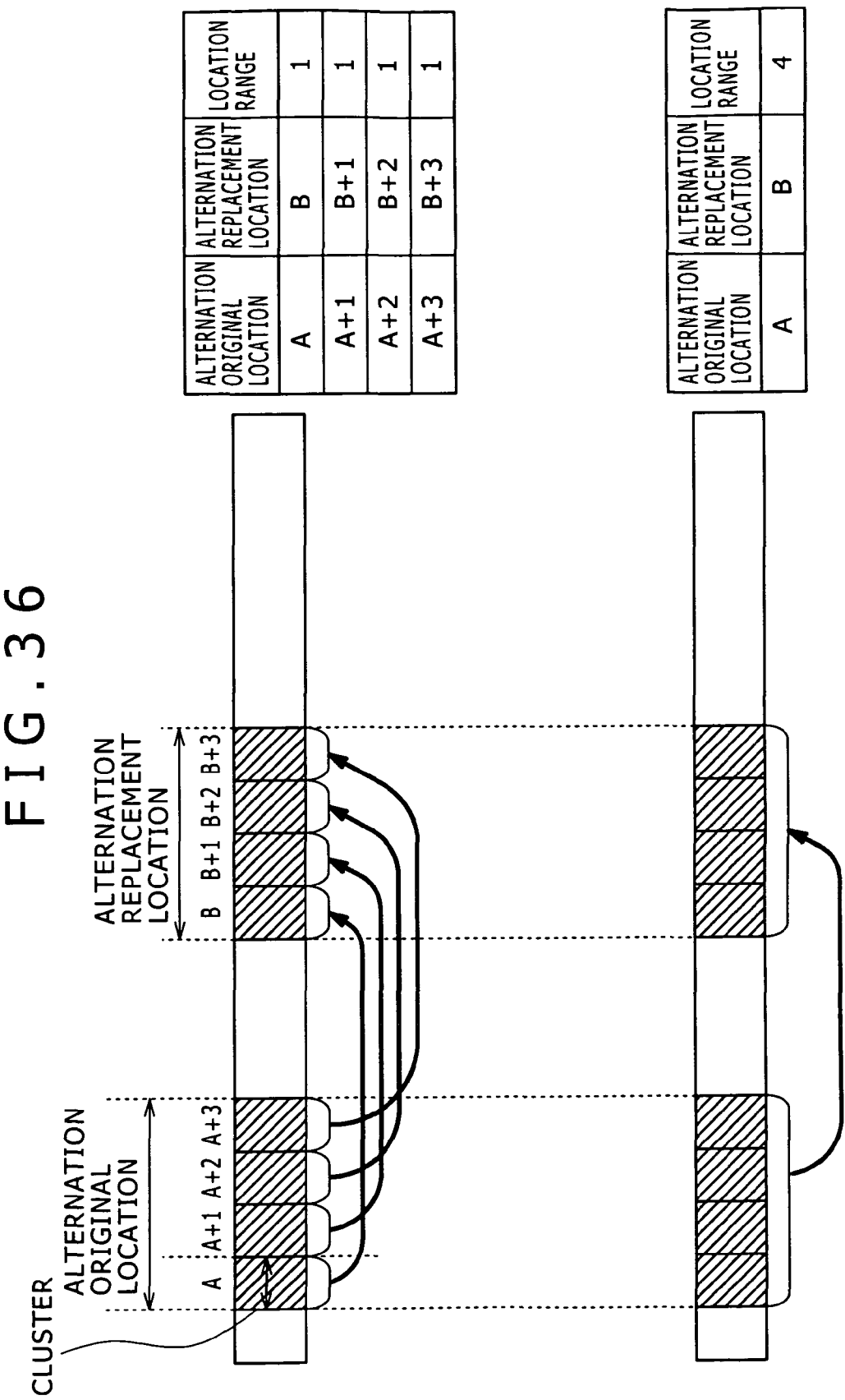
FIG. 36 is an explanatory diagram showing the alternation-information management processing carried out by the recording/reproduction mechanism section shown in FIG. 3.
Figure 37:
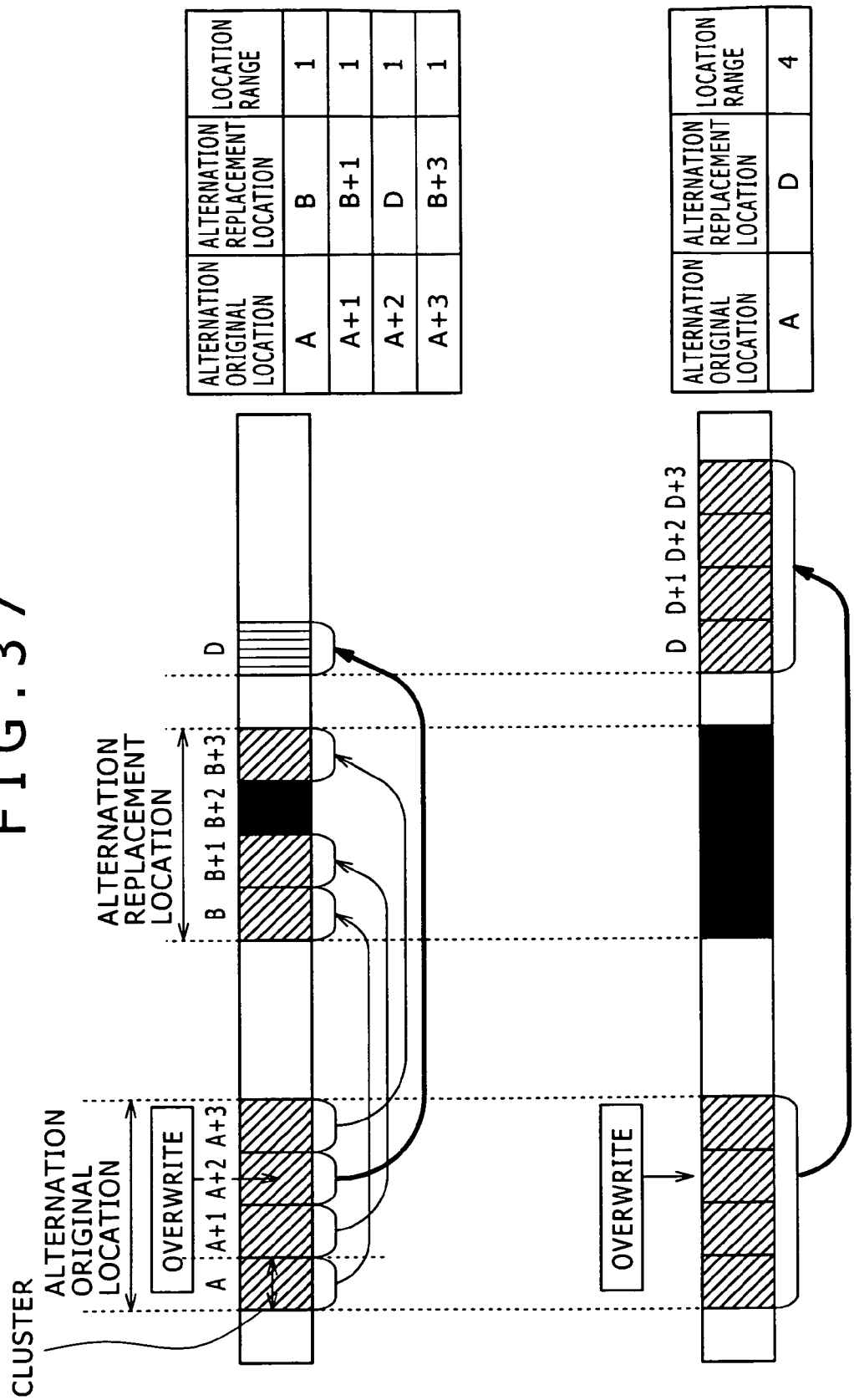
FIG. 37 is an explanatory diagram showing the alternation-information management processing carried out by the recording/reproduction mechanism section shown in FIG. 3.

In the present case, for example, the alternation original addresses and the alternation replacement addresses are as shown in the upper list at the upper right corner of FIG. 36. It is to be noted that the leftmost column on the upper list at the upper right corner of FIG. 36 is an alternation original column followed by an alternation replacement column in the middle. The alternation replacement column is followed by a cluster range column on the rightmost side. The first row of the upper list at the upper right corner of FIG. 36 shows that the address of alternation original location is A, the address of the alternation replacement location is B and these addresses are each the address of one cluster. To be more specific, the cluster starting from a location pointed to by the alternation replacement address B is the alternate cluster of the cluster starting from a location pointed to by the alternation original address A. In the case of the example shown at the upper left corner of FIG. 36, the processes of the steps S202 to S206 are carried out repeatedly four times to generate the upper list shown at the upper right corner of FIG. 36. To put it in detail, as shown in the example at the left upper corner of FIG. 36 and the upper list at the right upper corner of the figure, data to be overwritten on the cluster starting from a location pointed to by the alternation original address A or data be used as an update of the data of this cluster is actually recorded at a cluster starting from a location pointed to by the alternation replacement address B. Likewise, data to be overwritten on the cluster starting from a location pointed to by the alternation original address (A+1) or data be used as an update of the data of this cluster is actually recorded at a cluster starting from a location pointed to by the alternation replacement address (B+1). By the same token, data to be overwritten on the cluster starting from a location pointed to by the alternation original address (A+2) or data be used as an update of the data of this cluster is actually recorded at a cluster starting from a location pointed to by the alternation replacement address (B+2). In the same way, data to be overwritten on the cluster starting from a location pointed to by the alternation original address (A+3) or data be used as an update of the data of this cluster is actually recorded at a cluster starting from a location pointed to by the alternation replacement address (B+3).

Furthermore, let us assume that the data of only the cluster starting from a location indicated by the address (A+2) in the state shown at the upper left corner of FIG. 36 is overwritten as shown at the upper left corner of FIG. 37. In this case, in a process carried out at the step S202 of the flowchart shown in FIG. 35, the alternation original address is verified to be (A+2) and, in a process carried out at the step S203 of the flowchart shown in FIG. 35, the alternation replacement address is verified to be D instead of (B+2). As a result, as shown in the upper list at the right upper corner of FIG. 37, data to be overwritten on the cluster starting from a location pointed to by the alternation original address (A+2) is actually recorded at a cluster starting from a location pointed to by the alternation replacement address D. In FIG. 37, the cluster starting from a location pointed to by the alternation replacement address D is represented by a box hatched with vertical lines.

Figure 38:
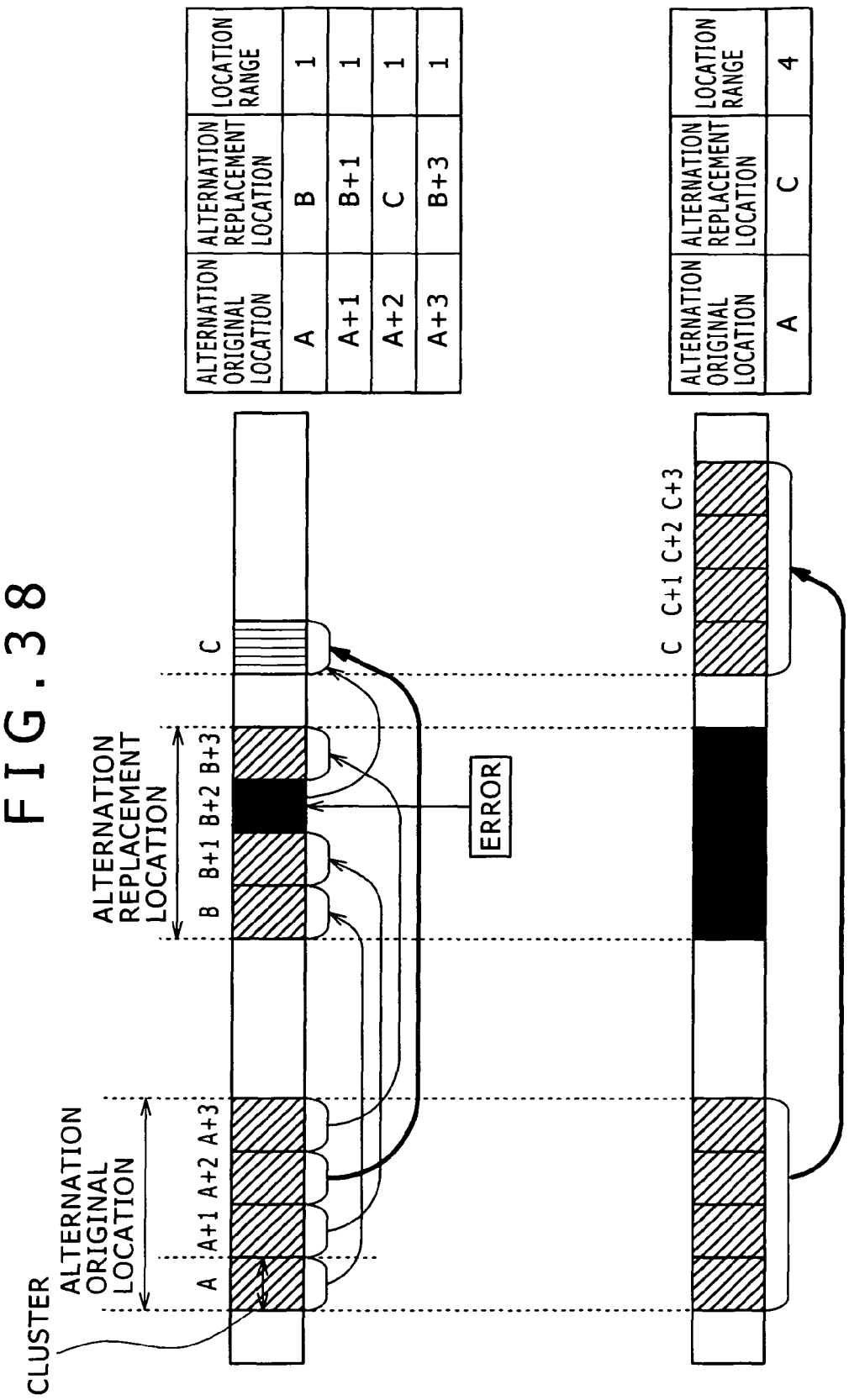
FIG. 38 is an explanatory diagram showing the alternation-information management processing carried out by the recording/reproduction mechanism section shown in FIG. 3.

As described before, if the determination result produced in the process carried out at the step S204 indicates that an error has been generated in the process carried out at the step S203, the flow of the processing goes back to the step S203 to repeat the process of the step S203. For example, data to be overwritten on the cluster starting from a location pointed to by the alternation original address (A+2) or data be used as an update of the data of this cluster is actually recorded at a cluster starting from a location pointed to by the alternation replacement address (B+2), but an error caused by some reasons may be detected as shown in an example at the upper left corner of FIG. 38. In this case, the process of the step S203 is carried out again to actually record the data to be overwritten on the cluster starting from a location pointed to by the alternation original address (A+2) this time at a cluster starting from a location pointed to by an alternation replacement address of C instead of the alternation replacement address (B+2). In addition, information recorded on the temporary DL stored in the memory 63a is corrected to indicate that the cluster starting from a location pointed to by the alternation replacement address C is the alternate cluster of the cluster starting from a location pointed to by the alternation original address (A+2) as shown at the upper right corner of FIG. 38. In FIG. 38, the cluster starting from a location pointed to by the alternation replacement address C is represented by a box hatched with vertical lines.

By carrying out the processing as described above, it is possible to generate a temporary DL showing information associating an alternation original location with an alternation replacement location at an information granularity corresponding to a cluster.

Figure 39:
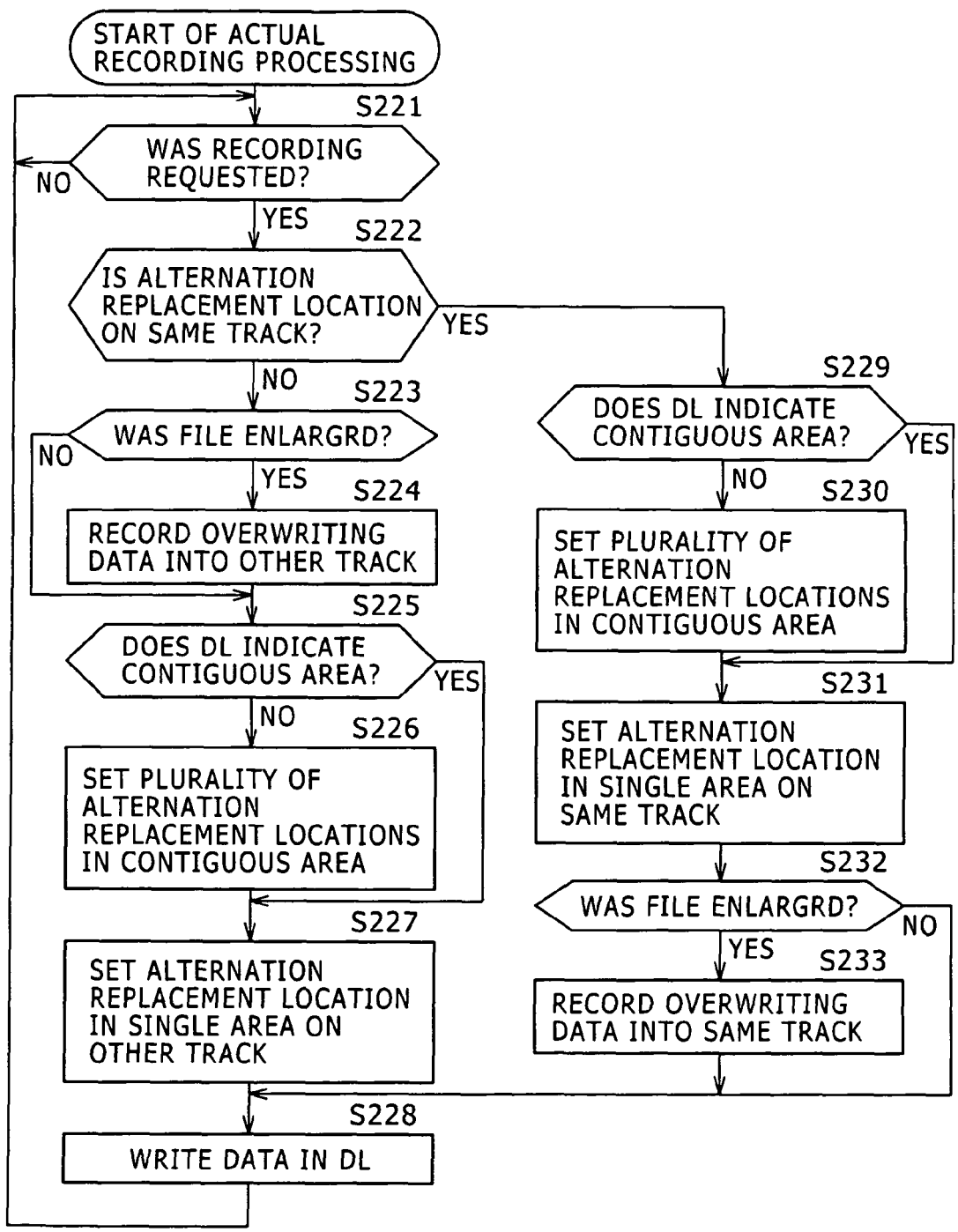
FIG. 39 shows a flowchart referred to in explanation of an actual recording process carried out by the recording/reproduction mechanism section shown in FIG. 3.

Next, the actual information-recording processing cited above is explained by referring to a flowchart shown in FIG. 39.

The flowchart begins with a step S221 at which the alternation-information generation section 64 produces a result of determination as to whether or not a command to record data onto the recording medium 81 has been received from the control section 51. Typically, the command to record data onto the recording medium 81 is issued when the size of the memory 63a can no longer accommodate data or issued to terminate the alternation-information management processing for example during the iteration of the process of the step S201 of the flowchart shown in FIG. 35.

If the determination result produced in the process carried out at the step S221 indicates that a command to record data onto the recording medium 81 has been received from the control section 51, the flow of the processing goes on to a step S222 at which the alternation-information generation section 64 produces a result of determination as to whether or not the same track or the same SRR includes both the alternation original location and alternation replacement location. To be more specific, the alternation-information generation section 64 produces a result of determination as to whether or not the track including the alternation replacement location is a track (or an SA area) different from the track including the alternation original location. If the result of determination indicates that both the alternation original location and alternation replacement location are not included in the same track or the same SRR or indicates that the track including the alternation replacement location is a track (or an SA area) different from the track including the alternation original location, the flow of the processing goes on to a step S223.

Then, in a process carried out at the next step S223, the alternation-information generation section 64 produces a result of determination as to whether or not the size of the overwriting or updating file is greater than the size of the file to be overwritten or updated. If the result of determination indicates that the size of the overwriting or updating file is not greater than the size of the file to be overwritten or updated, the flow of the processing goes on to a step S225.

In a process carried out at the step S225, the alternation-information generation section 64 inquires of the alternation-information management section 63 in regard to whether or not information recorded on the temporary DL as information on clusters is information on contiguous clusters. An example of the information on contiguous clusters is shown at the right and left upper portions of FIG. 36. As shown in the figure, the address of the first cluster at the alternation original area is A, which is followed sequentially by addresses (A+1) to (A+3). By the same token, the address of the first cluster at the alternation replacement area is B, which is followed sequentially by addresses (B+1) to (B+3). The address of the alternation replacement area is incremented by 1 for each cluster to represent locations of consecutive clusters. In this case, the response to the inquiry indicates that information recorded on the temporary DL as information on clusters is information on contiguous clusters and causes the flow of the processing to go on to a step S227.

In a process carried out at the step S227, the alternation-information generation section 64 generates a final DL and records the final DL in the memory 64a. In the final DL, the locations pointed to by the alternation replacement addresses are collected to form a single area pointed to by an address. To put it concretely, the information recorded on the temporary DL at the right upper corner of FIG. 36 is changed to information recorded on the final DL at the right lower corner of the figure. On the final DL at the right lower corner of FIG. 36, a range of four clusters starting with a cluster at the address A at the alternation original area is associated with a range of four clusters starting with a cluster at the address B at the alternation replacement area. The range of four clusters starting with a cluster at the alternation original area is pointed to by the address A, and the range of four clusters starting with a cluster at the alternation replacement area is pointed to by the address B. Since the information recorded on the temporary DL as information associating every alternation original locations with an alternation replacement location at an information granularity corresponding to a cluster is converted into information on an alternation original location and an alternation replacement location, which each represent a plurality of contiguous clusters in this way, the temporary DL can be changed to the final DL to be stored in the memory 64a as a DL having a smaller size.

Then, in a process carried out at the next step S228, the alternation-information generation section 64 requests the recording section 52 to record data based on the final DL stored in the memory 64a onto the recording medium 81 and also record the final DL itself onto the recording medium 81 as well.

As described above, the final DL is generated on the basis of the temporary DL as an eventual DL containing a smaller number of list entries. Thus, the size of an area allocated on the recording medium 81 to the final DL can be reduced. As a result, the size of an area allocated on the recording medium 81 to be used by the process to rewrite or update a file can also be decreased as well.

The response to the inquiry made at the step S225 may indicate that information recorded on the temporary DL is information on noncontiguous clusters. Examples of the information on noncontiguous clusters are shown at the right and left upper portions of FIGS. 37 and 38. In the temporary DL shown in FIG. 37, for example, the address of the first cluster at the alternation original area is A, which is followed by the address (A+1) of the second cluster. By the same token, the address of the first cluster at the alternation replacement area is B, which is followed by address of (B+1) of the second cluster. Although the address of the third cluster at the alternation original area is (A+2) followed by the address (A+3) of the fourth cluster, the corresponding address at the alternation replacement area is D and (B+3) respectively. To be more specific, the third and fourth clusters in the alternation replacement area are not contiguous clusters. Thus, the flow of the processing goes from the step S225 to a step S226.

In a process carried out at the step S226, the alternation-information generation section 64 changes a plurality of non-contiguous alternation replacement addresses to a plurality of contiguous alternation replacement addresses on the basis of information recorded on the temporary DL. To put it concretely, as shown in the lower portion of FIG. 37, for example, data of the contiguous alternation original clusters in the address range A to (A+3) is relocated in contiguous alternation replacement clusters in the address range D to (D+3). As a result, in a process carried out at the following step S227, it is possible to generate a final DL on which the noncontiguous alternation replacement clusters are collected at a single location in another track. It is to be noted that, in the resulting final DL shown at the lower right corner of FIG. 37, the address of the first cluster at the alternation original area including four contiguous clusters is A, whereas the address of the first cluster at the alternation replacement area including four contiguous clusters is D.

As a result, in the same way as what is described above, the size of an area allocated on the recording medium 81 to be used by the process to rewrite or update a file can also be decreased as well.

If the determination result produced in the process carried out at the step S223 indicates that the size of the overwriting or updating file is greater than the size of the file to be overwritten or updated, on the other hand, the flow of the processing goes on to a step S224 at which the alternation-information generation section 64 records the difference data obtained as a result of the overwriting process in the alternation original area in a continuation cluster of the original clusters in the alternation original area.

Figure 40:
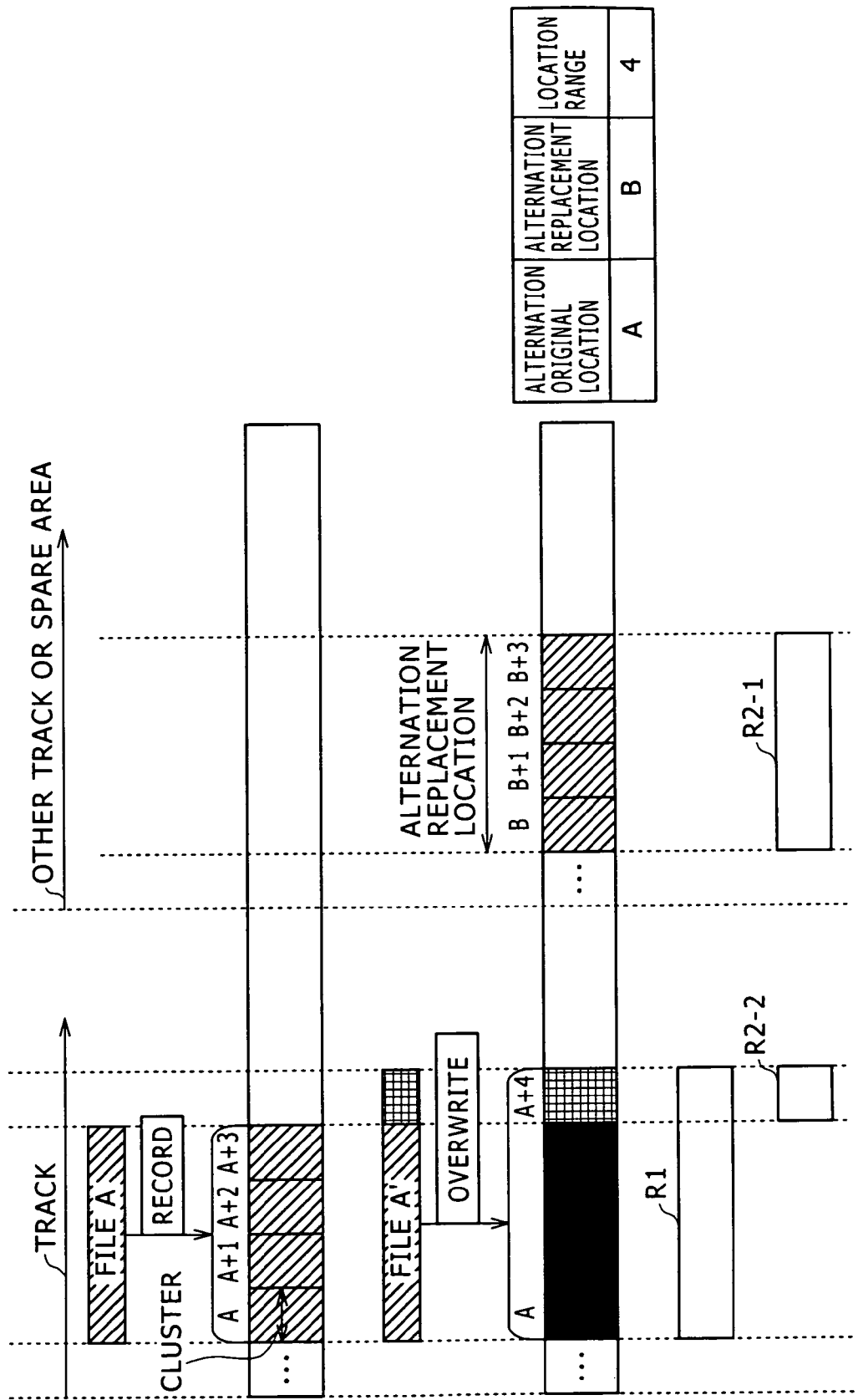
FIG. 40 is an explanatory diagram showing the actual recording process carried out by the recording/reproduction mechanism section shown in FIG. 3.

To be more specific, as shown in the upper portion of FIG. 40, a file A is recorded at an alteration original area ranging from the address A to the address (A+3). The size of a file A' generated as a file to be overwritten on the file A is greater than the size of the file A by a cluster starting at an address (A+4) as shown in the middle left portion of FIG. 40. In this case, the alternation-information generation section 64 records the difference data between the files A' and A at the cluster starting at an address (A+4) as a continuation cluster of the clusters in the alteration original area. The continuation cluster is represented by a lattice-like box shown in the middle left portion of FIG. 40.

The above descriptions are summarized as follows. If an alteration replacement area is not in the same track, but in another track or another SA area, as shown in the lower portion of FIG. 40, the logical area of the file A is shown as a contiguous area R1 ranging from the address A to the address (A+4) even though the physical area of the same file is represented by two areas, i.e., areas R2-1 and R2-2. Thus, when the difference data is read out from the area R2-2 after reading out main data from the area R2-1 in a process to read out the file A from the recording medium 81, it is necessary to reverse the physical direction to read the file A with respect to the physical direction in which the data of the file A has been recorded in the areas. In a process to record the data of the file A, the data has been recorded in the direction from the area R2-2 to the area R2-1. Thus, when the alternation replacement area does not exist in the same track as the alternation original area, the logical addresses are continuous so that, as file-system processing, management of logical addresses is easy to execute. However, in this case, the clusters exist not in a physically contiguous area and, in addition, it is necessary to reverse the physical direction to read the file A. As a result, the file A cannot be read out at a high speed.

If the determination result produced in the process carried out at the step S222 indicates that the same track or the same SRR includes both the alternation original location and alternation replacement location, on the other hand, the flow of the processing goes on to steps S229 to S231 at which the same process as the steps S225 to S227 are carried out. Then, at the next step S232, the same process as the step S223 is carried out. Subsequently, at the next step S233, the same process as the step S224 is carried out. In a process carried out at the step S233, the alternation-information generation section 64 records the difference data obtained as a result of the overwriting process in a continuation cluster of the original clusters in the alternation replacement area.

Figure 41:
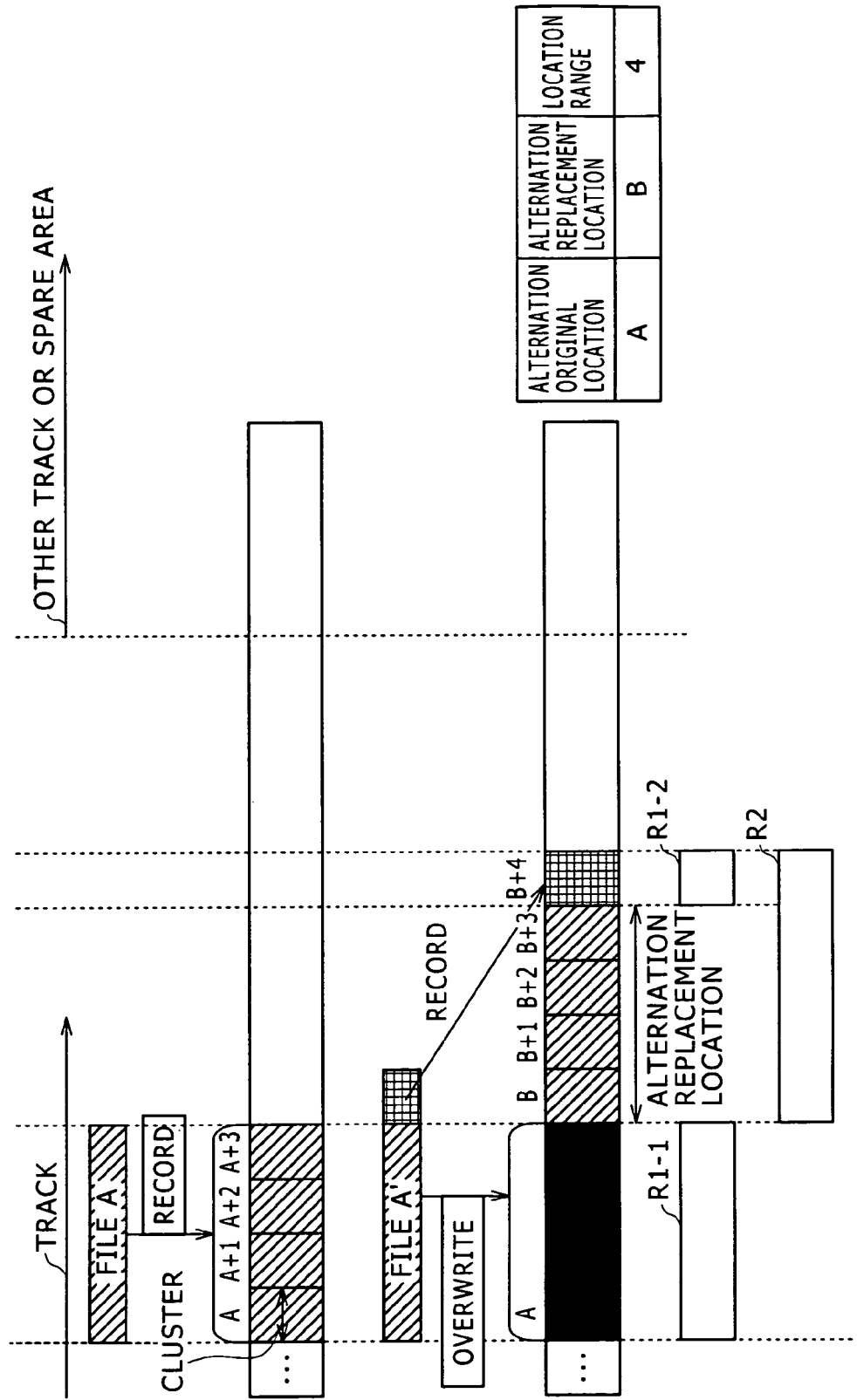
FIG. 41 is an explanatory diagram showing the actual recording process carried out by the recording/reproduction mechanism section shown in FIG. 3.

To be more specific, if the alternation replacement area exists in the same track as the alternation original area, as shown in the middle portion of FIG. 41, for the alteration original area, an alteration replacement area follows the alteration original area as an alternation replacement area including four consecutive clusters ranging from an address B coinciding with an address (A+4) to an address (B+3). The difference data obtained as a result of an overwriting or updating process is recorded in a cluster at an address (B+4) following the address (B+3). The cluster at the address (B+4) is shown as a lattice box.

The above descriptions are summarized as follows. If the alternation replacement area exists in the same track as the alternation original area, as shown in the lower portion of FIG. 41, the logical area includes an area R1-1 ranging from the address A to the address (A+3) and an area R1-2 at an address (B+4). On the other hand, the physical area is a single area R2. In a process to read out the file A from the recording medium 81, data of the file can be read out continuously from the area R2 shown in the lower portion of FIG. 41. Thus, since the reading direction can be made the same as the recording direction, the data can be read out with ease.

As a result, when the alternation replacement area exists in the same track as the alternation original area, the logical addresses are not continuous so that, as file-system processing, management of logical addresses is difficult to execute. Since the physical addresses are continuous, however, the file can be read out continuously from consecutive locations in a contiguous area at a high speed.

It is to be noted that the final DL shown in the right middle portion of FIG. 40 is identical with the final DL shown in the right middle portion of FIG. 41 in that, in both the final DLs, the alternation original area includes four clusters starting with one at the address A and the alternation replacement area includes four clusters starting with one at the address B. The final DL shown in the right middle portion of FIG. 40 is different from the final DL shown in the right middle portion of FIG. 41 in that, in the final DL shown in FIG. 40, the address B is not in the same track as the alternation original area while, in the final DL shown in FIG. 41, the address B is in the same track as the alternation original area.

In applications, an alternation replacement area existing in the same track or in a different track as the alternation original area have both merits and demerits. It needs to be chosen to use depending on the application. If the data generates a constraint imposed on the time to reproduce information of a file recorded on the recording medium 81, for example, an alternation replacement area in the same track as the alternation original area is desirable. An example of such a data is moving-picture data or audio data. If there is no constraint imposed on the time to reproduce information of a database or the like recorded on the recording medium 81 but there is a requirement of easy management of data, on the other hand, an alternation replacement area in a track different from that of the alternation original area offers merits.

As described above, an alternation replacement area existing in the same track as the alternation original area has a contradiction in that the logical addresses are not continuous but the physical addresses are continuous. On the other hand, an alternation replacement area existing in a track different from that of the alternation original area shows a contradiction in that the logical addresses are continuous but the physical addresses are not continuous. If data is recorded in such a way that the contradictions are eliminated, however, the file to be recorded can have any data format.

If an overwriting file is recorded on a new area without executing management of alternation information at all, for example, the logical layout will match the physical layout.

Figure 42:
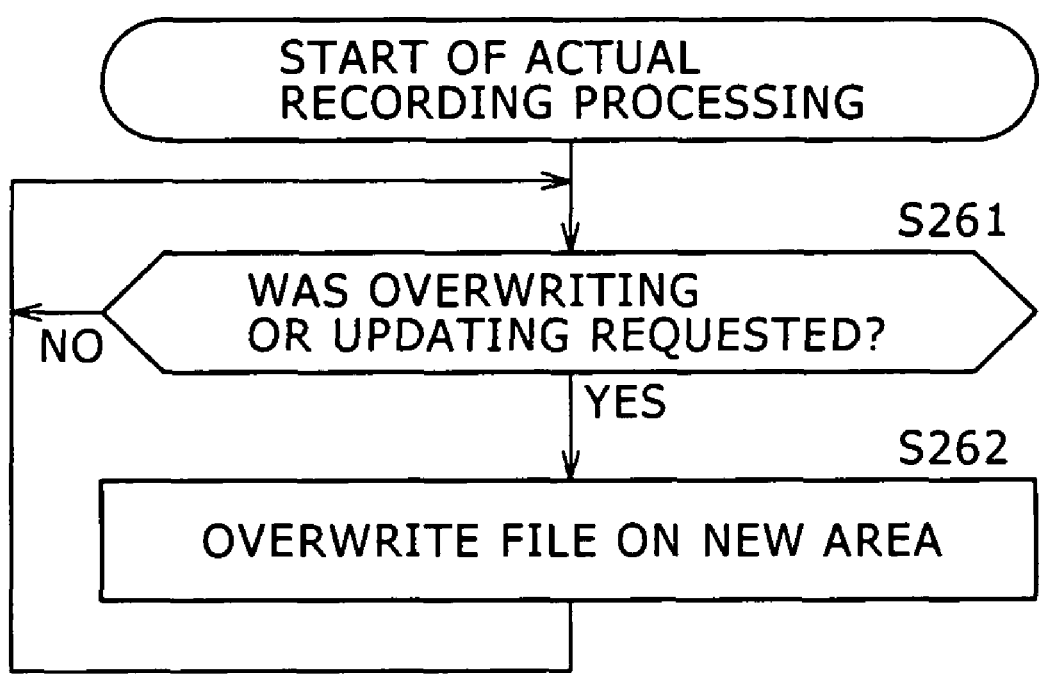
FIG. 42 shows a flowchart referred to in explanation of another actual recording process carried out by the recording/reproduction mechanism section shown in FIG. 3.

FIG. 42 shows a flowchart representing processing to actually record overwriting files sequentially into a new area without executing management of alternation information at all.

The flowchart begins with a step S261 at which the file-system information generation section 62 produces a result of determination as to whether or not a command to overwrite a new file on an already existing one or update an already existing file has been received. This process is carried out repeatedly till such a command is received. As a command to overwrite a new file on an already existing one or update an already existing file is received, the flow of the processing goes on to a step S262 at which the file-system information generation section 62 overwrites the new file into a new area or record the updated file in a new area.

Figure 43:
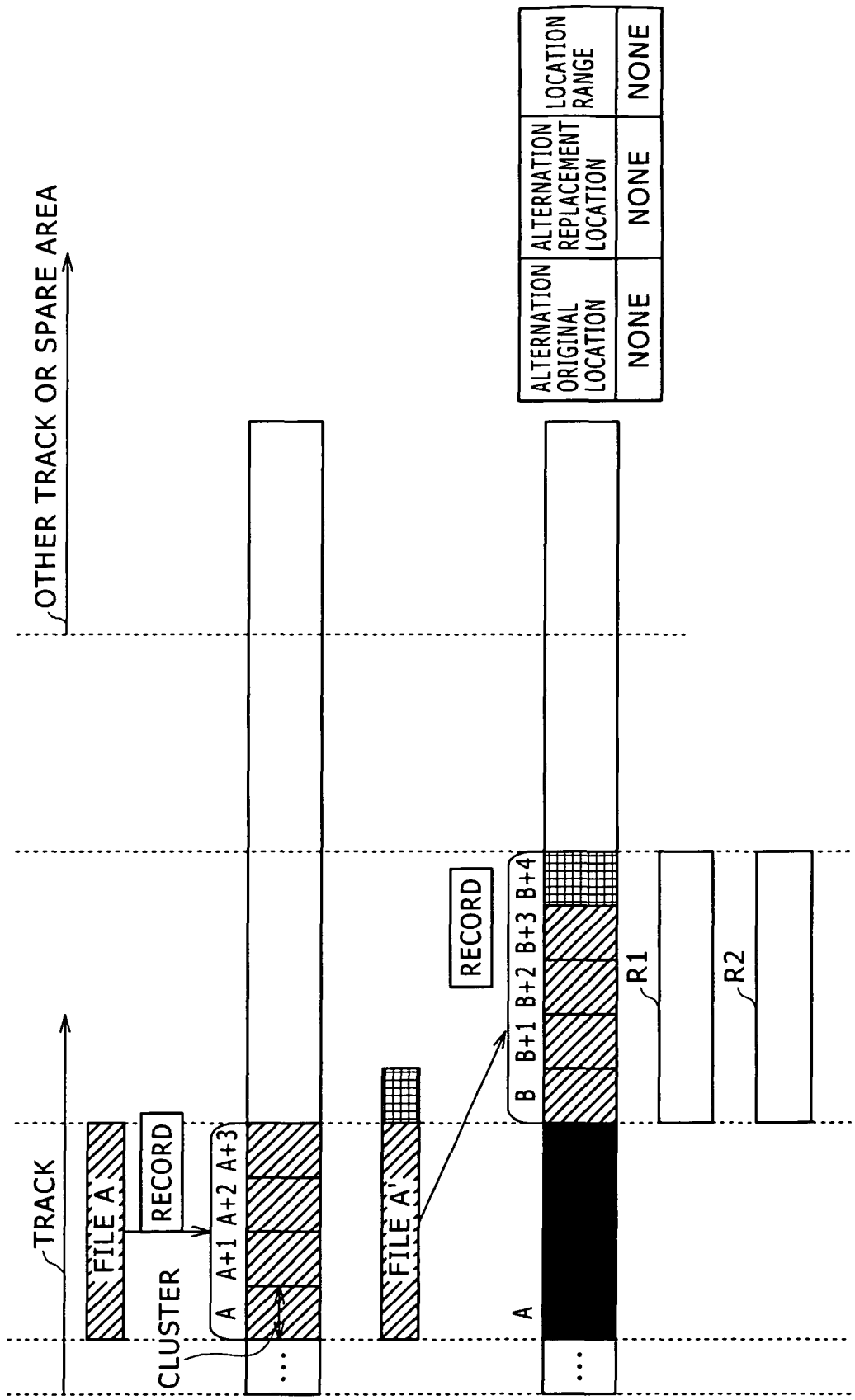
FIG. 43 is an explanatory diagram showing the other actual recording process carried out by the recording/reproduction mechanism section shown in FIG. 3.

To put it concretely, let us assume that, as shown in the upper portion of FIG. 43, an original file A has been recorded in an area from an address A to an address (A+3), and the file A is to be overwritten or updated by a new file A'. In this case, as shown in the middle left portion of FIG. 43, the file A' is recorded as an overwriting or updating file in an area ranging from an address B to an address (B+4) as a continuation area of the area used for recording the file A. Thus, as shown in the lower portion of FIG. 43, an area R1 representing a logical layout coincides with an area R2 representing a physical layout, causing no contradiction. As a result, for a file of any format, management of information and reproduction of data can be carried out with ease. In addition, data can be read out from the recording medium 81 at a high speed. It is to be noted that, in this case, the logical address and the physical address of the overwriting or updating file are updated or overwritten. Thus, as shown in the middle right portion, it is not necessary to catalog information such as the alternation original location, the alternation replacement location and the range on a DL.

Figure 44:
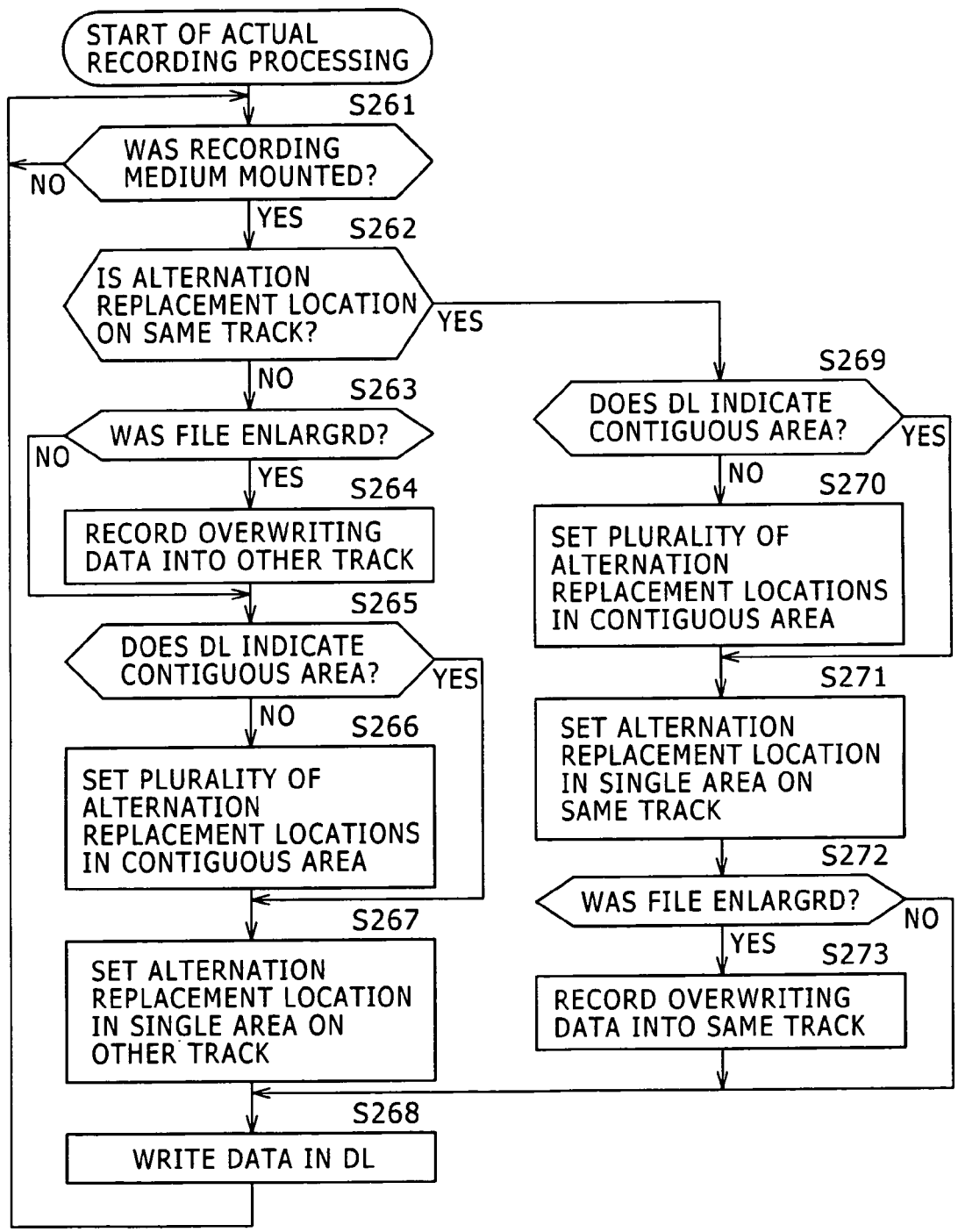
FIG. 44 shows a flowchart referred to in explanation of an actual recording process, which is carried out by the recording/reproduction mechanism section shown in FIG. 3 when a recording medium is mounted on the recording/reproduction apparatus employing the recording/reproduction mechanism section.

By referring to a flowchart shown in FIG. 44, the following description explains processing, which is carried out to actually record data onto the recording medium 81 when the recording medium 81 is mounted on the recording/reproduction apparatus. The processing, which is carried out to actually record data onto the recording medium 81 when the recording medium 81 is mounted on the recording/reproduction apparatus, is processing carried out for a case in which a DL has been recorded on the recording medium 81 in the temporary-DL format and read out from the recording medium 81 at a disc-mounting stage to examine the state of an area represented by alternation replacement addresses and, if the alternation replacement addresses do not represent a contiguous area, noncontiguous areas represented by the alternation replacement addresses are converted into a single contiguous area. The temporary-DL format is a format in which information such as alternation replacement addresses is cataloged on the DL at an information granularity corresponding to a cluster as it is. It is to be noted that processes carried out at steps S262 to S269 of the flowchart shown in FIG. 44 are identical with the processes carried out at respectively the steps S222 and S225 to S231 of the flowchart shown in FIG. 39. It is thus unnecessary to repeat the explanations of the processes.

Namely, at a step S261, the process described above is carried out repeatedly until the recording medium 81 is mounted on the recording/reproduction apparatus. As the recording medium 81 is mounted on the recording/reproduction apparatus, the flow of the processing goes on to the step S262 to carry out a process of this step before performing subsequent processes up to the step S269.

Figure 45:
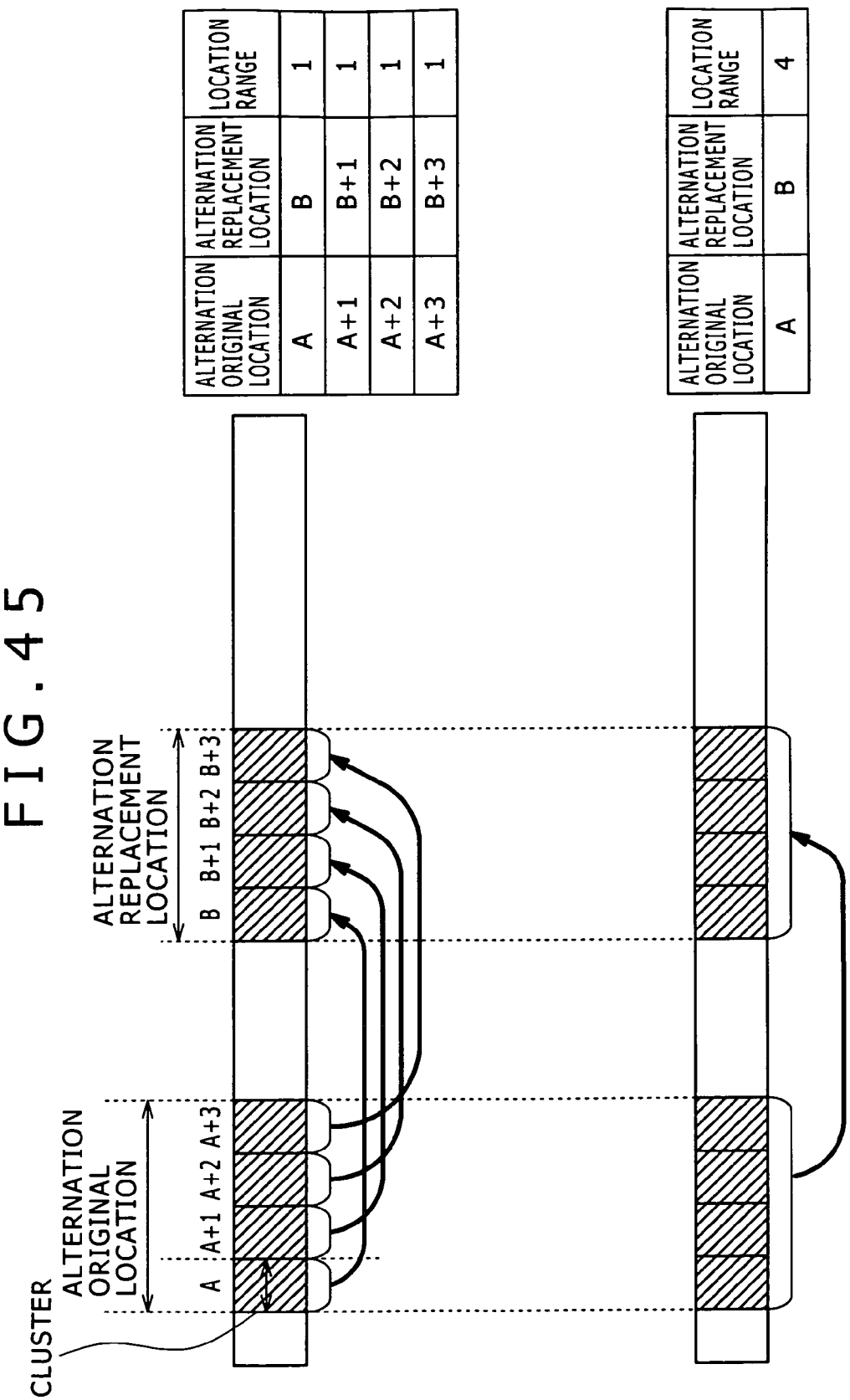
FIG. 45 is an explanatory diagram showing the actual recording process, which is carried out by the recording/reproduction mechanism section shown in FIG. 3 when a recording medium is mounted on the recording/reproduction apparatus employing the recording/reproduction mechanism section.

For example, as shown in the left and right upper portions of FIG. 45, on the upper temporary DL, a range of a cluster starting at a location pointed to by an address A is associated with a range of a cluster starting at a location pointed to by an address B. By the same token, a range of a cluster starting at a location pointed to by an address (A+1) is associated with a range of a cluster starting at a location pointed to by an address (B+1). In the same way, a range of a cluster starting at a location pointed to by an address (A+2) is associated with a range of a cluster starting at a location pointed to by an address (B+2). Likewise, a range of a cluster starting at a location pointed to by an address (A+3) is associated with a range of a cluster starting at a location pointed to by an address (B+3). Therefore, the information is stored on the temporary DL at an information granularity corresponding to a cluster in a list format. Thus, the larger the number of clusters, the longer the DL.

By carrying out the processing to actually record data onto the recording medium 81 when the recording medium 81 is mounted on the recording/reproduction apparatus as explained earlier by referring to the flowchart shown in FIG. 44, however, a final DL shown in the lower portion of FIG. 45 shows that a range of four clusters starting at a location pointed to by an address A is associated with a range of four clusters starting at a location pointed to by an address B. To be more specific, the list includes only a piece of information showing a pair of an alteration original range and an alteration replacement range as well as the number of clusters in the range. Thus, the amount of information stored on the DL can be reduced. As a result, by carrying out the processing shown in FIG. 44, a recording/reproduction apparatus having no function to reconstruct a temporary DL into a final DL with a smaller size as described before by referring to the flowchart shown in FIG. 39 is capable of reducing the size of a temporary DL at the time the recording medium 81 containing information recorded thereon is mounted on the recording/reproduction apparatus. Thus, the amount of an area used for storing the final DL obtained as a result of subsequent processing can also be reduced.

In accordance with the present invention, in a process to incrementally record information in an already existing file or update an already existing file, a user area or an SA area is used as alternate clusters. It is thus easy to update data and read out post-updating data for a case in which file-system information, anchor information, information on the structure of the volume and database files of stream data must be recorded at fixed locations in the logical-address space. In addition, in the process to record the file-system information, the anchor information, the information on the structure of the volume and the database files of stream data, only one of the file-system information, the anchor information, the information on the structure of the volume and the database files of stream data can be selected as information to be recorded in an SA area. Thus, the size of a used SA area can be reduced. Moreover, even for a case in which a file is updated frequently, it is no longer necessary to relocate the updated file in a contiguous recording area. It is thus possible to reduce the size of a recording area required in a process to incrementally record information in a file already existing on a disk such as a write-once recording medium or update a file already existing on such a recording medium. Furthermore, information of an overwritten or updated file can be recorded in both a user area and an SA area, which each serve as an alternate area for pre-overwriting and pre-updating information. Thus, the size of the used SA area can be reduced. In addition, in a process to record data, the layout of clusters cataloged on a temporary DL is converted into a contiguous layout to decrease the size of a final DL, which is recorded on the recording medium 81 eventually.

Next, by referring to a flowchart shown in FIG. 46, the following description explains the process carried out at the step S1 of the flowchart shown in FIG. 14 to set an SA area.

The flowchart shown in FIG. 46 begins with a step S291 at which the initialization section 62a of the file-system information generation section 62 employed in the control section 51 controls the write section 73 in order to drive the recording/reproduction block 53 to allocate an SA (Spare Area) area on the recording medium 81.

Then, in a process carried out at the next step S292, the initialization section 62a produces a result of determination as to whether or not an overwriting process in a logical-address space has been set in use of the recording medium 81. An overwriting process in a logical-address space can be set by the user in advance so that the result of determination can be produced on the basis of the setting made by the user. As an alternative, at a stage prior to the start of a formatting process or right before the process of the step S292 is started, a select screen is displayed as a screen for inquiring of the user in regard to whether or not the function of the overwriting process in a logical-address space is to be made effective. On the basis of a selection made by the user, the initialization section 62a produces a result of determination as to whether or not an overwriting process in a logical-address space has been set. As another alternative, an overwriting process in a logical-address space is set by specifying an option of a command.

If the determination result produced in the process carried out at the step S292 indicates that an overwriting process in a logical-address space has been set, the flow of the processing goes on to a step S293 at which the initialization section 62a sets a first portion of the SA (Spare Area) area as a TDMA area.

If the determination result produced in the process carried out at the step S292 indicates that no overwriting process in a logical-address space has been set, on the other hand, the flow of the processing goes on to a step S294 at which the initialization section 62a sets a second portion smaller than the first portion of the SA (Spare Area) area as a TDMA area.

To be more specific, when the function of the overwriting process in a logical-address space is used, it is expected that physical information recorded on the recording medium 81 is updated frequently. Examples of the physical information are track management data and alternation information. Since physical information is updated frequently, it is also expected that the size of the used TDMA increases. Thus, when the function of the overwriting process in a logical-address space is used, for example, as shown in the upper diagram of FIG. 47, a first portion with a size of 50% in the SA area is set as a TDMA area. When the function of the overwriting process in a logical-address space is not used, on the other hand, a second portion with a size of 25% smaller than the first portion in the SA area is set as a TDMA area for example as shown in the lower diagram of FIG. 47.

Figure 47:
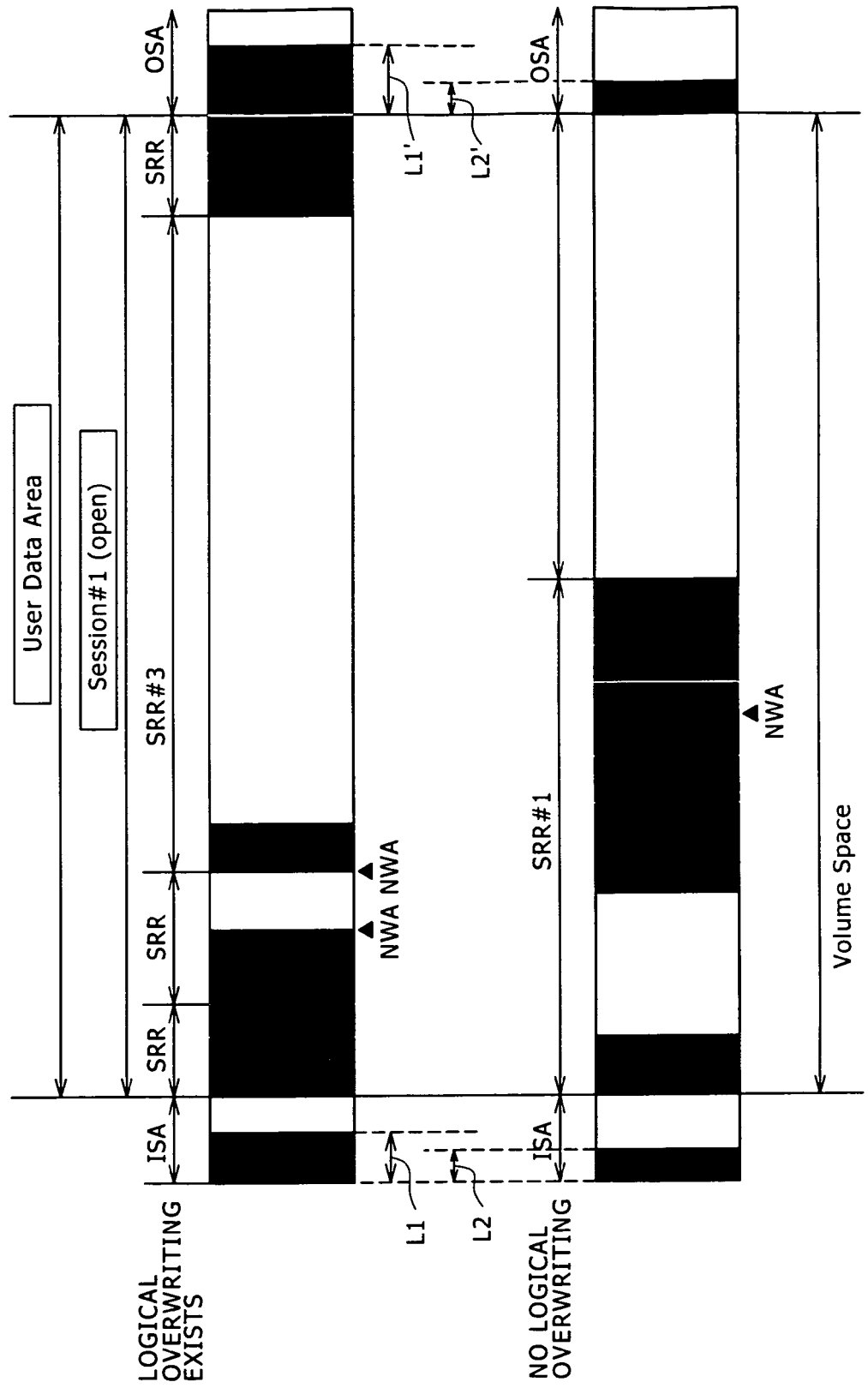
FIG. 47 is an explanatory diagram showing the SA-setting process carried out by the recording/reproduction mechanism section shown in FIG. 3.

To put it concretely, in the upper diagram of FIG. 47, the first portion with a size of 50% of the entire ISA is set as a TDMA represented by a portion L1 in the ISA. By the same token, the first portion with a size of 50% of the entire OSA is set as a TDMA represented by a portion L1' in the OSA. As shown in the lower diagram of FIG. 47, on the other hand, the second portion with a size of 25% of the entire ISA is set as a TDMA represented by a portion L2 in the ISA. By the same token, the second portion with a size of 25% of the entire OSA is set as a TDMA represented by a portion L2' in the OSA.

Thus, in the case of an ISA with a size of 256 MB, for example, when the function of the overwriting process in a logical-address space is used, a first portion with a size of 128 MB in the ISA area is set as a TDMA area. When the function of the overwriting process in a logical-address space is not used, on the other hand, a first portion with a size of 64 MB in the ISA area is set as a TDMA area.

In the case of an OSA with a size of 512 MB, for example, when the function of the overwriting process in a logical-address space is used, a first portion with a size of 256 MB in the OSA area is set as a TDMA area. When the function of the overwriting process in a logical-address space is not used, on the other hand, a first portion with a size of 128 MB in the OSA area is set as a TDMA area.

By carrying out the processing described above, it is possible to set a TDMA area with a size determined by whether or not the function of the overwriting process in a logical-address space is used. Thus, when the recording medium 81 is utilized by using the function of the overwriting process in a logical-address space, it is possible to carry out processing to update physical information repeatedly.

By the way, when the FS is updated repeatedly due to execution of the processing described above, an SRR set as an area used for recording FSes may conceivably become full. In such a case, a portion of free area is set as an area used for recording FSes. In this way, a new area to be used for recording FSes can be allocated. Processing to set a portion of a free area as an area used for recording FSes will be described later. If FSes are recorded in separated areas in this way, however, it is feared that a plurality of files will be read out at a lower speed. In addition, as the amount of alternation management information managed by using a TDMA exceeds a predetermined value, the TDMA area is much used in every updating process. Thus, it is feared that the TDMA area has been all consumed in a few updating processes. In order to solve these problems, it is nice to provide a configuration in which the layout of FSes is optimized to allow read and write operations to be carried out at a high speed.

Figure 48:
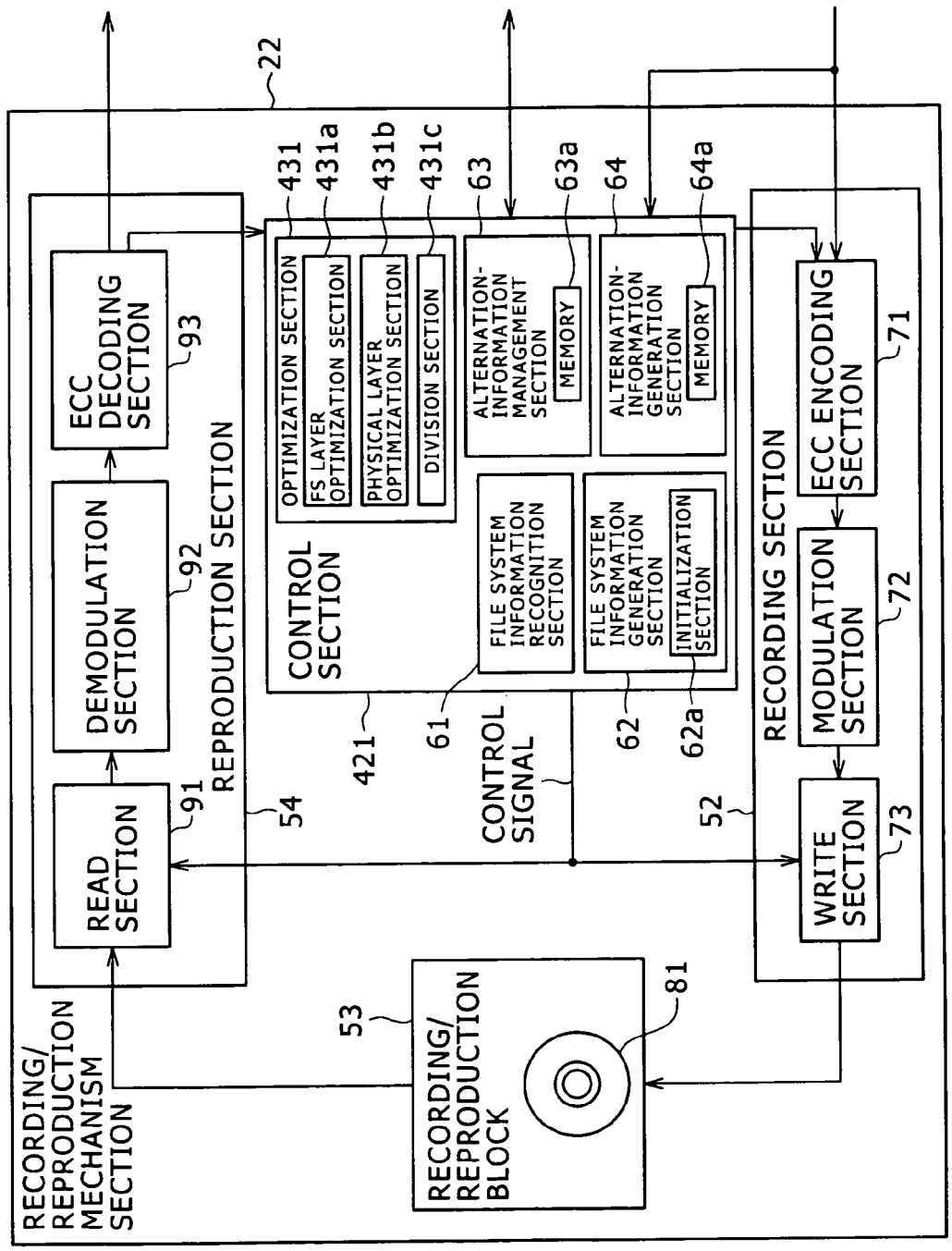
FIG. 48 is an explanatory diagram showing a further configuration of the recording/reproduction mechanism section.

FIG. 48 is a diagram showing the configuration of a recording/reproduction apparatus 22 allowing processing to optimize an area used for recording FSes to be carried out.

It is to be noted that every component included in the recording/reproduction mechanism section 22 shown in FIG. 48 as a component identical with its counterpart employed in the recording/reproduction mechanism section 22 shown in FIG. 3 is denoted by the same reference numeral as the counterpart and the explanation of the component is properly omitted.

The configuration of the recording/reproduction mechanism section 22 shown in FIG. 48 is different from the configuration of the recording/reproduction mechanism section 22 shown in FIG. 3 in that the recording/reproduction mechanism section 22 shown in FIG. 48 employs a control section 421 as a substitute for the control section 51 employed in the recording/reproduction mechanism section 22 shown in FIG. 3. The control section 421 is different from the control section 51 in that the control section 431 further employs an optimization section 431 for executing a new function in addition to the function of the control section 51.

The optimization section 431 is a unit, which is used for optimizing FSes logically as well as physically when the size of a used TDMA area in the SA area on the recording medium 81 exceeds a predetermined value.

An FS-layer optimization section 431a employed in the optimization section 431 is a unit for carrying out processing to optimize a logical area on an FS layer of information recorded on the recording medium 81. On the other hand, a physical-layer optimization section 431b also employed in the optimization section 431 is a unit for carrying out processing to optimize a physical layer of information recorded on the recording medium 81.

A division section 431c, which is used for splitting a free SRR on the recording medium 81 into an area to be used for recording a new FS and an area to be used for recording a file when a recordable area of an SRR allocated to FSes is has been all consumed. This processing to split a free SRR (described in detail below) is carried out with a timing other than that of the optimization processing.

Next, the optimization processing is explained by referring to a flowchart shown in FIG. 49.

The flowchart begins with a step S311 at which the optimization section 431 controls the read section 91 to read out the size of an all consumed area of the TDMA in an SA area on the recording medium 81 and the size of a free area of an SRR allocated to FSes.

Then, at the next step S312, the optimization section 431 determines whether or not the size of an all consumed area of the TDMA is at least equal to a predetermined value. For example, if the amount of the most recent TDMA alternation management information is smaller than the predetermined value, the flow of the processing goes back to the step S311. That is, the processes of the steps S311 and S312 are carried out repeatedly till the size of an all consumed area in the TDMA or the amount of the most recent TDMA alternation management information has become at least equal to the predetermined value.

If the step S312 indicates that the size of an all consumed area in the TDMA has become at least equal to a predetermined value, the flow of the processing goes on to a step S313 at which the FS-layer optimization section 431a reads out a plurality of FSes on the FS layer.

Figure 50:
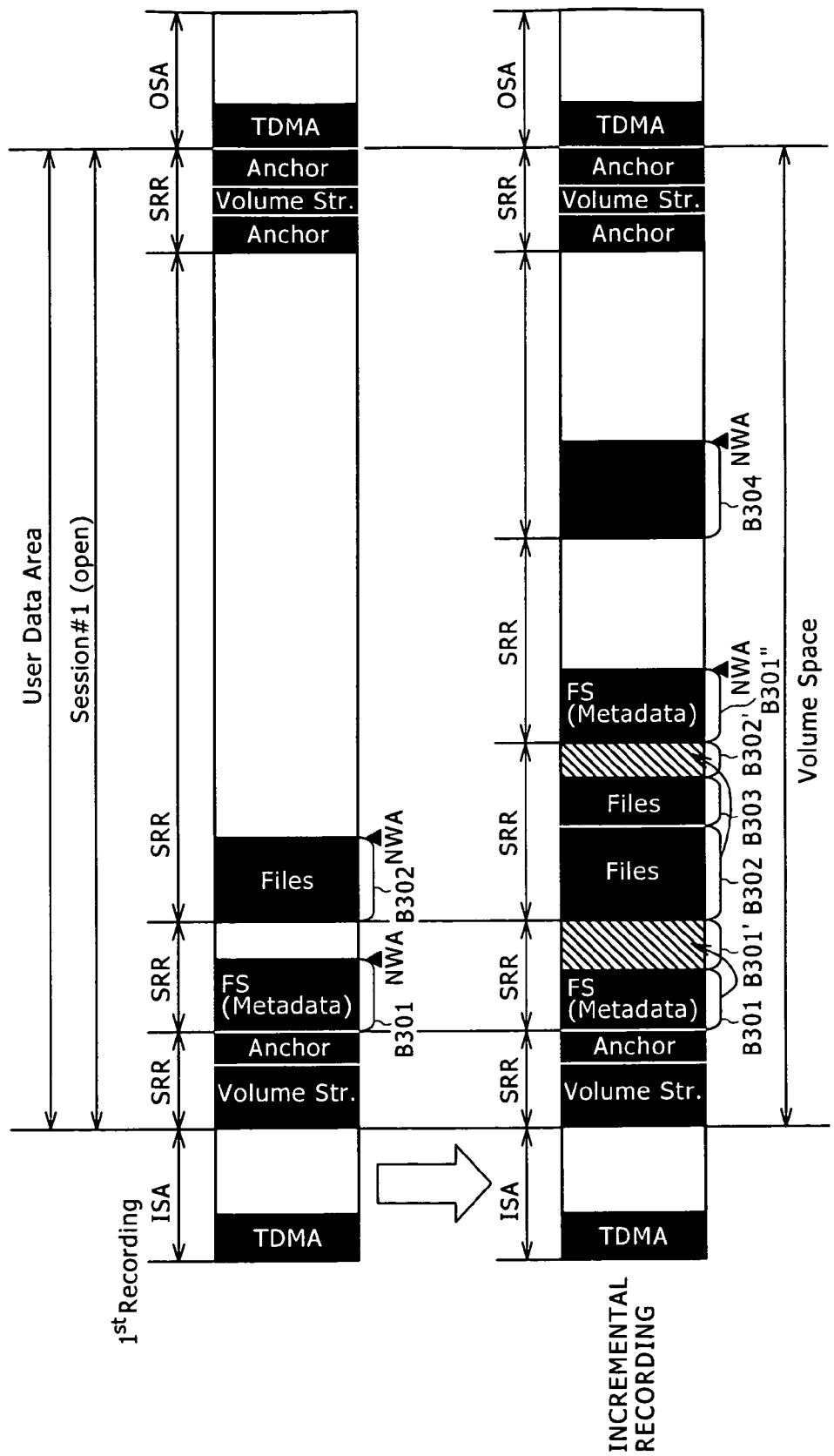
FIG. 50 is an explanatory diagram showing the optimization process carried out by the recording/reproduction mechanism section shown in FIG. 48.

To be more specific, for example, an FS and file information referred to as Files in FIG. 50 have been logically recorded in blocks B301 and B302 respectively as shown in the upper diagram of the figure. Also in this state, as shown in the lower diagram of FIG. 50, new file information is recorded in a block B303 and the updating portion of the file information recorded in the block B302 is recorded in a block B302' serving as an alternate area for the block B302. If an SRR allocated to FSes is filled up with the block B301 used for storing an FS and a block B301' used as an alternate area for storing replacement information of the FS stored in the block B301, a free area of an SRR including the block B302 is split in division processing to be described later to generate a first SRR to serve as a new FS area and a second SRR to serve as an area used for recording files. An FS is then recorded in a block B301" in the first SRR and an additional file is recorded in a block B304 in the second SRR. The additional file is a stream file referred to as additional files (Stream) in the figure. It is to be noted that notation NWA shown in the figure denotes the beginning of an NWA (New Writable Area) in the first or second SRRs. A new FS or a new file is recorded in the new writable area in the SRR allocated to FSes or files respectively.

Figure 51:
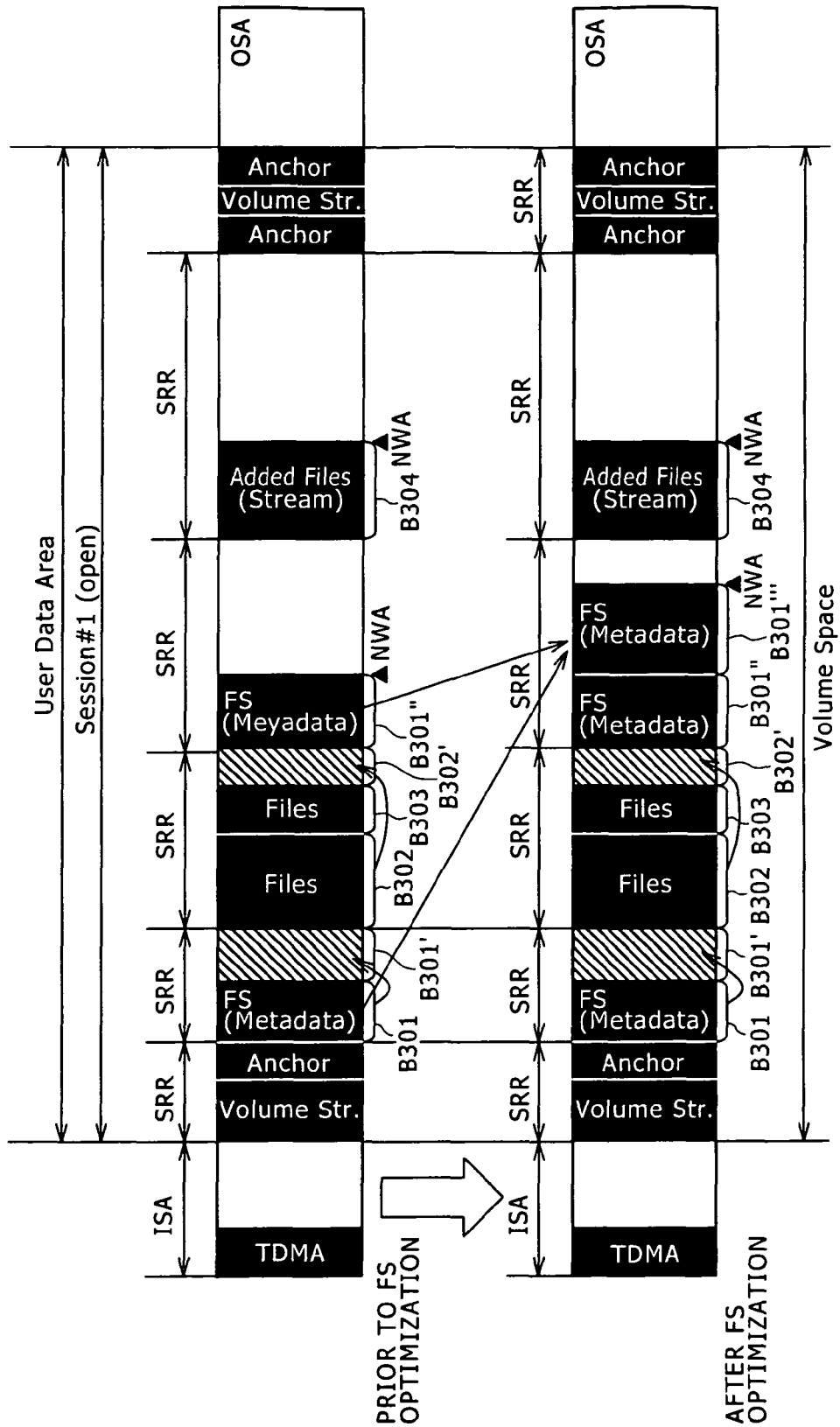
FIG. 51 is an explanatory diagram showing the optimization process carried out by the recording/reproduction mechanism section shown in FIG. 48.

In the case of the example shown in the lower diagram of FIG. 50, for example, the FS-layer optimization section 431*a* reads out a plurality of FSes recorded in blocks B301 and B301", which are separated from each other as shown in the upper diagram of FIG. 51 or the lower diagram of FIG. 50. A black box shown in the figures represents a block in which an FS or a file has been recorded. On the other hand, a box hatched with slanting lines in the figures represents an alternate area.

At a step S314, the FS-layer optimization section 431*a* collects the FSes read out from the blocks B301 and B301", which are separated from each other, to synthesize the FSes into a single FS to be recorded in a block 301''' as shown in the lower diagram of FIG. 51.

To be more specific, in a process to read out a stream file, it is necessary to read out the stream file after FSes read out initially. It is thus feared that the time to read out a stream file is long. As shown in the upper diagram of FIG. 51, the FSes read out initially are the FSes recorded in the blocks B301 and B301", which are separated from each other. By carrying out the processing described above, however, FSes are recorded on the FS layer logically as a single FS in order to optimize the FS layer. Thus, the FSes can be read out only once. As a result, the read and write speeds can be increased.

Then, at the next step S315, the physical-layer optimization section 431*b* reads out the FSes recorded on the recording medium 81 in a state of being physically dispersed from each other.

Figure 52:
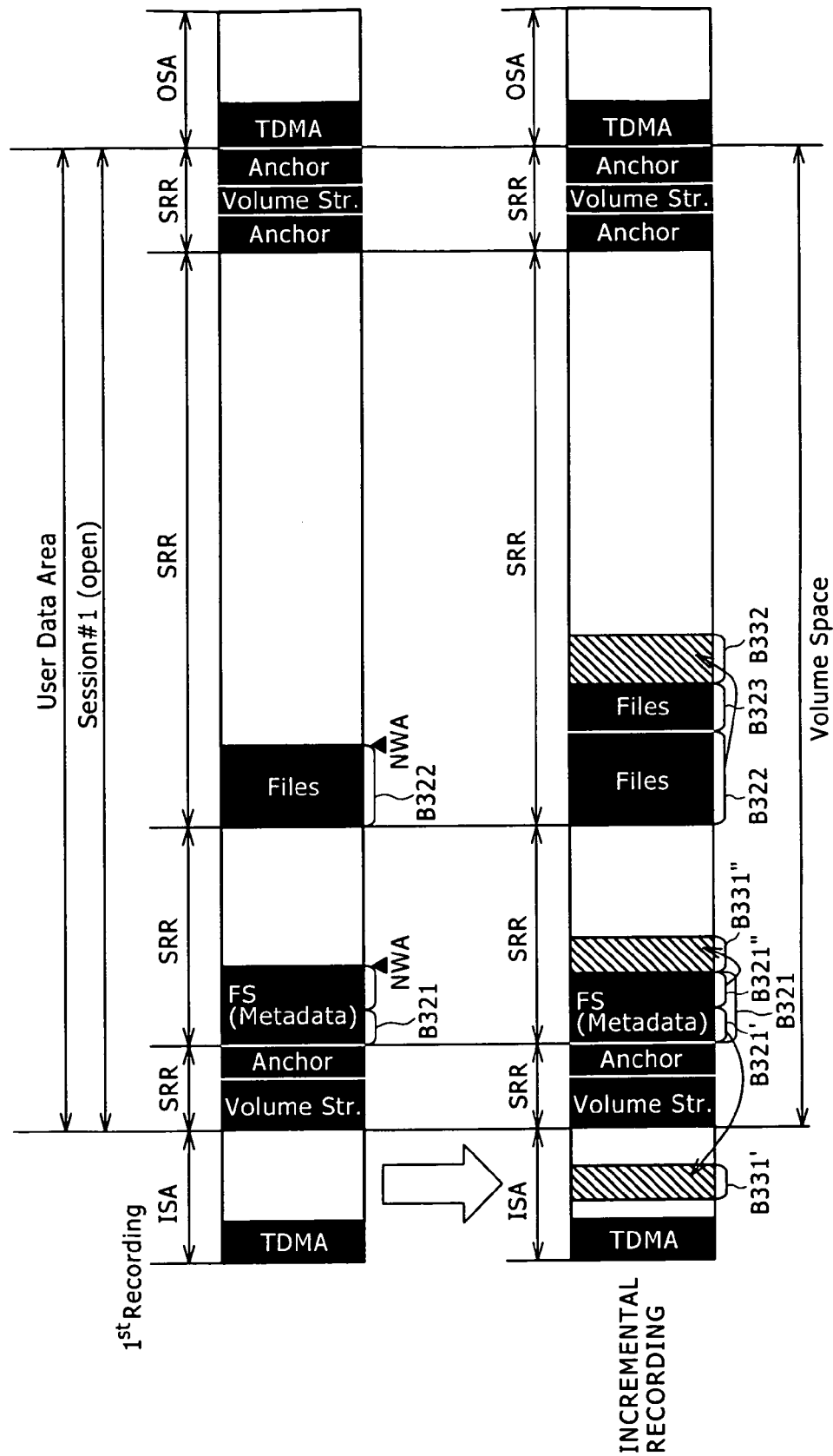
FIG. 52 is an explanatory diagram showing the optimization process carried out by the recording/reproduction mechanism section shown in FIG. 48.

That is, as shown in the upper diagram of FIG. 52, an FS and file information referred to as Files in FIG. 52 have been logically recorded in blocks B321 and B322 respectively. Also, in this state, as shown in the lower diagram of FIG. 52, new file information is recorded in a block B323 and the updating portion of the file information recorded in the block B322 is recorded in a block B332 serving as an alternate area for the block B322. Accompanying this processing to record the new file information, the FS recorded in a block B321 is updated. To put it in detail, information in a block B321' within the block B321 is replaced with information recorded in an alternate block B331' of the ISA. On the other hand, information in a block B321" within the block B321 is replaced with information recorded also in the alternate block B331'.

Figure 53:
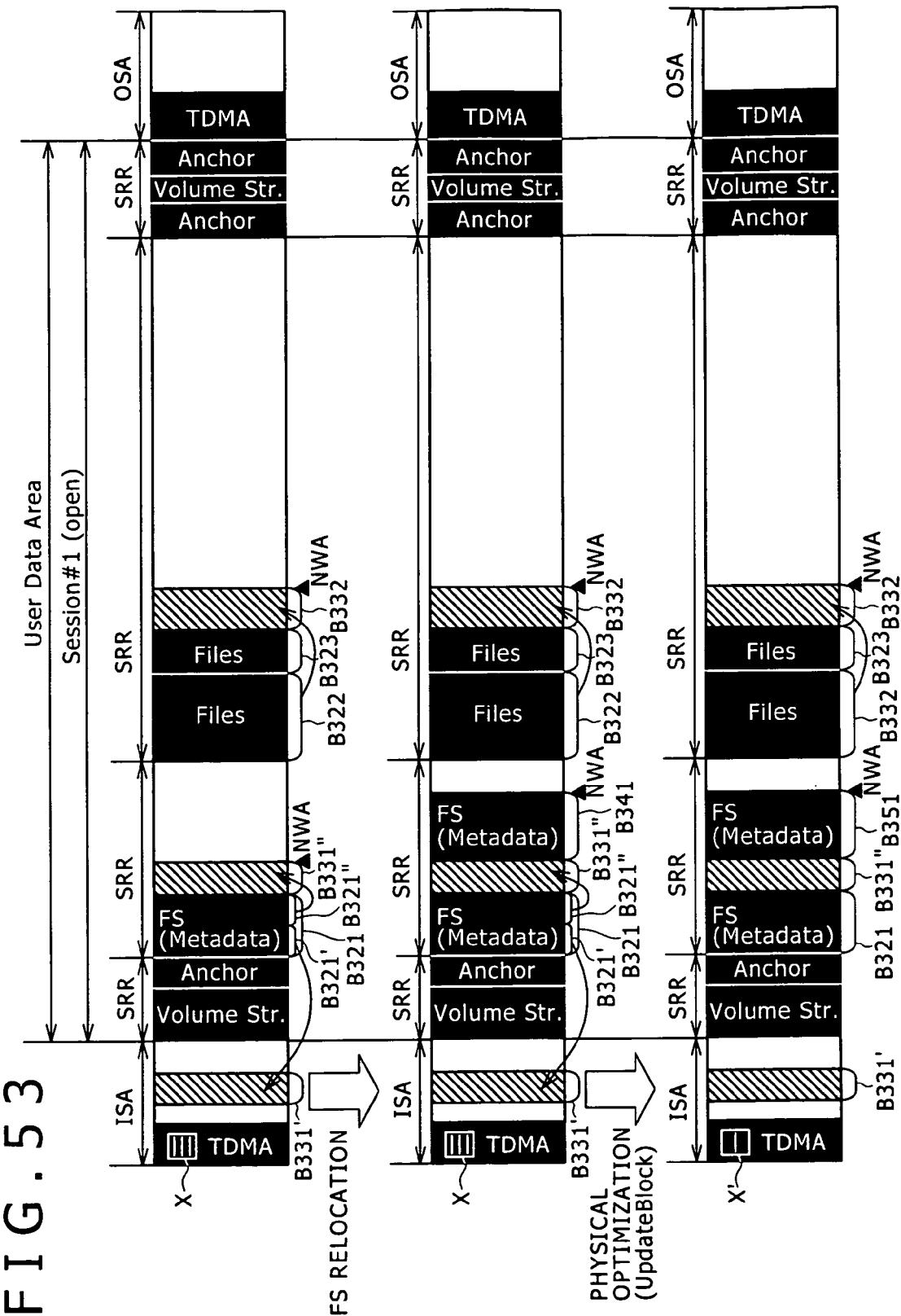
FIG. 53 is an explanatory diagram showing the optimization process carried out by the recording/reproduction mechanism section shown in FIG. 48.

At the step S315, the physical-layer optimization section 431*b* reads out all FSes recorded in the blocks B321, B331' and B331" in a state of being physically dispersed from each other for a case shown in the upper diagram of FIG. 53 or the lower diagram of FIG. 52.

Then, at the next step S316, the physical-layer optimization section 431*b* collects the FSes recorded in a state of being physically dispersed from each other to synthesize the FSes into a single recorded FS.

To be more specific, the physical-layer optimization section 431*b* collects the FSes recorded in the blocks B321, B331' and B331" in a state of being physically dispersed from each other as shown in the upper diagram of FIG. 53 to synthesize the FSes into a single FS to be recorded into a block B341 as shown in the middle diagram of FIG. 53. As a result, since the FSes are physically synthesized and recorded as a single FS, the speed to read out the file can be raised.

At the next step S317, the physical-layer optimization section 431*b* verifies that the operation to read out all FSes recorded in blocks in a state of being physically dispersed from each other, collects the FSes, synthesizes the FSes into a single FS and records the single FS into a block. Subsequently, the physical-layer optimization section 431*b* requests the optimization section 431 to issue an updateblock command to the alternation-information generation section 64.

At the next step S318, the alternation-information generation section 64 updates replacement information X into new replacement information X' on the basis of the updateblock command, and records the new replacement information X' in a TDMA area. To be more specific, since the area used for recording the single FS is a physically contiguous area, almost all information to be managed by using the DL virtually no longer exists. Thus, the amount of replacement information decreases. To be more specific, the replacement information X' shown in the lower diagram of FIG. 53 becomes a file with a size smaller than the replacement information X shown in the middle diagram of the same figure. Thus, even if an already existing file is updated, a new file is added or another file operation is carried out in the subsequent processing, the amount of replacement information to be updated in a TDMA area can be reduced. Therefore, the amount of the consumed TDMA area can also be decreased as well.

By carrying out the optimization processing described above, areas used for recording FSes on the FS and physical layers can be collected into a single area. Thus, the number of times an access to the TDMA is made can be reduced so that the speeds to read out and write file information can be increased. In addition, by reducing the amount of replacement information, it is possible to decrease the amount of the TDMA area, which is consumed when an already existing file is updated or a new file is added in subsequent processing.

As a result, the following processing can be carried out. As shown in the upper diagram of FIG. 54, an initial FS is recorded in a block B381 and, by further updating the FS, replacement information is recorded in a block B382. In this state, since the SRR used for recording the initial FS is all has been all consumed, let us assume that a further FS is recorded in a block B386. In addition, file information is recorded in a block B383 and a block B384. After the file information has been recorded in the block B384, the file information recorded in the block B383 is updated to result in replacement information recorded in a block B385. Then, additional file information referred to as additional files (Stream) in the figure is recorded in a block B387. By carrying out the processes of the steps S313 and S314 in this state, the FSes recorded in blocks B381 and B386 on the FS layer as shown in the upper diagram of FIG. 54 are collected and synthesized into a single FS to be recorded in a block B401 as shown in the middle diagram of the same figure.

Figure 54:
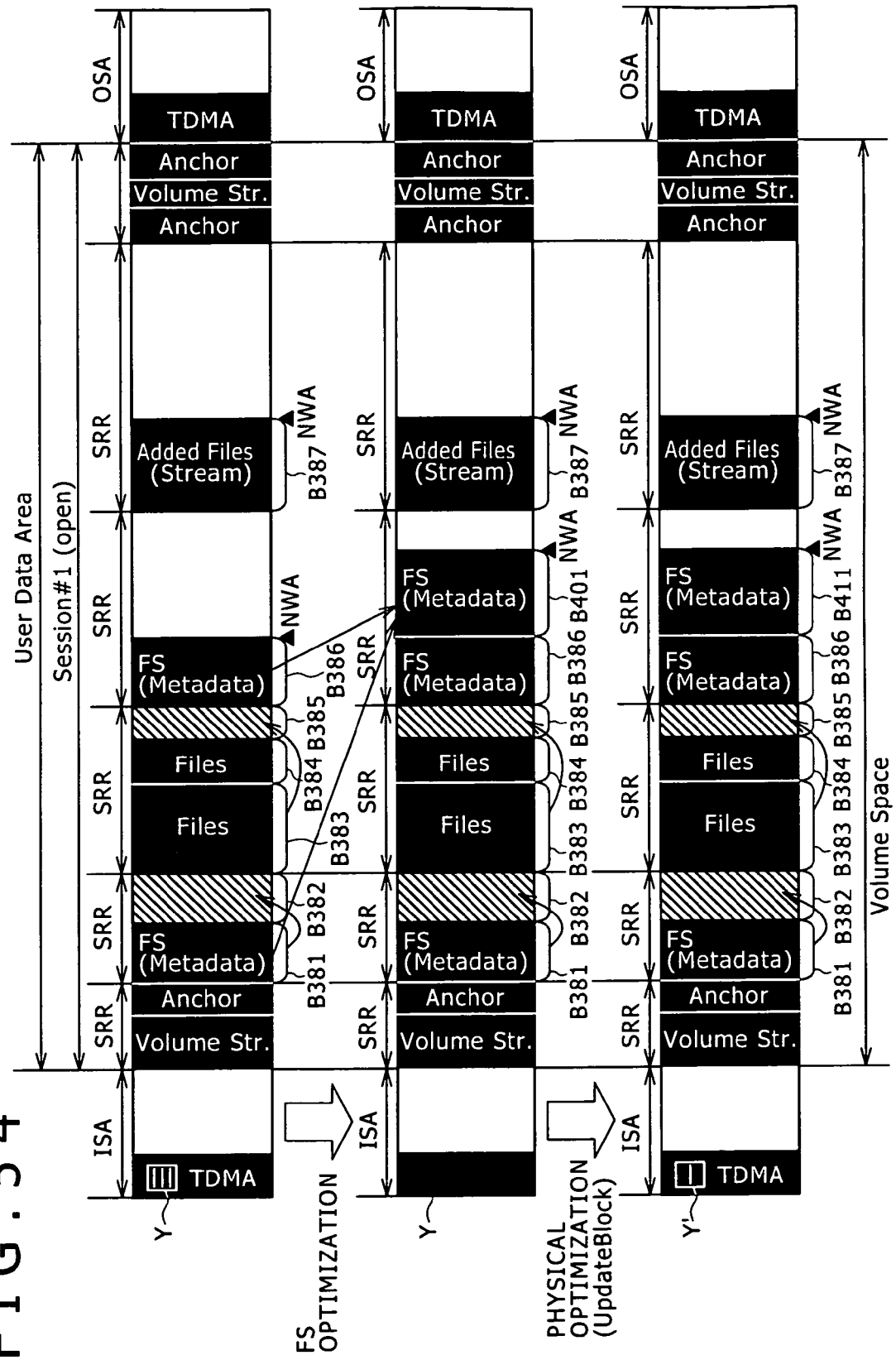
FIG. 54 is an explanatory diagram showing the optimization process carried out by the recording/reproduction mechanism section shown in FIG. 48.

Then, by carrying out the processes of the steps S315 to S318, as shown in the lower diagram of FIG. 54, the FSes are physically collected and synthesized to form a single FS, and replacement information Y recorded in the TDMA is updated into replacement information Y' having a smaller amount as information to be recorded.

By carrying out the processing described above, the number of times the replacement information recorded in the TDMA is read out is reduced. Thus, the number of times an access to the TDMA is made is also decreased as well. As a result, the speeds to read out file information from the recording medium 81 and write file information onto the recording medium 81 is increased. In addition, by reducing the amount of replacement information, it is possible to decrease the amount of the TDMA area, which is consumed when an already existing file is updated or a new file is added in subsequent processing.

Figure 55:
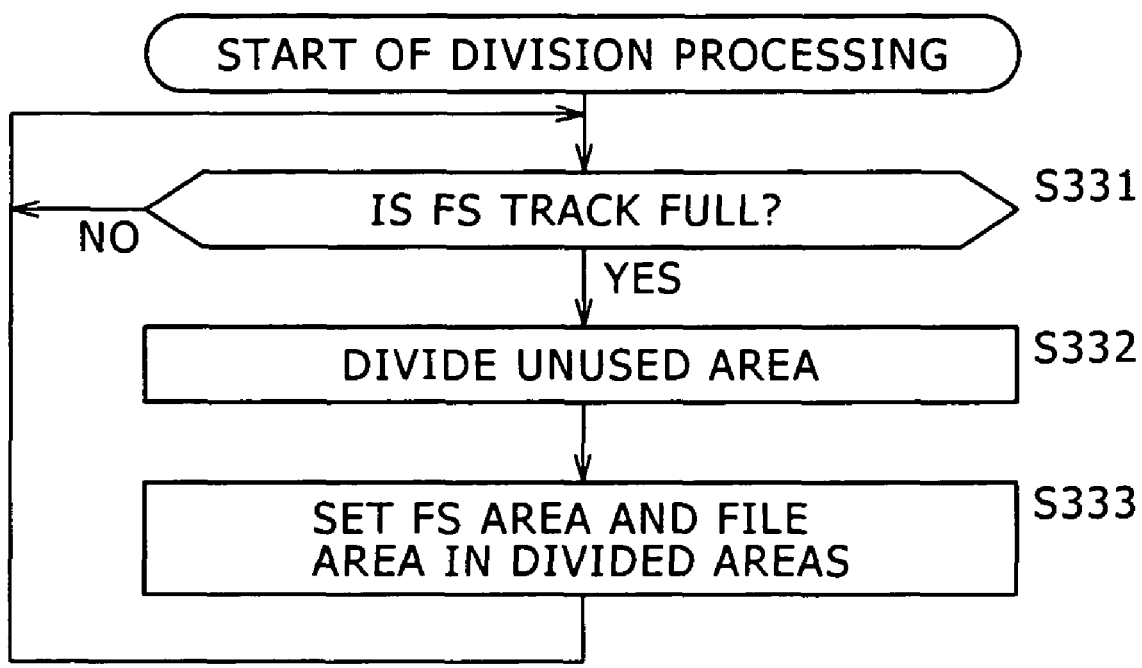
FIG. 55 shows a flowchart referred to in explanation of an area division process carried out by the recording/reproduction mechanism section shown in FIG. 48.

Next, the division processing mentioned before is explained by referring to a flowchart shown in FIG. 55.

At a step S331, the division section 431c determines whether or not the SRR allocated to FSes no longer includes a free area, that is, whether or not the SRR is full. The process of this step is carried out repeatedly till the SRR allocated to FSes no longer includes a free area.

Figure 56:
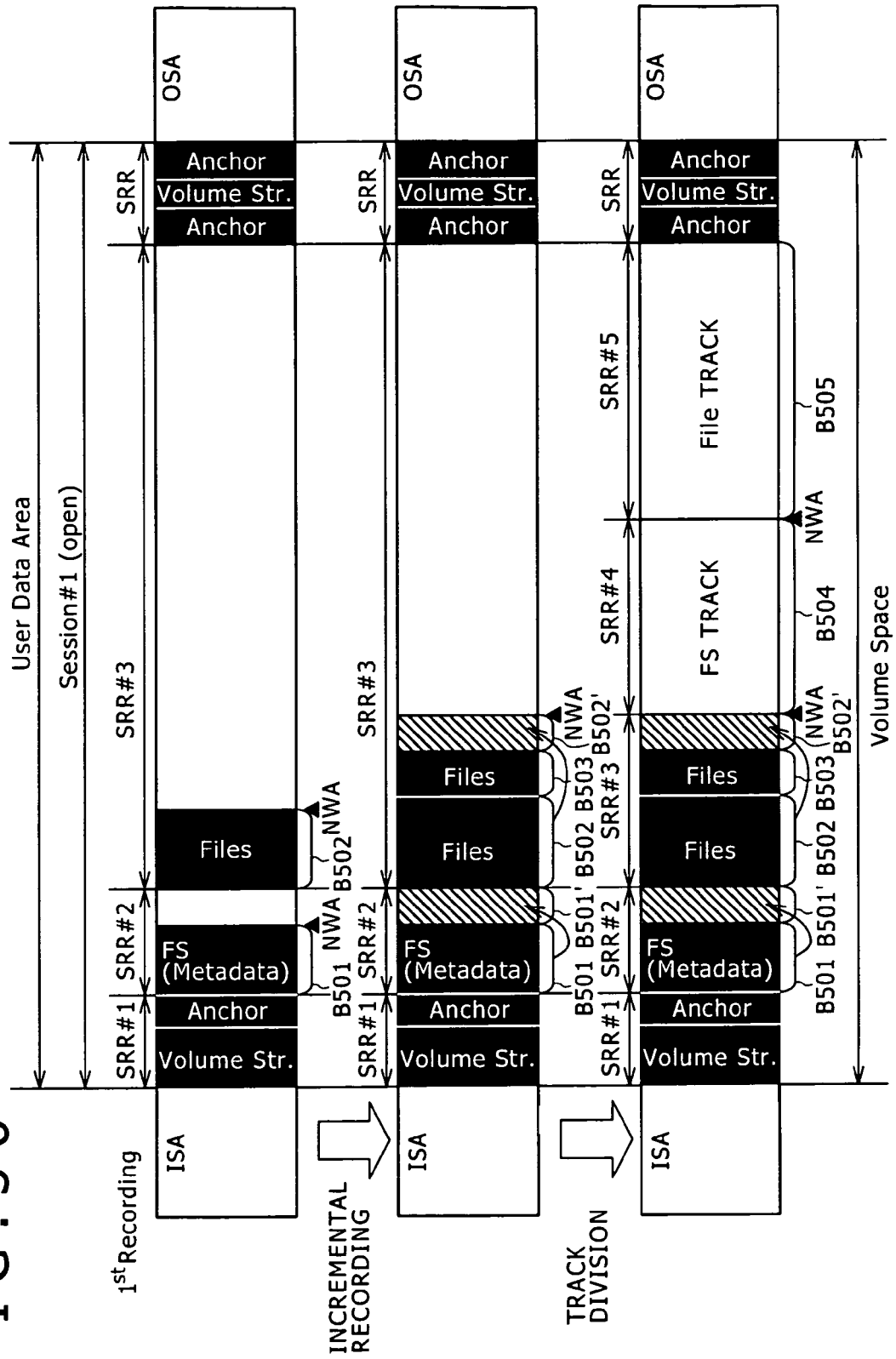
FIG. 56 is an explanatory diagram showing the area division process carried out by the recording/reproduction mechanism section shown in FIG. 48.

As shown in the upper diagram of FIG. 56, for example, an FS has been recorded in a block B501 whereas file information referred to as Files in the figure has been recorded in a block B502 and, in this state, new file information is added to a block B503 or the file information recorded in the block B502 is updated to result in information recorded in an alternate block B502'. Accompanying this process, the FS recorded in the block B501 is updated to consume a block B501' so that SRR #2 allocated to FSes becomes full. In this case, at the step S331 indicates that the SRR allocated to FSes no longer includes a free area, causing the flow of the processing to go on to a step S332.

At the step S332, the division section 431c divides a free SRR into two partial areas. Then, at the next step S333, an area to be allocated to FSes is set in one of the partial areas and an area to be allocated to files is set in the other partial areas. Subsequently, the flow of the processing goes back to the step S331.

To be more specific, in the case of the example shown in the middle diagram of FIG. 56, SRR #3 used for recording file information is divided into SRR #4 set as an area allocated to FSes and SRR #5 set as a track allocated to files, that is, a track to be used for recording file information as shown in the lower diagram of FIG. 56.

There are some methods for dividing an SRR as described as follows.

In accordance with a first method, an SRR is divided by execution of a command called Reserve (A, B). Typically, there is a reserve command called Reserve (A) to be executed to reserve an area with a size A. The command called Reserve (A, B) is an extension of the reserve command called Reserve (A). The command called Reserve (A, B) is executed to reserve an area with a size A and another area with a size B.

In accordance with a second method, an SRR is divided by execution of a command called Split (X, A). The command called Split (X, A) is executed to split a track X (SRR #X) into an area with a size A and a remaining area. Thus, by execution of this command, a specified track is divided into two areas.

Figure 57:
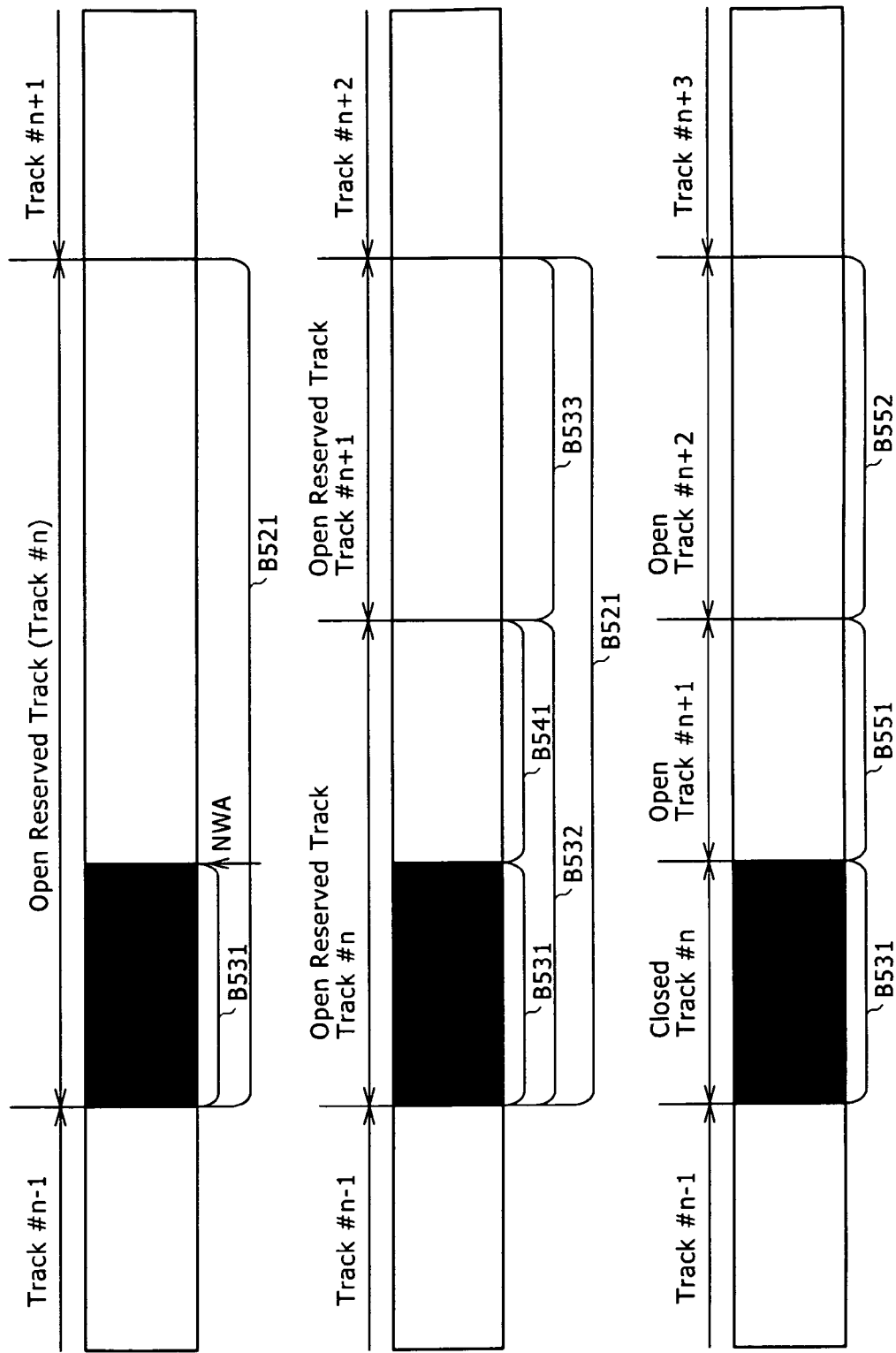
FIG. 57 is an explanatory diagram showing the area division process carried out by the recording/reproduction mechanism section shown in FIG. 48.

To be more specific, a recorded block B531 exists in an SRR (track #n) in an open state as shown in FIG. 57. The SRR (track #n) in an open state is referred to as an Open Reserved Track (Track #n). The block B531 corresponds for example to an area obtained as a result of combining blocks B502, B503 and B502' as shown in the middle diagram of FIG. 56.

In the case of the example shown in the upper diagram of FIG. 57, the command called Split (n, A) is executed to divide a track n referred to as Track #n into areas shown in the middle diagram of the figure. To put it concretely, the track #n is split into a block B532 with a size A and a remaining block B533. Composed of blocks B531 and B541, the block 532 is a track n referred to as an Open Reserved Track (Track #n) in the middle diagram of the figure. On the other hand, the block 533 is the remaining track (n+1) referred to as an Open Reserved Track (Track #(n+1)) in the middle diagram of the figure. If compared with the lower diagram of FIG. 56, the block B541 corresponds to the track allocated to FSes and the block B521 corresponds to the track allocated to files. In the example shown in the middle diagram of FIG. 57, however, the blocks B541 and B531 exist in the same track. Thus, further information is to be recorded in the block B541 adjacently following the recorded block B531.

In accordance with a third method, a command called Split (X, A, B) is executed as an extension command of the split command provided by the second method. The command called Split (X, A, B) is executed to split a track X (SRR #X) into three areas, i.e., an area with a size A, an area with a size B and a remaining area. Thus by execution of this command, a specified track is divided into three areas.

In accordance with a fourth method, a command called Split' (Y, A) is executed as an extension command of the split command provided by the second method. The command called Split' (Y, A) is executed to split a track Y (SRR #Y) into three areas, i.e., an already recorded area, an area with a size A and a remaining area. Thus, by execution of this command, a specified track is divided into three areas.

In the case of the example shown in the upper diagram of FIG. 57, Split' (n, A) is executed to divide a track n referred to as Track #n into areas shown in the lower diagram of the figure. To put it concretely, the track #n is split into a block B531, a block B551 with a size A and a remaining block B552. The block 531 is an already recorded track n referred to as a Closed Reserved Track (Track #n) in the lower diagram of the figure. The block 551 is a track (n+1) referred to as an Open Reserved Track (Track #(n+1)) in the middle diagram of the figure. The block 552 is the remaining track (n+2) referred to as an Open Reserved Track (Track #(n+2)) in the middle diagram of the figure. If compared with the lower diagram of FIG. 56, the block B551 corresponds to the track allocated to FSes and the block B552 corresponds to the track allocated to files.

As shown in the middle diagram of FIG. 56, however, while the Split command divides an open original track into open tracks (SRRs), the Split' command results in an already recorded area in a closed state.

In accordance with a fifth method, a command called Split' (Y, A, B) is executed as an extension command of Split' (Y, A) provided by the fourth method. The command called Split' (Y, A, B) is executed to split a track Y (SRR #Y) into 4 areas, i.e., an already recorded area, an area with a size A, an area with a size B and a remaining area. Thus, by execution of this command, a specified track is divided into four areas.

In the commands described above, notations A and B each denote a parameter specifying the size of an area obtained as a result of execution of the command. However, the parameters A and B may also each specify a position at which splitting is started. In addition, in the case of the Split' command, by using fewer parameters than those of the Split command, more areas obtained as a result of the splitting can be obtained. As a result, the number of bits composing parameters of the command can be reduced to a required minimum but the parameters can yet be utilized effectively. As is obvious from the above descriptions, an SRR can be divided into a maximum of four areas. By adopting the same technique as the commands described above, however, another command can be used to divide an SRR into more than four areas.

By carrying out the processing described above, a new SRR allocated to FSes can be set as an existing SRR is filled up with FSes.

As described above, an area is set as an area used for recording a main FS. It is to be noted, however, that the same technique can be applied to a case in which an area is set as an area used for recording a mirror FS.

Figure 58:
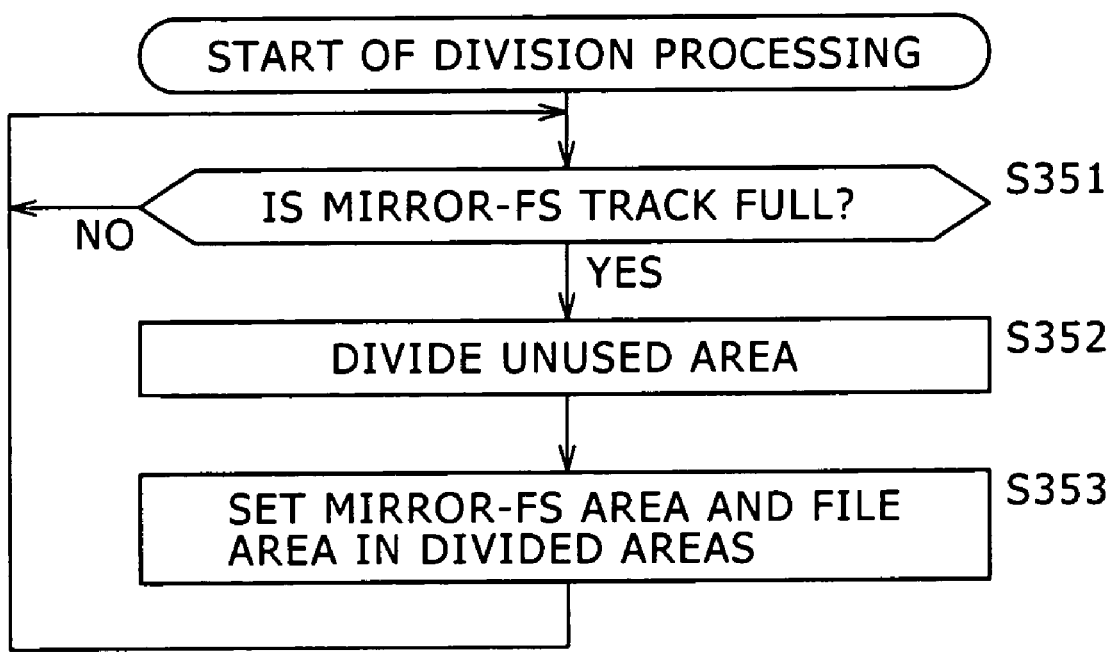
FIG. 58 shows a flowchart referred to in explanation of an area division process carried out by the recording/reproduction mechanism section shown in FIG. 48 as a process to allocate an area to a mirror FS.

Next, processing to divide an area into portions used for setting a mirror FS is explained by referring to a flowchart shown in FIG. 58.

At a step S351, the division section 431c produces a result of determination as to whether or not the SRR allocated to mirror FSes no longer includes a free area, that is, whether or not the SRR is full. The process of this step is carried out repeatedly till the SRR allocated to mirror FSes no longer includes a free area.

Figure 59:
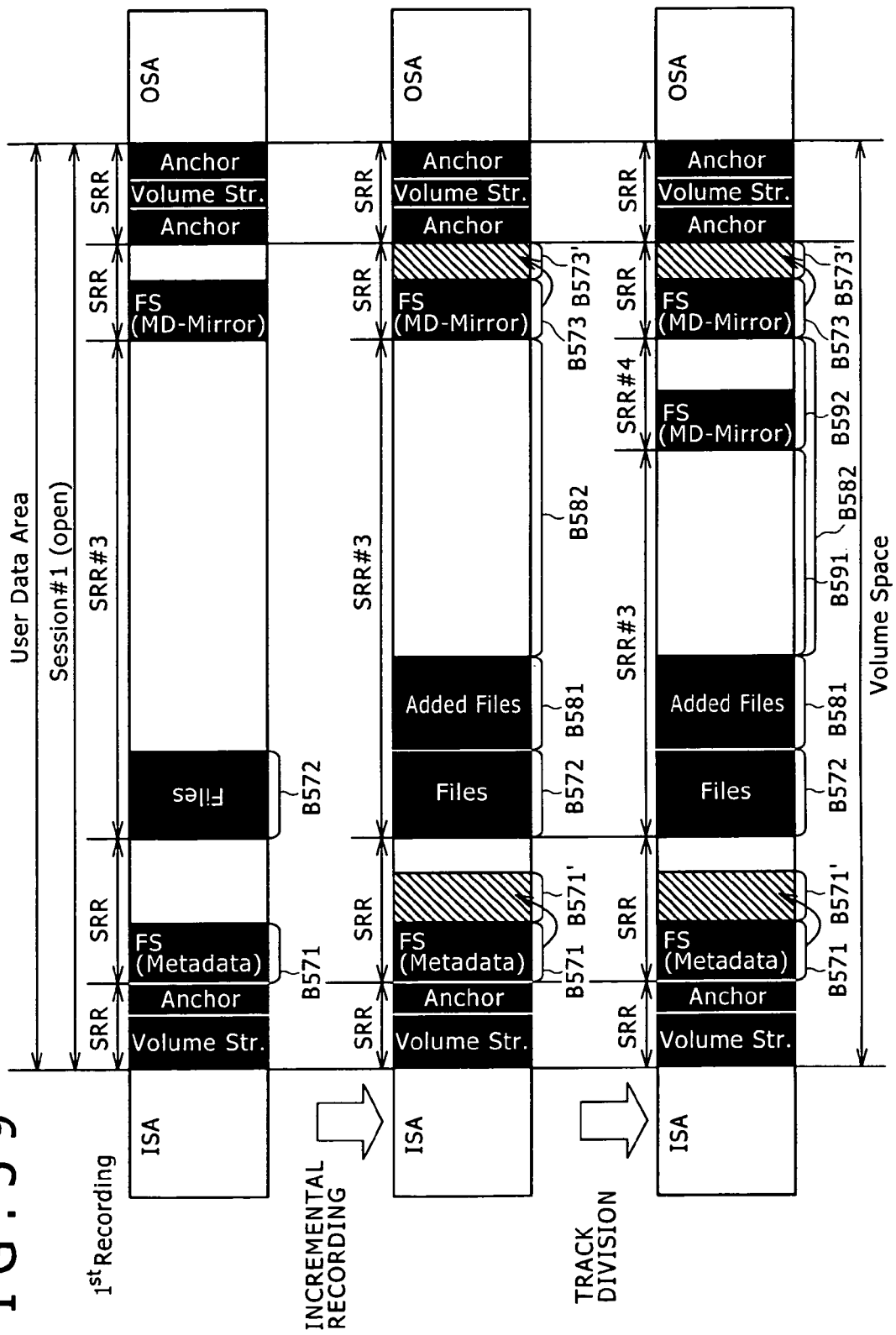
FIG. 59 is an explanatory diagram showing the area division process carried out by the recording/reproduction mechanism section shown in FIG. 48 as a process to allocate an area to a mirror FS.

As shown in the upper diagram of FIG. 59, for example, a main FS has been recorded in a block B571, a mirror FS has been recorded in a block B573 and file information referred to as Files in the figure has been recorded in a block B572 and, in this state, additional file information is recorded in a block B581, the main FS recorded in the block B571 is updated into a new main FS recorded in a block B571' and the mirror FS recorded in the block B573 is updated into a new mirror FS recorded in a block B573' as shown in the middle diagram of the figure. As a result, SRR #4 allocated to mirror FSes becomes full. In this case, the determination result produced in the process carried out at the step S351 indicates that the SRR allocated to mirror FSes no longer includes a free area, then goes on to a step S352.

At the step S352, the division section 431c divides a free SRR into two partial areas. Then, at the next step S353, an area to be allocated to FSes is set in one of the partial areas and an area to be allocated to files is set in the other partial areas. Subsequently, the flow of the processing goes back to the step S351.

To be more specific, in the case of the example shown in the middle diagram of FIG. 59, SRR #3 used for recording file information is divided into SRR #4 set as an area allocated to mirror FSes and SRR #5 set as a track allocated to files, that is, a track to be used for recording file information as shown in the lower diagram of FIG. 59.

Methods to divide an SRR in this case are similar to the methods described above for a main FS except that it is nice to set an area allocated to mirror FSes at a location close to an SRR allocated to mirror FSes.

In addition, if the size of an area dedicated for main FSes is equal to the size of an area dedicated for mirror FSes, it is quite within the bounds of possibility that both the area dedicated for main FSes and the area dedicated for mirror FSes are filled up at the same time. In such a case, one of the above commands can be executed to divide a free area into four tracks or four areas, i.e., an already recorded area, an area allocated to files, an area allocated to main FSes and an area allocated to mirror FSes. In addition, if the resulting area allocated to mirror FSes is at a location close to the original area allocated to main FSes, the reading and writing speeds can be prevented from decreasing.

By carrying out the processing described above, a new SRR allocated to mirror FSes can be set as an existing SRR is filled up with mirror FSes.

The series of processes described previously can be carried out by hardware and/or execution of software. If the series of processes described above is carried out by execution of software, programs composing the software can be installed into a computer embedded in dedicated hardware, a general-purpose personal computer or the like from typically a recording medium. In this case, the computer or the personal computer serves as the recording/reproduction apparatus described above. By installing a variety of programs into the general-purpose personal computer, the personal computer is capable of carrying out a variety of functions.

The aforementioned recording medium for recording programs to be installed into a computer or a general-purpose personal computer as programs to be executed by the computer or the general-purpose personal computer respectively is a removable recording medium provided to the user separately from the main unit of the recording/reproduction apparatus as shown in FIG. 2. Examples of the removable recording mediums also each referred to as a package medium include the magnetic disk 41 such as a flexible disk, the optical disk 42 such as a CD-ROM (Compact Disk-Read Only Memory) or a DVD (Digital Versatile Disk), the magneto-optical disk 43 such as an MD (Mini Disk) as well as the semiconductor memory 44. Instead of installing the programs from the removable recording mediums, the programs can also be stored in advance in an embedded recording medium included in the main unit of the computer or the general-purpose personal computer. Examples of the embedded recording medium are a hard disk included in the storage section 18 and the ROM 12.

It is also worth noting that, in this specification, steps of a program recorded on the recording medium as a program implementing a flowchart described above can be carried out not only in a pre-prescribed order along the time axis, but also concurrently or individually.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information-recording apparatus comprising:
file system extraction means for extracting a plurality of file systems from a plurality of file system recording areas on a recording medium;
file system synthesis means for synthesizing said file systems extracted by said file system extraction means into one file system; and
file system recording means for recording said one file system produced by said file system synthesis means as a result of synthesis into a new location in a user area on said recording medium, the file system recording means recording a mirror file system in a spare area closest to the new location of the one file system in the user area, the mirror file system corresponding to the one file system, the spare area being a file management area separate from the user area.

2. The information-recording apparatus according to claim 1, wherein
said file system extraction means comprises:
means for extracting a plurality of file systems from a plurality of file system recording areas on a plurality of file system layers on the recording medium; and
means for extracting a plurality of file systems from a plurality of file system recording areas on a plurality of physical layers on the recording medium, and
said file system synthesis means synthesizes:
file systems extracted from the file system layers into one file system; and
file systems extracted from said physical layers into another file system.

3. The information-recording apparatus according to claim 1, wherein the one file system includes at least one of an anchor point and a volume structure.

4. The information-recording apparatus according to claim 1, further comprising:
means for rendering the plurality of file systems in the plurality of file system recording areas unreadable.

5. An information-recording method for an information-recording apparatus comprising the steps of:
extracting, at a file system extraction section, a plurality of file systems from a plurality of file system recording areas on a recording medium; and synthesizing, in a file system synthesis section, said file systems extracted from the plurality of file system recording areas into one file system;

recording, at a file system recording section, said one file system into a new location in a user area on said recording medium; and recording, at the file system recording section, a mirror file system into a spare area closest to the new location of the one file system in the user area, the mirror file system corresponding to the one file system, the spare area being a file management area separate from the user area.

6. The method according to claim 5, further comprising:

rendering, at the file system recording section, the plurality of file systems in the plurality of file system recording areas unreadable.

7. The method according to claim 5, wherein the one file system includes at least one of an anchor point and a volume structure.

8. A computer-readable medium non-transitory storing computer-readable instruction thereon, the computer-readable instruction when executed by a computer cause the computer to perform the method comprising:

extracting a plurality of file systems from a plurality of file system recording areas on a recording medium;

synthesizing said file systems extracted from the plurality of file system recording areas into one file system;

recording said one file system into a new location in a user area on said recording medium; and recording a mirror file system in a spare area closest to the new location of the one file system in the user area, the mirror file system corresponding to the one file system, the spare area being a file management area separate from the user area.

9. An information-recording apparatus comprising:

a file system extraction section configured to extract a plurality of file systems from a plurality of file system recording areas on a recording medium;

a file system synthesis section configured to synthesize said file systems extracted from the plurality of file system recording areas into one file system; and a file system recording section configured to record said one file system into a new location in a user area on said recording medium, the file system recording section recording a mirror file system in a spare area closest to the new location of the one file system in the user area, the mirror file system corresponding to the one file system, the spare area being a file management area separate from the user area.

10. The information-recording apparatus according to claim 9, wherein the file system recording section renders the plurality of file systems in the plurality of file system recording areas unreadable.

11. The information-recording apparatus according to claim 9, wherein the one file system includes at least one of an anchor point and a volume structure.

* * * * *